United States Patent
Yang et al.

(10) Patent No.: US 10,469,919 B2
(45) Date of Patent: Nov. 5, 2019

(54) BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Seungryul Yang, Seoul (KR); Minsung Kwak, Seoul (KR); Woosuk Ko, Seoul (KR); Sungryong Hong, Seoul (KR); Kyoungsoo Moon, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 15/556,959

(22) PCT Filed: Apr. 7, 2016

(86) PCT No.: PCT/KR2016/003647
§ 371 (c)(1),
(2) Date: Sep. 8, 2017

(87) PCT Pub. No.: WO2016/163772
PCT Pub. Date: Oct. 13, 2016

(65) Prior Publication Data
US 2018/0070152 A1    Mar. 8, 2018

Related U.S. Application Data

(60) Provisional application No. 62/186,338, filed on Jun. 29, 2015, provisional application No. 62/180,595, (Continued)

(51) Int. Cl.
*H04N 21/858* (2011.01)
*H04N 21/236* (2011.01)
(Continued)

(52) U.S. Cl.
CPC ......... *H04N 21/858* (2013.01); *H04N 21/236* (2013.01); *H04N 21/81* (2013.01); *H04L 47/2483* (2013.01)

(58) Field of Classification Search
None
See application file for complete search history.

(56) References Cited

U.S. PATENT DOCUMENTS

2016/0164943 A1*  6/2016  Walker ................. H04L 65/601
                                                                    709/219
2017/0055024 A1*  2/2017  Kitazato ............... H04H 20/93
(Continued)

FOREIGN PATENT DOCUMENTS

KR    10-2010-0105314 A    9/2010
KR    10-2014-0016693 A    2/2014
(Continued)

OTHER PUBLICATIONS

Wikipedia, https://en.wikipedia.org/wiki/WebSocket (Year: 2011).*

*Primary Examiner* — Hsiungfei Peng
(74) *Attorney, Agent, or Firm* — Birch, Stewart, Kolasch & Birch, LLP

(57) ABSTRACT

A broadcast signal reception method comprises the steps of: receiving, via a broadcast network, a broadcast signal which includes service data for a service and signaling data; establishing a WebSocket connection with a server on the basis of URL information; and receiving a message including an event via WebSocket.

12 Claims, 55 Drawing Sheets

Related U.S. Application Data filed on Jun. 16, 2015, provisional application No. 62/175,448, filed on Jun. 15, 2015, provisional application No. 62/170,109, filed on Jun. 2, 2015, provisional application No. 62/144,311, filed on Apr. 7, 2015.

(51) Int. Cl.
*H04N 21/81* (2011.01)
*H04L 12/851* (2013.01)

(56) References Cited

U.S. PATENT DOCUMENTS

2017/0171287 A1\* 6/2017 Famaey .............. H04L 65/4084
2018/0159909 A1\* 6/2018 Huang ................. H04N 21/845

FOREIGN PATENT DOCUMENTS

| KR | 10-2014-0048019 A | 4/2014 |
|----|-------------------|--------|
| WO | WO 2014/207305 A1 | 12/2014 |
| WO | WO 2015/041494 A1 | 3/2015 |

\* cited by examiner

FIG. 2

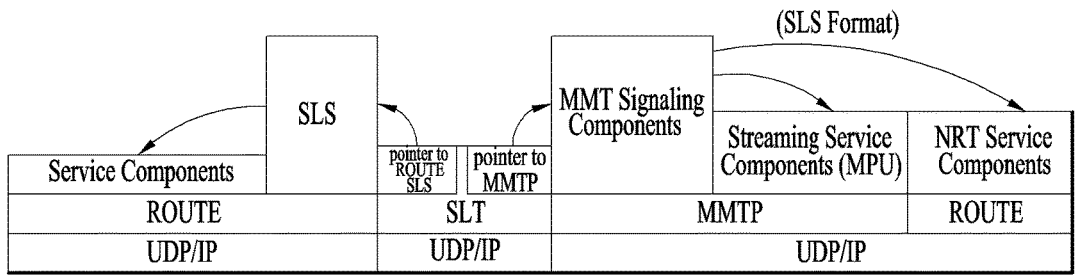

FIG. 3

| Element or Attribute Name | Use |
|---|---|
| SLT | |
|     @bsid | 1 |
|     @sltSectionVersion | 1 |
|     @sltSectionNumber | 0..1 |
|     @totalSltSectionNumbers | 0..1 |
|     @language | 0..1 |
|     @capabilities | 0..1 |
|     InetSigLoc | 0..1 |
|     Service | 1..N |
|         @serviceId | 1 |
|         @SLT serviceSeqNumber | 1 |
|         @protected | 0..1 |
|         @majorChannelNo | 1 |
|         @minorChannelNo | 1 |
|         @serviceCategory | 1 |
|         @shortServiceName | 1 |
|         @hidden | 0..1 |
|         @sls ProtocolType | 1 |
|         BroadcastSignaling | 0..1 |
|         @slsPlpId | 0..1 |
|         @slsDestinationIpAddress | 0..1 |
|         @slsDestinationUdpPort | 0..1 |
|         @slsSourceIpAddress | 0..1 |
|         @slsMajorProtocolVersion | 0..1 |
|         @SlsMinorProtocolVersion | 0..1 |
|         @serviceLanguage | 0..1 |
|         @broadbandAccessRequired | 0..1 |
|         @capabilities | 0..1 |
|         InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

FIG. 6

| Element or Attribute Name | | | Use |
|---|---|---|---|
| S - TSID | | | |
| | @serviceId | | O |
| | RS | | 1..N |
| | | @bsid | OD |
| | | @sIpAddr | OD |
| | | @dIpAddr | OD |
| | | @dport | OD |
| | | @PLPID | OD |
| | | LS | 1..N |
| | | @tsi | M |
| | | @PLPID | OD |
| | | @bw | O |
| | | @startTime | O |
| | | @endTime | O |
| | | SrcFlow | 0..1 |
| | | RprFlow | 0..1 |

FIG. 7

| Element or Attribute Name | | | | | | Use |
|---|---|---|---|---|---|---|
| bundleDescription | | | | | | |
| | userServiceDescription | | | | | |
| | | @serviceId | | | | M |
| | | @atsc: serviceId | | | | M |
| | | Name | | | | 0..N |
| | | | Lang | | | CM |
| | | serviceLanguage | | | | 0..N |
| | | atsc: capabilityCode | | | | 0..1 |
| | | atsc: Channel | | | | 1 |
| | | | @atsc: majorChannelNo | | | M |
| | | | @atsc: minorChannelNo | | | M |
| | | | @atsc: serviceLang | | | O |
| | | | @atsc: serviceGenre | | | O |
| | | | @atsc: serviceIcon | | | M |
| | | | atsc: ServiceDescription | | | 0..N |
| | | | | @atsc: serviceDescrText | | M |
| | | | | @atsc: serviceDescrLang | | O |
| | | atsc:mpuComponent | | | | 0..1 |
| | | | @atsc: mmtPackageId | | | M |
| | | | @atsc: next MmtPackageId | | | O |
| | | atsc: routeComponent | | | | 0..1 |
| | | | @atscsTSIDUri | | | M |
| | | | @slsPlpId | | | OD |
| | | | @slsDestinationIpAddress | | | OD |
| | | | @slsDestinationUdpPort | | | M |
| | | | @slsSourceIpAddress | | | M |
| | | | @slsMajorProtocolVersion | | | OD |
| | | | @SlsMinorProtocolVersion | | | OD |
| | | atsc: broadbandComponent | | | | 0..1 |
| | | | @atsc: fullfMPDUri | | | M |
| | | atsc: ComponentInfo | | | | 1..N |
| | | | @atsc: component Type | | | M |
| | | | @atsc: component Role | | | M |
| | | | @atsc: component ProtectedFlag | | | OD |
| | | | @atsc: component Id | | | M |
| | | | @atsc: component Name | | | O |

FIG. 10

|   | element/attribute | | | type | cardinality |
|---|---|---|---|---|---|
| e | ApplicationList | | | | |
| | e | Application | | | 1..N |
| | | e | appName | xs:string | 0..N |
| | | | @ lang | xs:langauge | 0 |
| | | e | applicationDescriptor | | 1 |
| | | | e icon | | 0..N |
| | | | @ mimeType | xs:string | 0 |
| | | | @ width | xs:unsignedInt | 0 |
| | | | @ height | xs:unsignedInt | 0 |
| | | | @ depth | xs:unsignedInt | 0 |
| | | | @ url | xs:anyURI | M |
| | | | @ type | xs:unsignedInt | M |
| | | | @ controlCode | xs:unsignedInt | M |
| | | | @ visibility | xs:boolean | O |
| | | | @ serviceBound | xs:boolean | OD |
| | | | @ priority | xs:unsignedInt | M |
| | | | @ version | xs:unsignedInt | M |
| | | | @ mhpVersion | xs:unsignedInt | O |
| | | | @ storageCapabilities | xs:unsignedInt | O |
| | | | @ trickModeTolerance | | O |
| | | e | applicationSpecificDescriptor | xs:unsignedInt | 0..N |
| | | e | applicationUsageDescriptor | xs:unsignedInt | 0..N |
| | | e | applicationBoundary | xs:anyURI | 0..N |
| | | e | applicationTransport | xs:unsignedInt | 1..N |
| | | e | applicationLocation | xs:anyURI | 1 |
| | | e | atsc:Capabilities | xs:string | 1 |
| | | e | atsc:liveEventSource | | 1 |
| | | | @ URL | xs:anyURI | M |
| | | | @ shortPollingPeriod | xs:unsignedInt | O |
| | | | @ targetDevice | xs:unsignedInt | O |

FIG. 11

| | | | element/attribute | | type | cardinality |
|---|---|---|---|---|---|---|
| e | e | e | atsc:ContentItems | | | 0..N |
| | | | e | location | xs:anyURI | 0..N |
| | | | @ | ContentLinkage | xs:unsignedInt | M |
| | | | @ | updatesAvailable | xs:boolean | M |
| | | | @ | TFAvailable | xs:boolean | M |
| | | | @ | contentSecurityCondition | xs:boolean | M |
| | | | @ | availableInBroadcast | xs:boolean | M |
| | | | @ | availableOnInet | xs:boolean | M |
| | | | @ | playBackLengthInSecondes | xs:unsignedInt | O |
| | | | @ | playBackDelay | xs:unsignedInt | O |
| | | | @ | expiration | xs:unsignedInt | O |
| | | | @ | size | xs:unsingedLong | O |
| | | | @ | name | xs:string | O |
| | | | e | timeSlotInfo | | |
| | | | | @ | time_slot_start | xs:unsingedInt | |
| | | | | @ | time_slot_length | xs:unsingedInt | |
| | | | | @ | acquisition_time | xs:unsingedInt | |
| | | | | @ | repeat_period | xs:unsingedInt | |
| | | | | @ | slot_count | xs:unsingedInt | |
| | | @ | applicationIdentifier | | xs:anyURI | M |
| | | @ | atsc:serviceId | | xs:unsignedInt | M |
| | | @ | atsc:protocolVersion | | xs:unsignedInt | M |
| | @ | ASTVersionNumber | | | xs:unsignedInt | M |
| | @ | timeSpanStart | | | xs:unsignedInt | M |
| | @ | timeSpanLength | | | xs:unsignedInt | M |

FIG. 12

| Element Name | | | | Cardin-ality | Data Type |
|---|---|---|---|---|---|
| EMT | | | | | |
| | @mpdId | | | R | string |
| | @periodId | | | R | string |
| | EventStream | | | 1..N | |
| | | @schemeIdURi | | R | anyURI |
| | | @value | | O | string |
| | | @timescale | | O | unsignedInt |
| | | Event | | 0..N | string |
| | | | @presentationTime | OD | unsignedLong |
| | | | @duration | O | unsignedLong |
| | | | @id | O | unsignedInt |

FIG. 18
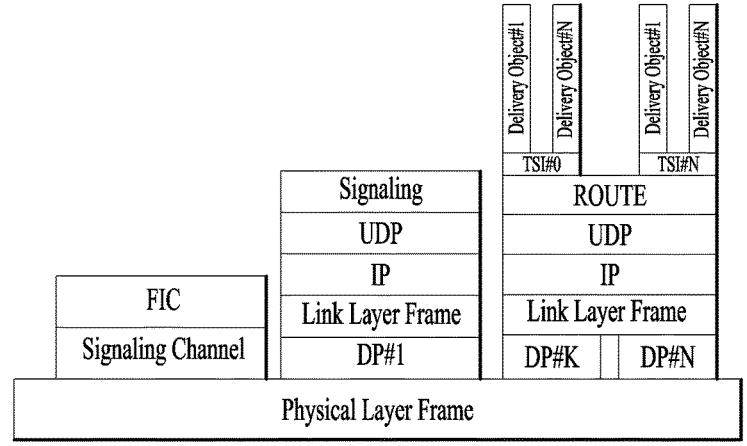
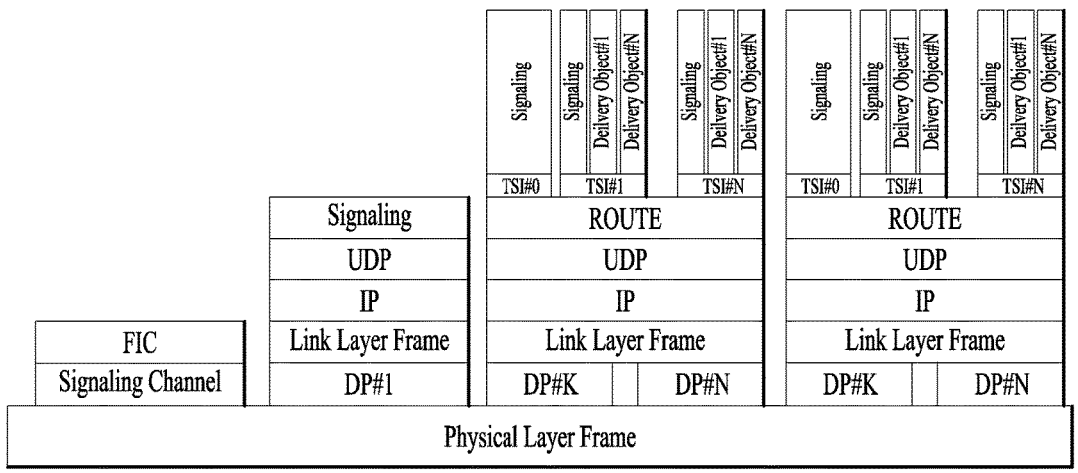
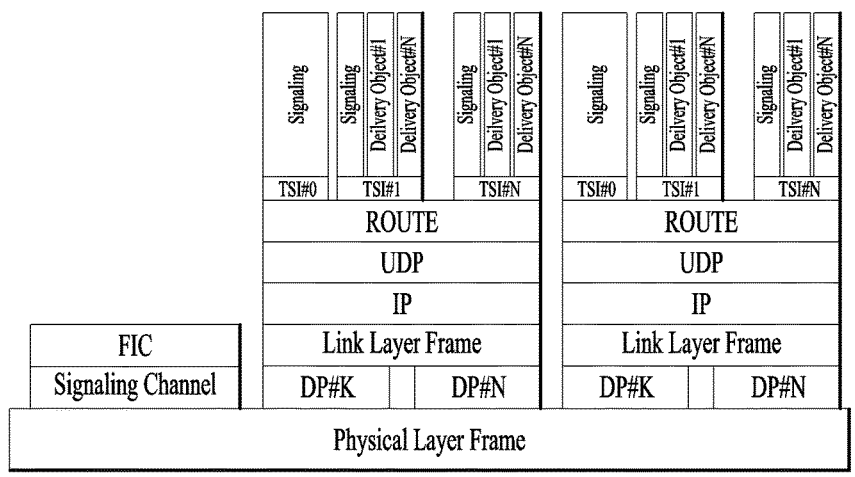

FIG. 19

| Syntax | No. of Bits | No. of Bits |
|---|---|---|
| service_list_table_section() { | | |
|   table_id | 8 | TBD |
|   SLT_section_version | 4 | uimsbf |
|   SLT_section_length | 12 | uimsbf |
|   SLT_protocol_version | 8 | uimsbf |
|   broadcast_stream_id | 16 | uimsbf |
|   SLT_section_number | 4 | uimsbf |
|   last_SLT_section_number | 4 | uimsbf |
|   num_services | 8 | |
|   for (i=0; i<num_services;i++) { | | |
|     service_id | 16 | uimsbf |
|     SLT_service_seq_number | 3 | uimsbf |
|     protected | 1 | bslbf |
|     major_channel_number | 10 | uimsbf |
|     mijor_channel_number | 10 | uimsbf |
|     service_category | 4 | uimsbf |
|     short_service_name_length /* m */ | 4 | uimsbf |
|     short_service_name() | 8 * m | uimsbf |
|     broadcast_signaling_present | 1 | bslbf |
|     SLS_source_IP_address_present | 1 | bslbf |
|     broadband_access_required | 1 | bslbf |
|     reserved | 1 | '1' |
|     SLS_protocol_type | 4 | uimsbf |
|     if(broadcast_signaling_present) { | | |
|       SLS_PLP_ID | 8 | uimsbf |
|       SLS_destination_IP_address | 32 | uimsbf |
|       SLS_destination_UDP_port | 16 | uimsbf |
|       if(SLS_source_address_present) { | | |
|         SLS_source_IP_address | 32 | uimsbf |
|       } | | |
|       SLS_protocol_version | 8 | uimsbf |
|       reserved | 4 | '1111' |
|       num_ext_length_bits /* b */ | 4 | uimsbf |
|       if (num_ext_length_bits > 0) { | | |
|         if (num_ext_length_bits %8) != 0 { | | |
|           reserved1 | (8 - b%8) | '11111..' |
|         } | | |
|         ext_length /* e */ | b | uimsbf |
|         reserved2 () | 8*e | |
|       } | | |
|     } | | |
|     reserved | 4 | '111111' |
|     num_service_level_descriptors | 4 | uimsbf |
|     for (j=0; j<num_service_level_descriptors; j++) { | | |
|       service_level_descriptor() | var | |
|     } | | |
|   } | | |
|   reserved | 4 | '1111' |
|   num_SLT_level_descriptors | 4 | uimsbf |
|   for (n=0; n<num_SLT_level_descriptors; n++) { | | |
|     SLT_level_descriptor() | var | |
|   } | | |
|   for (k = 0 ; k < N ; k++) { | | |
|     reserved3 | 8 | |
|   } | | |
| } | | |

FIG. 34

(a)  listener(StreamEvent event)

(b)  addStreamEventListener(targetURL, eventName, listener)
     removeStreamEventListener(targetURL, eventName, listener)

FIG. 35

(a)
```
GET /notifications HTTP/1.1
Host: server.example.com
Upgrade: websocket
Connection: Upgrade
Sec-WebSocket-Key: ePhhsdhjdshuwrwrrwjQDS==
Sec-WebSocket-Protocol: ATSCAppSignaling
Sec-WebSocket-Version: 13
NotificationType: 1 (notification request) or 0 (notification not requested)
```

(b)
```
HTTP/1.1 101 Switching Protocols
Upgrade: websocket
Connection: Upgrade
Sec-WebSocket-Accept: 6d67dfukfhwHGJHOwqQEE+kjfh=
Sec-WebSocket-Protocol: ATSCAppSignaling
NotificationType: 1 (notification) or 0 (no notification)
```

FIG. 36

(a)
```
GET /notifications HTTP/1.1
Host: server.example.com
Upgrade: websocket
Connection: Upgrade
Sec-WebSocket-Key: ePhhsdhjdshuwrwrrwjQDS==
Sec-WebSocket-Protocol: ATSCAppSignaling
Sec-WebSocket-Version: 13
Sec-WebSocket-Extensions: notiType=1 (notification request) or notiType=0
(notification not requested)
```

(b)
```
HTTP/1.1 101 Switching Protocols
Upgrade: websocket
Connection: Upgrade
Sec-WebSocket-Accept: 6d67dfukfhwHGJHOwqQEE+kjfh=
Sec-WebSocket-Protocol: ATSCAppSignaling
Sec-WebSocket-Extensions: notiType=1 (notification) or notiType=0 (no notification)
```

FIG. 37

| Element | Number of bits | Meaning |
|---|---|---|
| NOTIFY_ID | 8 | A notification identifier that uniquely identifies the corresponding ATSC notification connection |
| TT (TABLE_TYPE) | 8 | Indicates the type of the table which the updated data can use. The values of the TT field are interpreted as follows: <br> 0: The updated data can use the AST. <br> 1: The updated data can use static events (i.e., EST). <br> 2: The updated data can use dynamic events (i.e., Event). <br> 3: The updated data can use all the above. <br> 4-255: Reserved |
| TABLE_VERSION | 8 | Indicates the version of the table which the updated data can use. |
| SERVICE_ID | 16 | A service identifier to which notifications and table data are applicable <br> The SERVICE_ID element can uniquely identify the service. |
| AC (ACTION_CODE) | 2 | Defines the type of an action. The following actions are defined. <br> 0: Table notification from the server to the client <br> 1: Notification cancel request from the client to the server for a notification stream identified by the NOTIFY_ID element, a service identified by the SERVICE_ID element, and a table type identified by the TT (TABLE_TYPE) element <br> 2: Notification renew request from the client to the server for a notification connection identified by the NOTIFY_ID element, a service identified by the SERVICE_ID element, and a table of a type identified by the TT (TABLE_TYPE) element <br> 3: Reserved |
| DATA_LENGTH | 30 | Provide the length in bytes of the following TABLE_DATA. <br> If the value of the DATA_LENGTH element is "0", the TABLE_DATA may not be included in the notification and may be retrieved from the URL for the table. <br> If the value of the AC field is "1" or "2", the value of DATA_LENGTH may be "0". |
| DATA_FORMAT | 4 | Defines the format of TABLE_DATA. The values of DATA_FORMAT are interpreted as follows : <br> 0: Unspecified <br> 1: Binary bit stream <br> 2: XML <br> 3: JASON <br> 4-16: Reserved |
| DATA_ENCODING | 4 | Defines the encoding type of TABLE_DATA. The values of the DATA_ENCODING field are interpreted as follows. <br> 0: Unspecified <br> 1: Null (uncompressed) <br> 2: DEFLATE (RFC1951) |
| TABLE_DATA | DATA_LENGH | Table data for the table indicated by the TT field. <br> TABLE_DATA may conform to the syntax of an individual table indicated by the TT field. If the value of the AC field is "1" or "2", TABLE_DATA may not be provided. The table data may be in a bit stream (binary), XML, or JSON format. Rules specified in the NotificationType header field regarding inclusion of TABLE_DATA element shall be followed |

FIG. 38

| Element | Number of bits | Meaning |
|---|---|---|
| URL_LENGTH | 30 | Provides the length in bytes of the following TABLE_URL data. If the value of URL_LENGTH is "0", TABLE_URL may not be included in the notification. If the value of the AC field is "1" or "2", the value of URL_LENGTH may be "0". |
| URL_FORMAT | 4 | Defines the format of TABLE_URL. The values of the URL_FORMAT field are defined as follows: 0: Unspecified 1: Binary bit stream 2: XML 3: JASON 4-16: Reserved |
| URL_ENCODING | 4 | Defines the encoding type of TABLE_URL. The values of the URL_ENCODING field are interpreted as follows. 0: Unspecified 1: Null (uncompressed) 2: DEFLATE (RFC1951) |
| TABLE_URL | URL_LENGH | URL of the table that the client can access to acquire table data. If the value of the AC field is "1" or "2", TABLE_URL may not be provided. |

FIG. 39

```
<xs:schema xmlns:xs="http://www.w3.org/2001/XMLSchema" elementFormDefault="qualified"
attributeFormDefault="unqualified">
    <xs:element name="ATSCAppNoti" type=" ATSCAppNotiType"/>
    <xs:complexType name="ATSCAppNotiType">
        <xs:choice>
            <xs:element name="tableData" type="xs:string" minOccurs="0" maxOccurs="unbounded"/>
            <xs:element name="tableUrl" type="xs:anyURI" minOccurs="0" maxOccurs="unbounded"/>
        </xs:choice>
        <xs:attribute name="id" type="xs:string" use="required"/>
        <xs:attribute name="tableType" type="xs:string" use="required"/>
        <xs:attribute name="tableVersion" type="xs:string" use="required"/>
        <xs:attribute name="serviceId" type="xs:integer" use="required"/>
        <xs:attribute name="actionCode" type="xs:integer" use="required"/>
    </xs:complexType>
</xs:schema>
```

FIG. 40

```
{
    "$schema": "http://json-schema.org/draft-04/schema#",
    "title": "Notification message",
    "description": "Notification type messages use this generic message envelope.",
    "type": "object",
    "ATSCAppReqRes": {
        "type": "string",
        "tableData": {"type": "string"},
        "tableUrl": {"type": "anyURI" or "type": "string"},
        "tableType": {"type": "string"},
        "tableVersion": {"type": "string"},
        "serviceId": {"type": "integer"},
        "actionCode": {"type": "integer", "enum": [0, 1]}
    }
}
```

FIG. 41

```
{
    "$schema": "http://json-schema.org/draft-04/schema#",
    "title": "Notification message"
    "description": "Notification type messages use this generic message envelope.",
    "type": "object",
    "ATSCAppReqRes": {
        "type": "string",
        "oneOf": [{"$ref":"#body/noti"}, {"$ref":"#body/notihandle"},
        "body": {
            "noti": {
                "properties": {
                    "tableData": {"type": "string"},
                    "tableUrl": {"type": "anyURI" or "type": "string"},
                    "tableType": {"type": "string"},
                    "tableVersion": {"type": "string"},
                    "serviceId": {"type": "integer"},
                    "actionCode": {"type": "integer", "enum": [0]}
                }
            }
            "notihandle": {
                "properties": {
                    "tableType": {"type": "string"},
                    "tableVersion": {"type": "string"},
                    "serviceId": {"type": "integer"},
                    "actionCode": {"type": "integer", "enum": [1,2]}
                }
            }
        }
    }
}
```

FIG. 42

| Element | Number of bits | Meaning |
|---|---|---|
| MESSAGE_ID | 8 | A message identifier that uniquely identifies the message. |
| TT (TABLE_TYPE) | 8 | Indicates the type of the table which the updated data can use.<br>The values of the TT field are interpreted as follows:<br>0: The updated data can use the AST.<br>1: The updated data can use static events (i.e., EST).<br>2: The updated data can use dynamic events (i.e., Event).<br>3: The updated data can use all the above.<br>4-255: Reserved |
| TABLE_VERSION | 8 | Indicates the version of the table which the updated data can use. |
| SERVICE_ID | 16 | A service identifier to which the message and table data are applicable<br>The SERVICE_ID element can uniquely identify the service. |
| AC (ACTION_CODE) | 2 | Defines the type of an action. The following actions are defined.<br>0: Table request from the client to the server<br>1: Table response from the server to the client<br>2-3: Reserved |
| DATA_LENGTH | 30 | Provide the length in bytes of the following TABLE_DATA.<br>If the value of the DATA_LENGTH element is "0", the TABLE_DATA may not be included in the message and may be retrieved from the URL for the table. If the value of the AC field is "0", the value of DATA_LENGTH may be "0". |
| DATA_FORMAT | 4 | Defines the format of TABLE_DATA.<br>The values of DATA_FORMAT are interpreted as follows:<br>0: Unspecified<br>1: Binary bit stream<br>2: XML<br>3: JASON<br>4-16: Reserved |
| DATA_ENCODING | 4 | Defines the encoding type of TABLE_DATA.<br>The values of the DATA_ENCODING field are interpreted as follows.<br>0: Unspecified<br>1: Null (uncompressed)<br>2: DEFLATE (RFC1951) |
| TABLE_DATA | DATA_LENGH | (Optional) table data for the table indicated by the TT (TABLE_TYPE) element. The content of the TABLE_DATA element may conform to the syntax of an individual table indicated by the TT (TABLE_TYPE) element. If the value of the AC (ACTION_CODE) element is "0", the TABLE_DATA element may not be provided.<br>The table data may be in a bit stream (binary), XML, or JSON format. |

FIG. 43

| Element | Number of bits | Meaning |
|---|---|---|
| URL_LENGTH | 30 | May provide the length in bytes of the data of the following TABLE_URL element. If the value of the URL_LENGTH element is "0", the TABLE_URL element may not be included in the message. If the value of the AC (ACTION_CODE) element is "0", the value of the URL_LENGTH element may be "0". |
| URL_FORMAT | 4 | Defines the format of TABLE_URL.<br>The values of the URL_FORMAT field are defined as follows:<br>0: Unspecified<br>1: Binary bit stream<br>2: XML<br>3: JASON<br>4-16: Reserved |
| URL_ENCODING | 4 | Defines the encoding type of TABLE_URL.<br>The values of the URL_ENCODING field are interpreted as follows.<br>0: Unspecified<br>1: Null (uncompressed)<br>2: DEFLATE (RFC1951) |
| TABLE_URL | URL_LENGH | URL of the table that the client can access to acquire table data.<br>If the value of the AC field is "0", TABLE_URL may not be provided |

FIG. 44

```
<xs:schema xmlns:xs="http://www.w3.org/2001/XMLSchema" elementFormDefault="qualified"
attributeFormDefault="unqualified">
    <xs:element name="ATSCAppReqRes" type=" ATSCAppReqResType"/>
    <xs:complexType name="ATSCAppReqResType">
        <xs:choice>
            <xs:element name="tableData" type="xs:string" minOccurs="0" maxOccurs="unbounded"/>
            <xs:element name="tableUrl" type="xs:anyURI" minOccurs="0" maxOccurs="unbounded"/>
        </xs:choice>
        <xs:attribute name="id" type="xs:string" use="required"/>
        <xs:attribute name="tableType" type="xs:string" use="required"/>
        <xs:attribute name="tableVersion" type="xs:string" use="required"/>
        <xs:attribute name="serviceId" type="xs:integer" use="required"/>
        <xs:attribute name="actionCode" type="xs:integer" use="required"/>
    </xs:complexType>
</xs:schema>
```

FIG. 45

```
{
    "$schema": "http://json-schema.org/draft-04/schema#",
    "title": "Request-Response message"
    "description": "Request-Response type messages use this generic message envelope.",
    "type": "object",
    "ATSCAppReqRes": {
            "type": "string",
            "tableData": {"type": "string" or "type": "object"},
            "tableUrl": {"type": "anyURI" or "type": "string"},
            "tableType": {"type": "string"},
            "tableVersion": {"type": "string"},
            "serviceId": {"type": "integer"},
            "actionCode": {"type": "integer", "enum": [0, 1]}
    }
}
```

FIG. 46

```
{
    "$schema": "http://json-schema.org/draft-04/schema#",
    "title": "Notification message"
    "description": "Notification type messages use this generic message envelope.",
    "type": "object",
    "ATSCAppReqRes": {
        "type": "string",
        "oneOf": [{"$ref":"#body/resp"}, {"$ref":"#body/req"}],
        "body": {
            "resp": {
                "properties": {
                    "tableData": {"type": "string"},
                    "tableUrl": {"type": "anyURI" or "type": "string"},
                    "tableType": {"type": "string"},
                    "tableVersion": {"type": "string"},
                    "serviceId": {"type": "integer"},
                    "actionCode": {"type": "integer", "enum": [1]}
                }
            },
            "req": {
                "properties": {
                    "tableType": {"type": "string"},
                    "tableVersion": {"type": "string"},
                    "serviceId": {"type": "integer"},
                    "actionCode": {"type": "integer", "enum": [0]}
                }
            }
        }
    }
}
```

FIG. 48

| type | emsg |
|---|---|
|  | [extension is needed] |
| string | scheme_id_uri |
| string | value |
| 32 | timescale |
| 32 | presentation_time_delta |
| 32 | event_duration |
| 32 | id |
| bytes | message_data[ ] |

| Trigger | type |
|---|---|
| channelID | 8 |
| cmdID | 8 |
| version | 8 |
| URI_byte | 8 |

FIG. 50

| type | emsg |
|---|---|
| string | scheme_id_uri |
| string | value |
| 32 | timescale |
| 32 | presentation_time_delta |
| 32 | event_duration |
| 32 | id |
| bytes | message_data[ ] |

| Trigger | type |
|---|---|
| channelID | 8 |
| cmdID | 8 |
| version | 8 |
| URI_byte | 8 |

BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

CROSS REFERENCE TO RELATED APPLICATIONS

This application is the National Phase of PCT International Application No. PCT/KR2016/003647, filed on Apr. 7, 2016, which claims priority under 35 U.S.C. 119(e) to U.S. Provisional Application No. 62/144,311, filed on Apr. 7, 2015, U.S. Provisional Application No. 62/170,109, filed on Jun. 2, 2015, U.S. Provisional Application No. 62/175,448, filed on Jun. 15, 2015, U.S. Provisional Application No. 62/180,595, filed on Jun. 16, 2015, and U.S. Provisional Application No. 62/186,338, filed on Jun. 29, 2015, all of which are hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 10 is a diagram illustrating a part of an Application-List element according to an embodiment of the present invention;

FIG. 11 is a diagram illustrating another part of the ApplicationList element according to an embodiment of the present invention;

FIG. 12 is a diagram illustrating an event message table (EMT) according to an embodiment of the present invention;

FIG. 18 illustrates a method for transmitting signaling data by a future broadcast system according to an embodiment of the present invention;

FIG. 19 is a diagram showing a section of a service list table (SLT) according to an embodiment of the present invention;

FIG. 34 is a diagram illustrating API and an event listener according to an embodiment of the present invention;

FIG. 35 illustrates WebSocket opening handshake between a client and a server according to an embodiment of the present invention;

FIG. 36 illustrates extension of NotificationType information according to an embodiment of the present invention;

FIG. 37 illustrates a binary format notification message according to an embodiment of the present invention;

FIG. 38 illustrates a binary format notification message according to an embodiment of the present invention;

FIG. 39 illustrates an XML format notification message according to an embodiment of the present invention;

FIG. 40 illustrates a JSON format notification message according to an embodiment of the present invention;

FIG. 41 illustrates a JSON format notification message according to an embodiment of the present invention;

FIG. 42 illustrates a binary format message according to another embodiment of the present invention;

FIG. 43 illustrates a binary format message according to another embodiment of the present invention;

FIG. 44 illustrates an XML format message according to an embodiment of the present invention;

FIG. 45 illustrates a JSON format message according to an embodiment of the present invention;

FIG. 46 illustrates a JSON format message according to an embodiment of the present invention;

FIG. 48 is a diagram illustrating fields of an emsg box mapped to a trigger format according to an embodiment of the present invention;

FIG. 50 is a diagram illustrating an emsg box including a trigger according to an embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
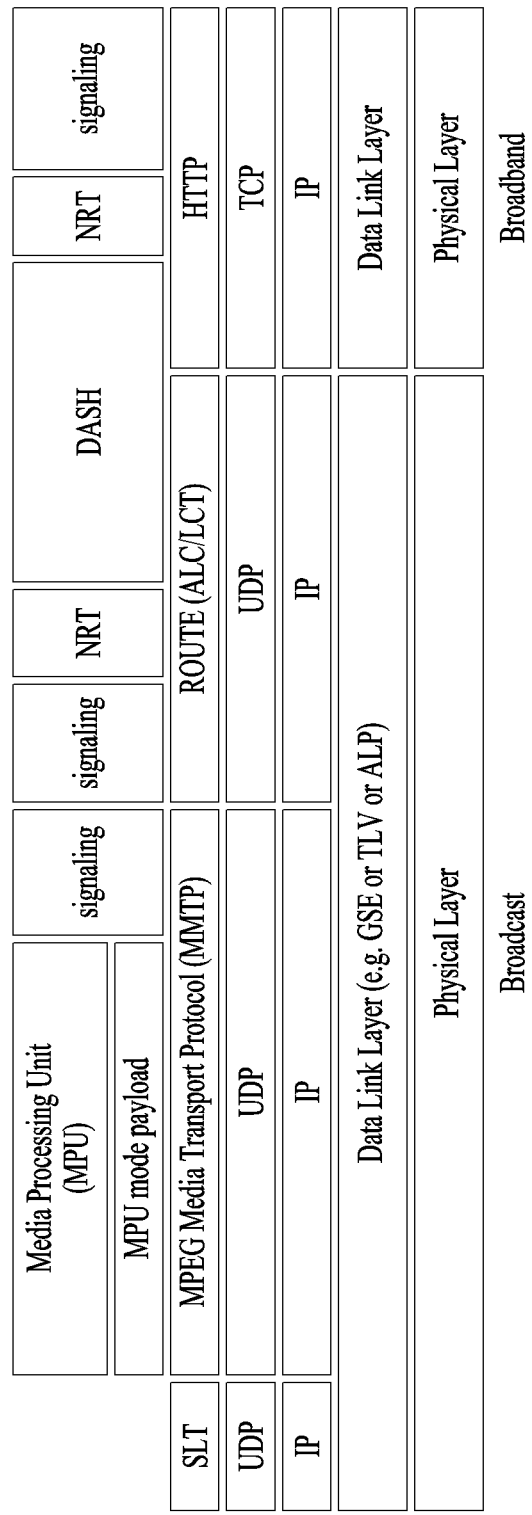
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLPID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
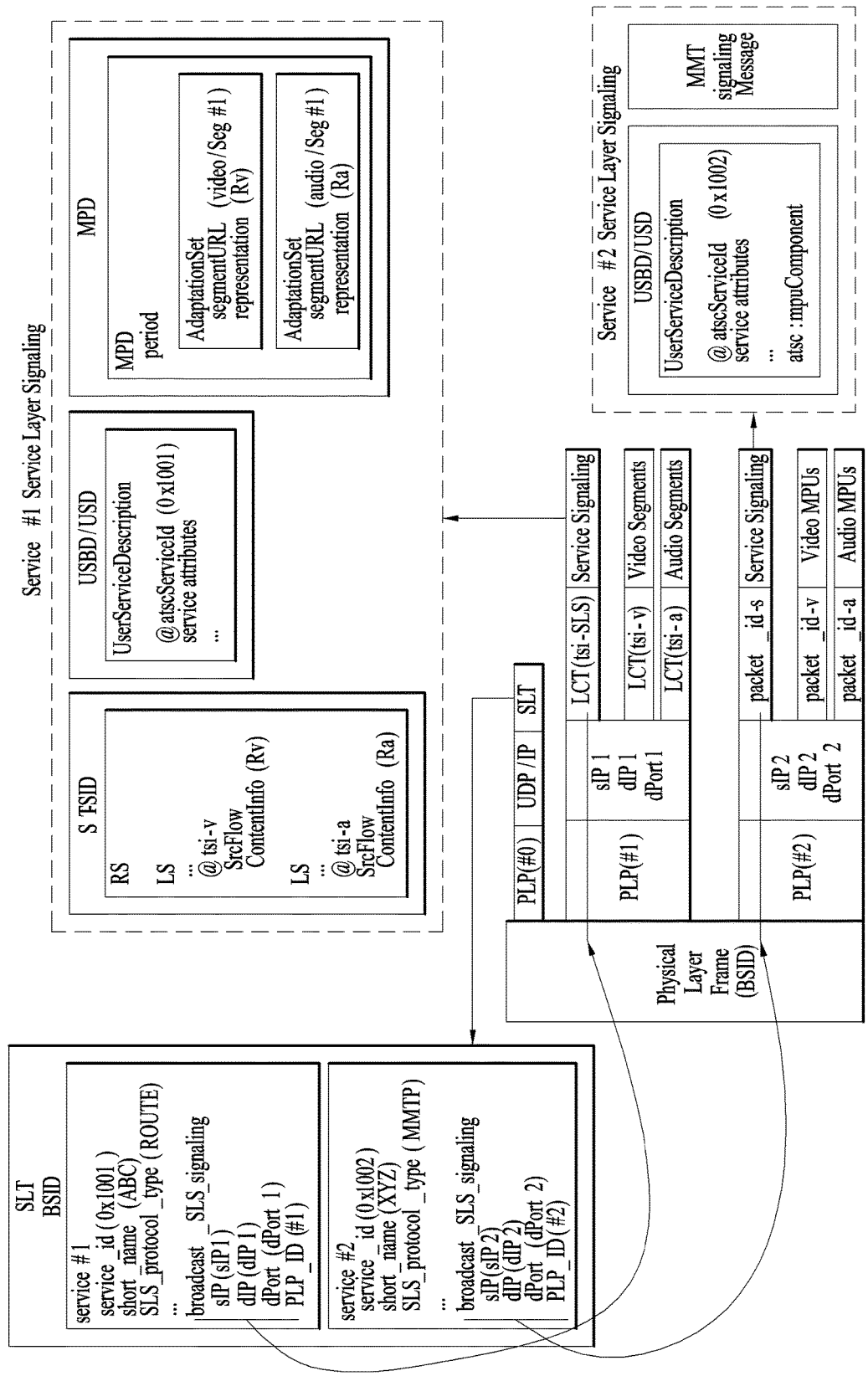
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc: sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of serviceid.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLPID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc: componentType, @atsc: componentRole, @atsc: componentProtectedFlag, @atsc: componentId and/or @atsc: componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ). This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
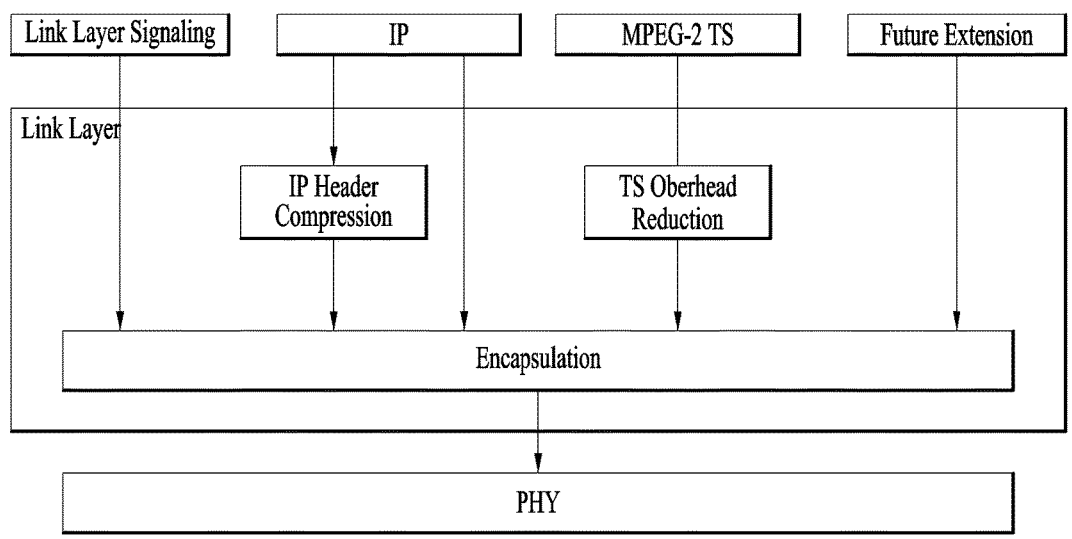
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
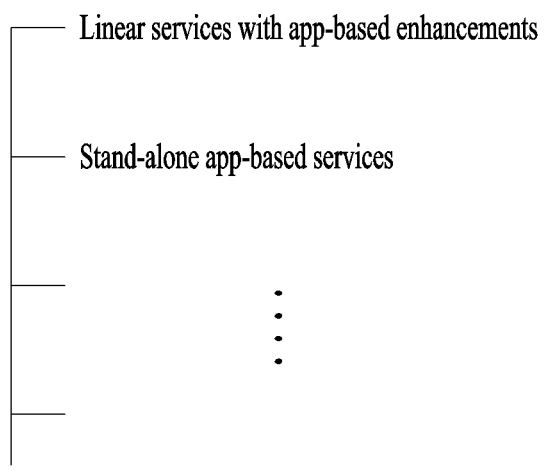
FIG. 9 is a diagram of an app-related broadcast service according to an embodiment of the present invention.

FIG. 9 is a diagram of an app-related broadcast service according to an embodiment of the present invention.

The present invention proposes a signaling method and synchronization method of an app-related broadcast service among the aforementioned broadcast services. Here, the app-related broadcast service may refer to a broadcast service when provision of a basic broadcast service is related to an application. In detail, the app-related broadcast service may be a linear service including app-based enhancements and/or stand alone app-based service. In some embodiments, the signaling method and so on according to the present invention may be applied to other types of services that use an application.

First, the linear service including app-based enhancements will be described. Here, the linear service may refer to a general broadcast service. Enhancements may refer to an enhancements service and an interactive service for transmitting additional information on a general broadcast service. The app-based enhancements may refer to the case in which the aforementioned information is provided/controlled based on an application.

For example, during broadcast of football game (general broadcast service), the case (app-based enhancements) in which a player information application provides information on football players may correspond to the linear service including the app-based enhancements.

The stand alone app-based service will be described. The stand alone app-based service may refer to a broadcast service only the app-based enhancements. That is, the stand alone app-based service may correspond to the case in which an application provides a service, but not the case in which app-based enhancements provide additional information to a basic broadcast service. A broadcast-independent application and so on may be embodiments of an application for providing the stand alone app-based service.

The app-based enhancements may include a plurality of components. A component of the app-based enhancements may include one or more applications, 0 or more activation notification, 0 or more additional non real time (NRT) content items, and/or 0 or more on-demand item.

Here, each application may be a non real time (NRT) content item and may be an NRT content item to be executed in application run time environment. Here, actions to be performed by applications may be initiated by notifications transmitted through a broadcast network/broadband and, in this regard, the notifications may correspond to the aforementioned activation notification. The notifications may also be referred to as "event". Here, an additional NRT content item and/or an on-demand item may refer to data to be used by an application.

In some embodiments, one of applications included in the app-based enhancements may be prepared as a primary application. When the primary application is present, the primary application may be executed as soon as the broadcast service including the corresponding app-based enhancements is selected. Other applications other than the primary application may be executed via signaling through a broadcast network/broadband. Applications other than the primary application may be executed by other application that is already executed. In this case, an application other than the primary application may be executed by createApplication( ) of java script.

The present invention proposes a signaling method of various types of app-based enhancements as described above. The present invention proposes a method of synchronizing activation notification with a time base and transmitting the activation notification. Actions of an application may also be synchronized by the synchronized activation notification.

Here, the application may refer to a set of documents (HTML, CSS, JavaScript, etc.) constituting the enhancement/interactive service.

Here, the content item may refer to a set of one or more files intended to be treated as one unit for the purpose of presentation.

Here, the event may refer to timed notification indicate that an action is supposed to be performed on a DASH client or an application.

Here, the event stream may refer to a stream of the aforementioned events.

Here, the NRT content item may refer to a content item transmitted ahead of time for another use in a future presentation or application.

Here, the on-demand content item may refer to a content item that is downloaded and presented at a time requested by a user.

FIG. 10 is a diagram illustrating a part of an ApplicationList element according to an embodiment of the present invention.

FIG. 11 is a diagram illustrating another part of the ApplicationList element according to an embodiment of the present invention.

The two drawings are originally shown in one drawing but are divided into two parts due to spatial restriction.

As described above, the broadcast service may include 0 or more app-based enhancements. For example, the linear service may include app-based enhancements having one application that is executed in a background and manages insertion of a target advertisement. The linear service may further include app-based enhancements including a set of applications for providing interactive viewing experience related to an audio/video program.

Here, each of the app-based enhancements may be separately signaled. Accordingly, manufacturers of various applications do not necessarily cooperate with each other about signaling thereof.

A set of applications included in one app-based enhancement may be signaled by an ApplicationSignaling Table (AST). The AST may be one of XML documents and may have ApplicationList element as a root element. One AST may include signaling information on applications included in one app-based enhancement. In some embodiments, one AST may be extended to signal a plurality of app-based enhancements.

The service signaling information on one service may include AST of each of app-based enhancements included in a corresponding service. That is, when one service includes a plurality of app-based enhancements, service signaling information of the service may include a plurality of ASTs.

An embodiment of the illustrated AST will be described. In some embodiments, each element/attribute of the AST may be added/omitted/changed.

The AST may include a root element as the ApplicationList element. The ApplicationList element may include a list of Application elements. That is, the ApplicationList element may include at least one Application element.

Each Application element may include appName element, applicationDescriptior element, applicationSpecificDescriptor element, applicationUsageDescriptor element, applicationBoundary element, applicationTransport element, applicationLocation element, atsc:Capabilities element, atsc:liveEventSource element, atsc:ContentItems element, @applicationIdentifier attribute, @atsc:serviceId attribute, and/or @atsc:protocolVersion attribute.

The appName element may indicate a name of an application indicated by the Application element. The element may be omitted. The application name may be represented by various languages. The appName element may further include @lang attribute. The @lang attribute may indicate a language representing an application name.

The applicationDescriptior element may include information on a corresponding application. The applicationDescriptior element may include information items to be commonly included in all applications. The applicationDescriptior element may include a icon element, @type attribute, @controlCode attribute, @visibility attribute, @serviceBound attribute, @priority attribute, @version attribute, @mhpVersion attribute, @storageCapabilities attribute, and/or @trickModeTolerance attribute.

The icon element may represent an icon to be used to represent a corresponding application. The element may be omitted. The icon element may further include @mimType attribute indicating an MIME type of an application image (icon) and/or @width/@height/@depth attribute indicating area/height/depth of the application image. The icon element may further include @url attribute having HTTP URL information for download of an application image. example, the attribute may indicate that a corresponding application is an application according to ATSC or DVB.

The @controlCode attribute may include information for control of a state of a corresponding application. For example, the attribute may have information of autolaunch, kill, etc. The information may be used to control a state of a corresponding application.

The @visibility attribute may indicate whether a corresponding application is visible to a user and/or another application. Here, whether a corresponding application is visible to a user and/or another application may refer to whether the corresponding application is visible to a user interface as a wide meaning. The attribute may indicate whether the application is audible and sensory as well as whether the application is visible. In some embodiments, whether the corresponding application is audible to a user and so on through a speaker may be indicated separately by @audibility attribute. The attribute may be omitted.

The @serviceBound attribute may indicate whether a corresponding application is service-bounded. When the attribute has a true value, the corresponding application may be service-bounded and when the application has a false value, the application may not be service-bounded. The attribute may have a true value as a default value. The attribute may be omitted. When the attribute is omitted, this may mean that a corresponding application is service-bounded.

The @priority attribute may indicate relative priority compared with other applications. The @version attribute may indicate a version of a corresponding application. The @mhpVersion attribute may indicate a platform or version required for a corresponding application. The attribute may be omitted.

The @storageCapabilities attribute may indicate the amount of a storage required to cache a corresponding application. The attribute may be omitted. In some embodiments, the attribute may be used to indicate whether the corresponding application is cached.

The @trickModeTolerance attribute may indicate whether a corresponding application is compatible with a specific trick mode. Whether a corresponding application is compatible with a specific trick mode may refer to whether the application is capable of tolerating certain trick modes when the certain trick modes are executed. The trick mode may include pause, FF, slow mode, rewind, and so on. The attribute may be omitted. With regard to a broadcast service having the application enhancement, when a user has trick play with respect to the broadcast service, signaling may be performed so as to normally perform enhancement on trick-played basic program.

The applicationSpecificDescriptor element may have information required only for a specific type of application, differently from the aforementioned applicationDescriptior element. That is, information of the element may be dependent upon an application type. The element is not required depending on an application and, accordingly, the element may be omitted.

The applicationUsageDescriptor element may indicate a function of a corresponding application. For example, the element may indicate that a corresponding application is used in teletext. The element may not be required depending on an application type. The element may be omitted.

The applicationBoundary element may indicate URL information for definition of expansion of an application boundary of a corresponding application. The element may be omitted.

The applicationTransport element may indicate a protocol used to transmit a corresponding application. For example, the element may indicate that a corresponding application is transmitted through ROUTE, MMT, or HTTP. In some embodiments, the element may indicate a protocol used to transmit a corresponding AST. When the aforementioned method of transmitting service data according to the present invention is used, an allowable value of the element may be ROUTE, MMT, HTTP, or the like.

The applicationLocation element may indicate URL for providing a location for acquisition of a corresponding application. In some embodiments, the element may indicate a URL for acquisition of a corresponding application.

The atsc:Capabilities element may indicate capability information for significantly processing corresponding application/app-based enhancements. Here, the significant processing may refer to capability of a receiver side for significant rendering/decoding/reproducing, etc. In some embodiments, the capability information may be indicated by a preset capability code.

The atsc:liveEventSource element may provide information for receiving the aforementioned event in a live situation. For example, in the case of a broadcast program that is lively provided, an event may also be changed and transmitted in real time in order to provide enhancement depending on information of a broadcast program that is changed in real time. Differently from pre-produced content, the aforementioned operation may be required in a live situation. The element may provide information such as URL for transmission of an event in real time in this situation. The element may include @url attribute, @shortPollingPeriod attribute, and/or @targetDevice attribute.

The @url attribute may indicate URL for receiving an event in a live situation. The @shortPollingPeriod attribute may indicate a polling period when an event is acquired via short polling of a broadband. The @targetDevice attribute may indicate a target device of a corresponding live event. For example, PrimaryDevice (PD) or Companion Device (CD) may be a target device. The @shortPollingPeriod attribute and/or the @targetDevice attribute may be omitted.

The atsc:ContentItems element may include information on each content item to be used for a corresponding application. The atsc:ContentItems element may be present by as much as the number of content items. The atsc:ContentItems element may further include location element,@ContentLinkage attribute, @updatesAvailable attribute, @TFAvailable attribute,@contentSecurityCondition attribute, @availableInBroadcast attribute, @availableOnInet attribute, @playBackLengthInSecondes attribute, @playBackDelay attribute, @expiration attribute,@size attribute, @name attribute, and/or timeSlotInfo element.

The location element may indicate location information for acquisition of a corresponding content item. In some embodiments, the information may be URL format. The location element may be omitted or a plurality of location elements may be present.

The @ContentLinkage attribute may indicate an application that uses a corresponding content item. Signaling may be performed on a specific application based on information (EventStream element, emsg box, etc.) on an attribute value and an event to be described below. The attribute may provide, for example, an application identifier for a specific application or indicate a specific LCT session for transmitting the application data.

The @updatesAvailable attribute may indicate whether update of a corresponding content item is available. The attribute may have a true or false value. The @TFAvailable attribute may indicate whether a text fragment is present in a signaling channel for a corresponding content item.

The @contentSecurityCondition attribute may indicate a security state of a corresponding content item. The @availableInBroadcast attribute may indicate whether a corresponding content item is acquired through a broadcast network. The @availableOnInet attribute may indicate whether corresponding content item is acquired through the Internet.

The @playBackLengthInSecondes attribute may indicate a length of a corresponding content item during playback in a second unit. The attribute may be omitted. The @playBackDelay attribute may indicate playback delay of a corresponding content item. The attribute may be omitted. The @expiration attribute may indicate an expiration period of a corresponding content item. The attribute may be omitted. The @size attribute may indicate a size of a corresponding content item. The attribute may be omitted. The @name attribute may indicate a name of a corresponding content item. The attribute may be omitted.

The timeSlotInfo element may include time slot related information of a corresponding content item. The timeSlotInfo element may further include @time_slot_start attribute, @time_slot_length attribute, @acquisition_time attribute, @repeat_period attribute, and/or @slot_count attribute.

The @time_slot_start attribute may indicate a start time of a time slot. The time may be represent by GPS seconds from 00:00:00 UTC of Jan. 6, 1980. When the field has a value of 0, the field may indicate that a time slot is initiated from the unknown past.

The @time_slot_length attribute may indicate a length of a time slot in a minute unit.

The @acquisition_time attribute may indicate a minimum time interval length by which transmission of at least one content item is ensured. The time interval may be represented in a minute unit. Here, the time interval may be assumed to be initiated from an arbitrary time in a time slot and may include end of a time slot. If a single large content item is being transmitted repeatedly during the time slot, this will be the time it takes to transmit a single instance of the content item. If a number of small content items are being transmitted in a carousel, this will be the carousel cycle time.

The @repeat_period attribute may represent a repetition period of a time slot in a minute unit.

The @slot_count attribute may indicate a number of times of a time slot. The attribute may indicate a number of times from a time slot at a time indicated by the @time_slot_start attribute. A value of zero for slot_count shall indicate the repetition shall be assumed to continue indefinitely.

The Application element may directly include @ContentLinkage attribute and/or timeSlotInfo element. That is, the @ContentLinkage attribute and/or the timeSlotInfo element may be included in both the Application element and the atsc: ContentItems element.

Among attributes of the Application element, the @applicationIdentifier attribute may indicate an identifier of a corresponding application. The value may be a globally unique value.

The @atsc:serviceId attribute may indicate a service identifier of a service related to a corresponding application.

The @atsc:protocolVersion attribute may indicate a protocol version of a corresponding application. In some embodiments, the corresponding field may be divided into two fields indicating a major protocol version and a minor protocol version. Alternatively, the field may simultaneously provide both the major/minor protocol versions.

The ApplicationList element may include @ASTVersionNumber attribute, @timeSpanStart attribute, and/or @timeSpanLength attribute as well as a plurality of Application elements.

The @ASTVersionNumber attribute may indicate a version number of an entire corresponding AST. In some embodiments, a corresponding field may be divided into two fields indicating the major protocol version and the minor protocol version. Alternatively, the field may simultaneously provide both the major/minor protocol versions.

The @timeSpanStart attribute may indicate start of a time interval covered by a corresponding AST instance. The AST may be divided into a plurality of instances and transmitted and each AST instance may include signaling information of each time interval.

The @timeSpanLength attribute may indicate a length of a time interval covered by a corresponding AST instance. The time interval covered by the corresponding AST instance along with a value of the @timeSpanStart attribute may be calculated.

Each of the fields of the AST according to the aforementioned embodiments may be omitted or changed. In some embodiments, additional fields may be added to the AST. Fields of the AST may be replaced with fields having the same/similar meaning.

The aforementioned AST may be transmitted through a broadcast network or a broadband.

When the AST is transmitted through a broadcast network, an AST for application enhancements may be transmitted through a service signaling channel of a broadcast service related to corresponding application enhancement. Here, the service signaling channel of a service may refer to a path for transmitting the aforementioned SLS. For example, in the case of an ROUTE, an LCT transfer session specified with tsi=0 may transmit an AST through a dedicated signaling channel. In the case of an MMT, MMTP packet flow specified with packet_id=00 may transmit the AST through a dedicated signaling channel.

When the AST is transmitted through a broadband, the AST may be acquired via query. The query may be generated using base URL information in the aforementioned SLT. The base URL may be URL information for acquisition of the AST. Here, the SLT may be SLT including bootstrap information on a broadcast service related to the corresponding AST. In the case of a scenario using a watermark, the base URL may be acquired through the watermark or acquired through an Auto ContentRecognition (ACR) procedure using the watermark.

FIG. 12 is a diagram illustrating an event message table (EMT) according to an embodiment of the present invention.

As described above, actions to be performed by applications may be initiated by notifications transmitted through a broadcast network/broadband. The notifications may be referred to as "event". According to the context, an operation, an action, or an operated state of applications started by these notifications may also be referred to as an event. In addition, actions to be performed by applications may also be referred to as an event.

The events may be transmitted through a broadcast network or a broadband. In this case, each event and actions by an event needs to be synchronized with a basic broadcast service/broadcast program. The present invention proposes a transmitting method and synchronization method of an event.

The case in which an event is transmitted through a broadcast network will be described below.

When the event is transmitted through a broadcast network, the event may be transmitted as a DASH event. In this case, the event may be transmitted in the form of EventStream element or emsg box. When an event is transmitted to the EventStream element, the event may be transmitted in the form of EventStream element indicated by a period element of MPD. When an event is transmitted in the form of emsg box, the event may be transmitted to an emsg box indicated in Representation segments.

Two event transfer mechanisms may be used together. For example, one event stream may include some events transmitted to the EventStream element and/or other events transmitted through the emsg box.

Events transmitted through the EvenstStream element may correspond to events to be transmitted to a receiver side during a time interval corresponding to a period. That is, the MPD may be service signaling information of a service and may provide signaling information in a time interval unit of a service referred to as a period. Signaling information on the period may include an MPD Period element and the period element may include an EventStream element. The EventStream element may provide signaling (event) required for an operation for applications during a corresponding period of a corresponding service.

The EventStream element may be a list of Event elements. Each EventStream element may have schemeIdUri attribute and/or value attribute. The two attributes may indicate a type of events in the EventStream. In some embodiments, the two attributes may identify events. Here, the schemeIdUri attribute and/or the value attribute may use a pre-defined value. Alternatively, a service provider may additionally define and use a value of the schemeIdUri attribute and/or the value attribute. An "owner" of the schemeIdUri attribute needs to uniquely define the schemeIdUri attribute and needs to define corresponding value attribute and event semantics. The value information may be dependent upon an application and may be used to identify a specific event stream in one service.

The EventStream element may further include timescale attribute. The attribute may indicate an event presentation time and reference time scale for duration.

Event sub elements of the EventStream element may each include presentationTime attribute, duration attribute, and/or id attribute. The presentationTime attribute may indicate start time of each event, the duration attribute may indicate duration time of each event, and the id attribute may indicate an identifier of each event. In the context, the event may refer to an action of an application initiated by an event (notification) and a phenomenon (pop up window, etc.) that occurs in response to the action.

The Event sub element may not have data for a corresponding event. However, in some embodiments, the Event element may have additional data element and attribute. The data element/attribute may provide data required for execution of an action initiated in response to an event.

In some embodiments, a plurality of EventStream elements with different types may be present in one period.

When an event is transmitted in the form of emsg box, the event may be transmitted in the emsg box indicated in Representation segments, as described above. In this case, the InbandEventStream element of Representation of MPD may signal whether an event is present in the emsg box in segments.

The InbandEvent element may include schemeIdUri and/or value. The two fields may indicate a type of an event in the emsg box. In some embodiments, the two fields may be used to identify an event.

The InbandEvent element may further include a timescale field. The field may indicate a reference time scale related to an event.

The InbandEvent element may further include presentation_time_delta information, event_duration information, and/or id information. The presentation_time_delta information may indicate start time of a corresponding event. Here, the start time may be represented as a relative value at the start time of the corresponding Representation. The event_duration information may indicate duration time of a corresponding event. The id information may identify a corresponding event instance.

The InbandEvent element may further optionally include message_data information. The message_data information may provide data required to execute an action initiated by a corresponding event.

The case in which an event is transmitted through a broadband will be described below.

With regard to transmission of an event through a broadcast network, batch delivery as a batch via MPD and incremental delivery using an emsg box have been described above. Similarly, with regard to transmission of an event through a broadband, batch delivery and incremental delivery may be proposed.

When an event is transmitted via batch delivery through a broadband, events may be transmitted through an event stream table (EST). In some embodiments, the EST may also be referred to as an event message table (EMT). The EST may be an XML document and may include an EventStreamTable element as a root element.

The EventStreamTable element may be a list of the EventStream element. Each of the EventStream elements may be the same as the EventStream element in event transmission through the aforementioned broadcast network. The list of the EventStream element may include all event streams for one service.

The illustrated EMT may be EMT (EST) according to another embodiment of the present invention. The EMT may include @mpdId attribute, @periodId attribute, and EventStream element.

The @mpdId attribute may be an identifier of MPD related to events described by the corresponding EMT. The MPD may be used as a time reference of corresponding events.

The @periodId attribute may be an identifier of a period of MPD related to events of a corresponding EMT. The period may be used as a time reference of corresponding events.

The fields in the EventStream element are the same as the aforementioned fields. Here, data of the Event element may have a value appropriate for a type thereof depending on a value of the @schemeIdURi and/or the @value. The @presentationTime attribute may represent a start time of an event as a relative value to a start time of a period and the period may be identified by the @mpdId and the @periodId attribute.

The EST may be acquired in response to a query as described above. The query may be generated based on base URL information in the SLT. This is the same as the above description.

When events are transmitted via incremental delivery through a broadband, the events may be separately transmitted through a live event server. Polling may be periodically performed on the live event server and when an event to be transmitted in the period is present, an event server may transmit the event to a receiver. Information such as URL of the live event server and a polling period may be transmitted to a receiver by the aforementioned AST and EST or other signaling objects.

In this case, the transmitted event may have the same format as format of emsg box in the case of transmission of an event using the aforementioned emsg box. In some embodiments, signaling information corresponding to the aforementioned InbandEvent element may be transmitted together during transmission of a live event.

The schemeIdUri information and the value information may correspond to targetURI and eventName arguments with regard to API for addition and deletion of a Stream Event listener for an event stream. Events of each of the aforementioned embodiments may further include optional data attribute. The data attribute may provide data used to execute an action initiated by the corresponding event. The data attribute may correspond to data attribute of a StreamEvent interface returned to a listener registered when an event occurs.

In the case of transmission of an NRT content item, an NRT transmitting method of ATSC may be used. In this case, the AST may be used instead of NRT-IT and a content item to be transmitted by the AST may be identified. When an application is not listened by the AST, broadband delivery of an NRT content item may also be initiated.

In the case of an on-demand content item, the item may be transmitted through a broadband. Broadband delivery of the on-demand content item may be initiated.

Synchronization of an application will be described below.

Synchronization of an application may be required in various aspects. For example, actions of an application need to be synchronized with scheduled audio/video services. In addition, an application may be initiated and stopped depending on the scheduled audio/video services. With regard to playback of recorded content, NRT content, and so on as well as a basic broadcast service, an application and actions of the application need to be synchronized. In addition, the application may also be initiated and stopped depending on the recorded content, the NRT content, and so on for enhancement of an effective user experience.

It may be necessary to synchronize an application in a companion device (CD) with audio/video content that is played back in a PD in order to effectively and provide application enhancement provided by the CD.

The user experience will be described below.

In some embodiments, a user may control operations of an application for effective application enhancement. This is because, when control is not possible, enhancement may impede watching instead. According to an exemplary embodiment, user acceptance may be used. The user may collectively accept all services and any specific services. In addition, the user may accept applications of each service or services case by case.

In the case of user acceptance case by case, application notification needs to be pre-displayed prior to activation of the application. Through the notification, the user acceptance for activation of the application may be obtained. The application may be blocked until acceptance is achieved.

Format and location of notification for acceptance may be determined by a device manufacturer. An actual user interface for acceptance may also be determined by the device manufacturer. In these cases, specific format and so on may be proposed by a specific entity in an industrial aspect.

The notification for acceptance may be time out or dismissed by a user. Thereby, even if a user does not immediately determine to accept activation of an application, interference in watching of a user may be continuously prevented by the notification. However, even if notification is time out or dismissed, the user may activate or block an application via setting and so on. The user may terminate the activated application. In this case, even if signaling for activation of the application is received, the application may be continuously blocked.

Action synchronization and action parameters will be described below.

Download of an application, activation of an application, termination of an application, and/or a specific action of an application need to be synchronized with a basic broadcast program and so on.

In the case of actions of an application, action parameters may be required to perform the action. Information of the parameters may be performed. The action parameter may include an application identifier parameter for identifying an application related to an action, a time parameter indicating a time at which an action is to be performed, and/or a synchronization level parameter of a synchronization level of an action. Here, the time parameter may indicate a start time of an action as a relative value to a time base and a media time line. Here, the synchronization level parameter may indicate a synchronization level of program level sync, sync less than 2 seconds, lip sync, frame sync, and so on.

In the case of an action related to download of an application, the action may further include an action parameter of a target device and/or an action parameter of a jitter interval. The action parameter of a target device may include information on whether a downloaded application is for PD or CD. The action parameter of the jitter interval may include jitter interval related information for fetching of an application.

In the case of an action of initiation of an application, the action may further include an action parameter of a target device and/or an action parameter of a jitter interval. The action parameter of the target device may include information on whether an initiated application is for a PD or a CD.

As described above, the action parameter may also include an action parameter for providing data required to execute the application. The action parameter may include data required to execute the corresponding action.

Figure 13:
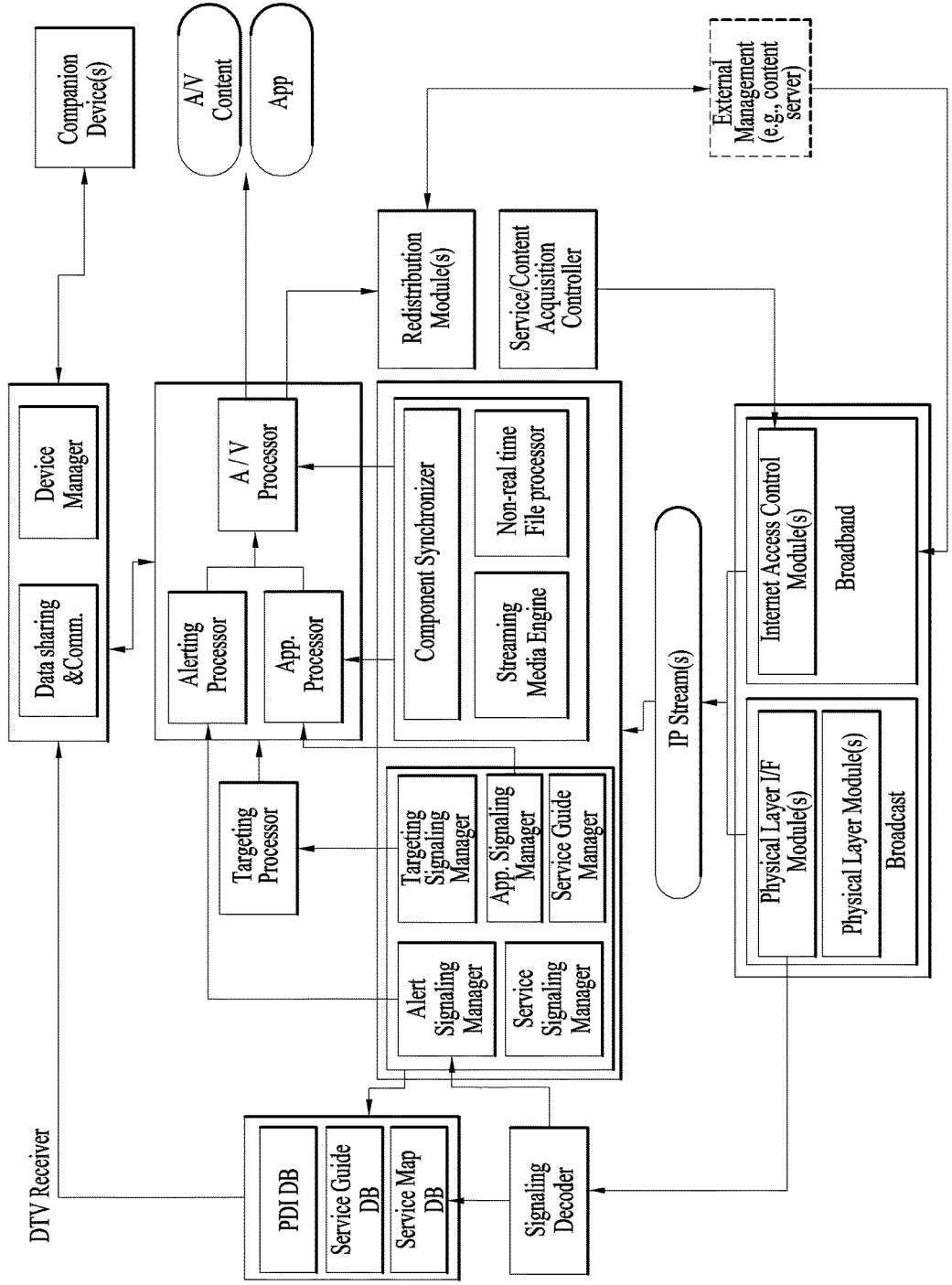
FIG. 13 is a block diagram illustrating a hybrid broadcast reception apparatus according to an embodiment of the present invention.

FIG. 13 is a block diagram illustrating a hybrid broadcast reception apparatus according to an embodiment of the present invention.

A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) may receive a broadcast related signal through a terrestrial broadcast channel, process the received signal, convert the processed signal into an appropriate format and deliver the signal to the physical layer I/F module(s).

The physical layer I/F module(s) may acquire an IP datagram from information obtained from the physical layer module. In addition, the physical layer I/F module may convert the acquired IP datagram into a specific frame (e.g., RS frame, GSE, etc.).

The service/content acquisition controller may perform a control operation for acquisition of services, content and signaling data related thereto through broadcast channels and/or broadband channels.

The Internet access control module(s) may control receiver operations for acquiring service, content, etc. through broadband channels.

The signaling decoder may decode signaling information acquired through broadcast channels.

The service signaling manager may extract signaling information related to service scan and/or content from the IP datagram, parse the extracted signaling information and manage the signaling information.

The service guide manager may extract announcement information from the IP datagram, manage a service guide (SG) database and provide a service guide.

The application signaling manager may extract signaling information related to application acquisition from the IP datagram, parse the signaling information and manage the signaling information.

The alert signaling parser may extract signaling information related to alerting from the IP datagram, parse the extracted signaling information and manage the signaling information.

The targeting signaling parser may extract signaling information related to service/content personalization or targeting from the IP datagram, parse the extracted signaling information and manage the signaling information. In addition, the targeting signaling parser may deliver the parsed signaling information to the targeting processor.

The streaming media engine may extract audio/video data for A/V streaming from the IP datagram and decode the audio/video data.

The non-real time file processor may extract NRT data and file type data such as applications, decode and manage the extracted data.

The component synchronizer may synchronize content and services such as streaming audio/video data and NRT data.

The targeting processor may process operations related to service/content personalization on the basis of the targeting signaling data received from the targeting signaling parser.

The application processor may process application related information and downloaded application state and display parameters.

The A/V processor may perform audio/video rendering related operations on the basis of decoded audio/video data and application data.

The device manager may perform connection and data exchange with external devices. In addition, the device manager may perform operations of managing external devices connectable thereto, such as addition/deletion/update of the external devices.

The data sharing and communication unit may process information related to data transmission and exchange between a hybrid broadcast receiver and external devices. Here, data that can be transmitted and exchanged between the hybrid broadcast receiver and external devices may be signaling data, A/V data and the like.

The redistribution module(s) may acquire information related to future broadcast services and content when the broadcast receiver cannot directly receive terrestrial broadcast signals. In addition, the redistribution module may support acquisition of future broadcast services and content by future broadcast systems when the broadcast receiver cannot directly receive terrestrial broadcast signals.

The companion device(s) may share audio, video or signaling data by being connected to the broadcast receiver according to the present invention. The companion device may be an external device connected to the broadcast receiver.

The external management module may refer to modules for broadcast services/content provision. For example, the external management module can be a future broadcast services/content server. The external management module may be an external device connected to the broadcast receiver.

Figure 14:
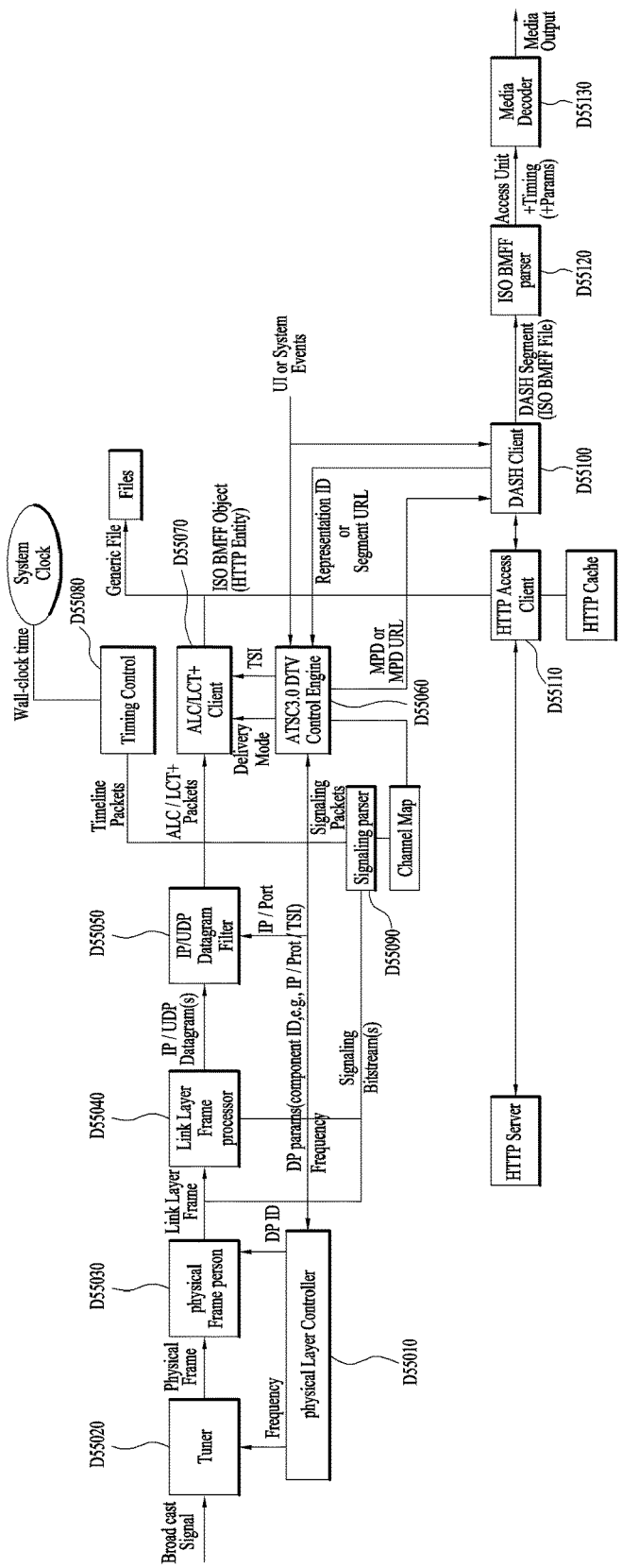
FIG. 14 is a block diagram illustrating a hybrid broadcast receiver according to an embodiment of the present invention.

FIG. 14 is a block diagram illustrating a hybrid broadcast receiver according to an embodiment of the present invention.

The hybrid broadcast receiver may receive hybrid broadcast services through interworking of terrestrial broadcasting and a broadband network in DTV services of a future broadcast system. The hybrid broadcast receiver may receive broadcast audio/video (A/V) content transmitted through terrestrial broadcasting and receive enhancement data related thereto or part of broadcast A/V content through the broadband network in real time. In the specification, the broadcast A/V content can be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 digital TV (DTV) control engine D55060, an ALC/LCT+ client D55070, a timing controller D55080, a signaling parser D55090, a dynamic adaptive streaming over HTTP (DASH) client D55100, an HTTP access client D55110, an ISO base media file format (BMFF) parser D55120 and/or a media decoder D55130.

The physical layer controller D55010 may control operations of the tuner D55020 and the physical frame parser D55030 using radio frequency (RF) information of a terrestrial broadcast channel that the hybrid broadcast receiver intends to receive.

The tuner D55020 may receive a broadcast related signal through a terrestrial broadcast channel, process the received signal and convert the signal into an appropriate format. For example, the tuner D55020 may convert a received terrestrial broadcast signal into physical frames.

The physical frame parser D55030 may parse a received physical frame and acquire a link layer frame through processing related thereto.

The link layer parser D55040 may execute related operations for acquisition of link layer signaling or an IP/UDP datagram from the link layer frame. The link layer parser D55040 may output at least one IP/UDP datagram.

The IP/UDP datagram filter D55050 may filter a specific IP/UDP datagram from the received at least one IP/UDP datagram. That is, the IP/UDP datagram filter D55050 may selectively filter an IP/UDP datagram, which is selected by the ATSC 3.0 DTV control engine, from the at least one IP/UDP datagram output from the link layer parser D55040. The IP/UDP datagram filter D55050 may output an application layer transport protocol packet such as ALC/LCT+.

The ATSC 3.0 DTV control engine D55060 may serve as an interface between modules included in the hybrid broadcast receiver. In addition, the ATSC 3.0 DTV control engine D55060 may deliver parameters necessary for each module to each module and control operation of each module through the parameters. In the present invention, the ATSC 3.0 DTV control engine D55060 may deliver media presentation description (MPD) and/or an MPD URL to the DASH client D55100. In addition, the ATSC 3.0 DTV control engine D55060 may transfer a delivery mode and/or a transport session identifier (TSI) to the ALC/LCT+ client D55070. Here, the TSI may indicate an identifier of a session in which a transport packet including a signaling message such as MPD or MPD URL related signaling is transmitted, for example, ALC/LCT+ session corresponding to an application layer transport protocol or FLUTE session. In addition, the TSI may correspond to an asset ID of an MMT.

The ALC/LCT+ client D55070 may generate one or more ISO base media file format (ISO MMFF) objects by processing an application layer transport protocol packet such as ALC/LCT+ and collecting and processing a plurality of packets. The application layer transport protocol packet may include an ALC/LCT packet, an ALC/LCT+ packet, a ROUTE packet and/or an MMTP packet.

The timing controller D55080 may process a packet including system time information and control a system clock according thereto.

The signaling parser D55090 may acquire and parse DTV broadcast service related signaling, and generate and manage a channel map on the basis of the parsed signaling. In the present invention, the signaling parser may parse MPD or MPD related information extended from signaling information.

The DASH client D55100 may execute operations related to real-time streaming or adaptive streaming. The DASH client D55100 may receive DASH content from an HTTP server through the HTTP access client D55110. The DASH client D55100 may process a received DASH segment and output an ISO BMFF object. In the present invention, the DASH client D55100 may deliver a fully qualified representation ID or a segment URL to the ATSC 3.0 DTV control engine D55060. Here, the fully qualified representation ID may refer to an ID corresponding to a combination of an MPD URL, period@id and representation@id, for example. In addition, the DASH client D55100 may receive the MPD or MPD URL from the ATSC 3.0 DTV control engine D55060. The DASH client D55100 may receive a desired media stream or DASH segment from the HTTP server using the received MPD or MPD URL. In the specification, the DASH client D55100 may be referred to as a processor.

The HTTP access client D55110 may request that the HTTP server provide specific information, receive a response to the request from the HTTP server and process the response. Here, the HTTP server may process the request received from the HTTP access client and provide a response to the request.

The ISO BMFF parser D55120 may extract audio/video data from the ISO BMFF object.

The media decoder D55130 may decode the received audio/video data and perform processing for presentation of the decoded audio/video data.

To provide hybrid broadcast services through interworking of a terrestrial broadcast network and a broadband network according to the hybrid broadcast receiver of the present invention, MPD needs to be extended or modified. The aforementioned terrestrial broadcast system may transmit extended or modified MPD and the hybrid broadcast receiver may receive content through broadcasting or a broadband network using the extended or modified MPD. That is, the hybrid broadcast receiver may receive the extended or modified MPD through terrestrial broadcasting and receive content through terrestrial broadcasting or a broadband network on the basis of the MPD. A description will be given of elements or attributes that need to be additionally included in the extended or modified MPD, compared to the conventional MPD. In the following, the extended or modified MPD is referred to as MPD.

The MPD may be extended or modified to represent ATSC 3.0 service. The extended or modified MPD may additionally include MPD@anchorPresentationTime, Common@presentable, Common.Targeting, Common.TargetDevice and/or Common@associatedTo.

MPD@anchorPresentationTime may indicate a presentation time anchor of segments included in the MPD, that is, base time. In the following, MPD@anchorPresentationTime may be used as effective time of the MPD. MPD@anchorPresentationTime may indicate the earliest playback time from among segments included in the MPD.

The MPD may further include common attributes and elements. The common attributes and elements may be applied to AdaptionSet and Representation in the MPD. Common@presentable may indicate that media described by the MPD is a presentable component.

Common.Targeting may indicate targeting properties and/or personalization properties of the media described by the MPD.

Common.TargetDevice may indicate a target device or target devices of the media described by the MPD.

Common@associatedTo may indicate adaptationSet and/or representation related to the media described by the MPD.

In addition, MPD@id, Period@id and AdaptationSet@id included in the MPD may be necessary to specify media content described by the MPD. That is, the DASH client may specify content to be received on the basis of the MPD using MPD@id, Period@id and AdaptationSet@id and signal the content to the ATSC 3.0 DTV control engine. The ATSC 3.0 DTV control engine may receive the corresponding content and deliver the content to the DASH client.

Figure 15:
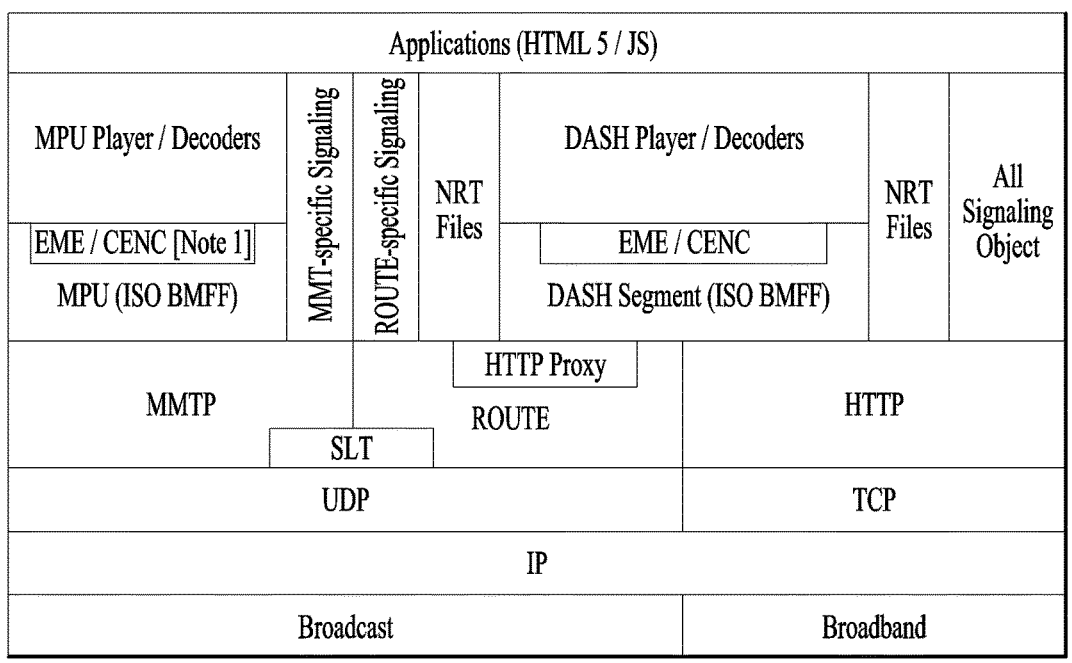
FIG. 15 shows a protocol stack of a next generation hybrid broadcast system according to an embodiment of the present invention.

FIG. 15 shows a protocol stack of a next generation hybrid broadcast system according to an embodiment of the present invention.

Referring to the figure, a conceptual model of a broadcast system according to an embodiment of the present invention is shown. Hereinafter, two methods of transmitting a broadcast service are defined.

The first method is based on the MPEG Media Transport (MMT) protocol, and the broadcast system may transmit a Media Processing Unit (MPU) using the MMT Protocol (MMTP).

The MMT protocol may be used for transmission of broadcast program elements. Media Processing Units (MPUs) and MPEG DASH segments may be used as transport, media encapsulation, and synchronization formats for the MMT protocol and the ROUTE protocol, respectively. Non-real-time content including Non-Real Time (NRT) media, Electronic Service Guide (ESG) data, and other files may be transmitted via the ROUTE protocol.

The second method is based on MPEG DASH, and the broadcast system may transmit a DASH segment using the ROUTE (Real-time Object Delivery over Unidirectional Transport) protocol.

The ROUTE protocol may be used to transmit streaming media and/or non-real-time media as well as files and/or signaling metadata in the broadcast stream. Transmitting services over broadband means that one or more program components are transmitted over a broadband network rather than over a broadcast network. In the broadband network, the DASH-IF profile of MPEG DASH may be used over HTTP/TCP/IP. Media files in ISO Base Media File Format (BMFF) may be used as formats of delivery, media encapsulation, and/or synchronization for broadcast and/or broadband transmission.

Signaling may be transmitted using the MMT or ROUTE protocol, and the bootstrap signaling information for acquiring the signaling transmitted through MMT or ROUTE is provided in a service list table (SLT).

Figure 16:
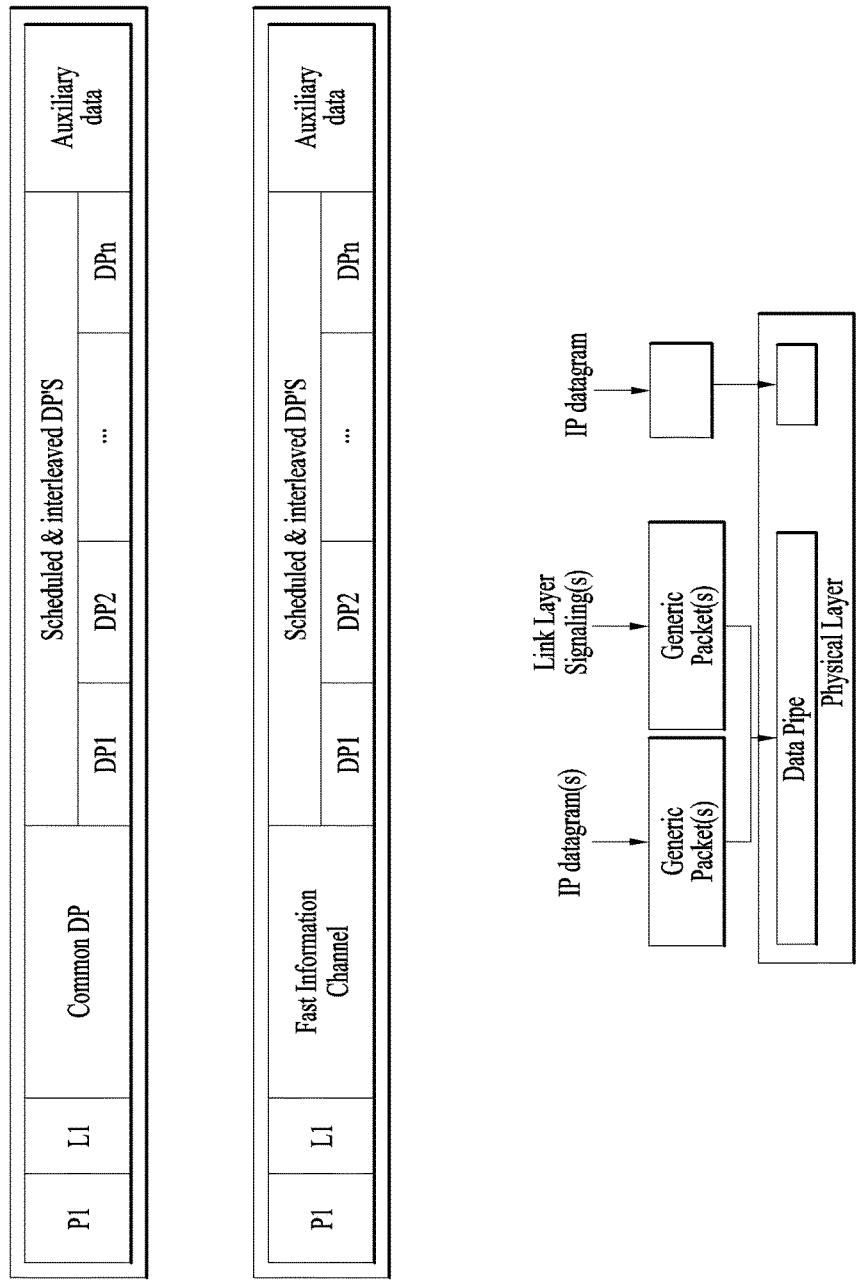
FIG. 16 illustrates a structure of a transport frame delivered to a physical layer of a future broadcast transmission system according to an embodiment of the present invention.

FIG. 16 illustrates a structure of a transport frame delivered to a physical layer of the future broadcast transmission system according to an embodiment of the present invention.

The future broadcast system may transmit a transport frame using broadcast. In the figure, P1 located at the front of the transport frame may refer to a symbol including information for transport signal detection. P1 may include tuning information and a receiver may decode a part L1 following P1 on the basis of a parameter included in the symbol P1. The broadcast system may include, in the part L1, information about transport frame configuration and characteristics of data pipes. That is, the receiver may obtain the information about the transport frame configuration and characteristics of data pipes by decoding the part L1. In addition, the receiver may acquire information that needs to be shared between DPs through a common DP. According to an embodiment, the transport frame may not include the common DP.

Components such as audio, video and data in the transport frame are included in an interleaved DP region composed of DP1 to DPn and transmitted. Here, DPs through which components constituting each service (channel) are transmitted may be signaled through L1 or a common PLP.

In addition, the future broadcast system may transmit information for rapidly acquiring information about services included in a transport frame. That is, the future broadcast system may enable a future broadcast receiver to rapidly acquire broadcast service and content related information included in a transport frame. When services/content generated by one or more broadcasting stations are present in the corresponding frame, the future broadcast system may enable the receiver to efficiently recognize the services/content according to the broadcasting stations. That is, the future broadcast system may include, in a transport stream, service list information about services included in the transport stream, and transmit the transport stream including the service list information.

When an additional channel, for example, a fast information channel (FIC) is present, the broadcast system may transmit broadcast service related information through the additional channel such that the receiver can rapidly scan broadcast services and content in a corresponding frequency. As shown in the middle of FIG. 16, the broadcast system may include, in the transport stream, information for broadcast service scan and acquisition and transmit the same. Here, the region including the information for broadcast service scan and acquisition may be referred to as an FIC. The receiver may acquire information about broadcast services generated and transmitted by one or more broadcasting stations and easily and rapidly scan broadcast services available therein using the information.

Figure 17:
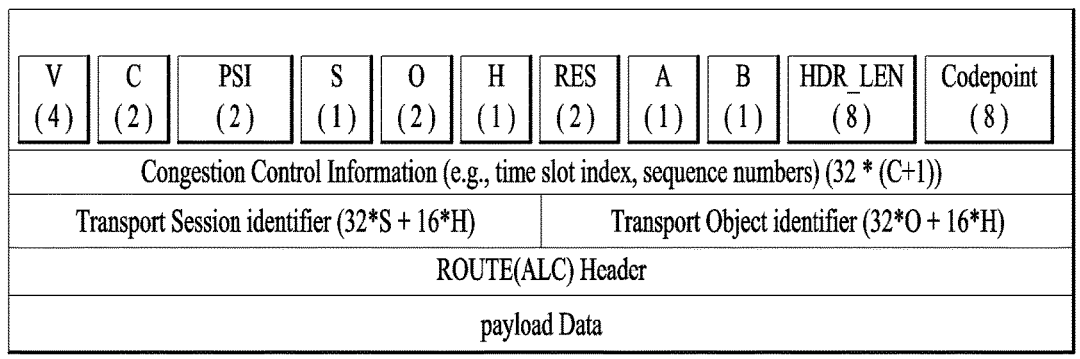
FIG. 17 illustrates a transport packet of an application layer transport protocol according to an embodiment of the present invention.

In addition, a specific DP included in the transport stream may serve as a base DP capable of rapidly and robustly delivering signaling about broadcast services and content transmitted in the corresponding transport frame. Data transmitted through each DP of the transport frame of the physical layer is as shown in the lower part of FIG. 16. That is, link layer signaling or an IP datagram may be encapsulated in a generic packet in a specific format and then transmitted through a DP. Here, the IP datagram may include signaling data. Link (low) layer signaling can include signaling related to fast service scan/acquisition, context information of IP header compression and emergency alert FIG. 17 illustrates a transport packet of an application layer transport protocol according to an embodiment of the present invention.

An application layer transport session may be composed of a combination of an IP address and a port number. When the application layer transport protocol corresponds to ROUTE, a ROUTE session may be composed of one or more layered coding transport (LCT) sessions. For example, when a single media component (e.g., DASH representation) is delivered through a single LCT transport session, one or more media components may be multiplexed and delivered through a single application transport session. Furthermore, one or more transport objects may be delivered through a single LCT transport session, and each transport object may be a DASH segment associated with DASH representation delivered through the transport session.

For example, when the application layer transport protocol is an LCT based protocol, a transport packet may be configured as follows. The transport packet may include an LCT header, a ROUTE header and payload data. A plurality of fields included in the transport packet is as follows.

The LCT header may include the following fields. A version field V may indicate version information of the corresponding transport protocol packet. A field C may indicate a flag related to the length of a congestion control information field which will be described below. A field PSI may indicate protocol-specific information, that is, information specific to the corresponding protocol. A field S may indicate a flag associated with the length of a transport session identifier (TSI) field. A field O may indicate a flag associated with the length of a transport object identifier (TOI) field. A field H may indicate whether a half-word (16 bits) is added to the lengths of the TSI field and the TOI field. A field A (close session flag) may indicate that a session is closed or closure of the session is imminent. A field B (close object flag) may indicate that an object being transmitted is closed or closure of the object is imminent. A code point field may indicate information related to encoding or decoding of a payload of the relevant packet. For example, payload type may correspond to the information. A congestion control information field may include information related to congestion control. For example, the information related to congestion control may be a current time slot index (CTSI), a channel number or a packet sequence number in the relevant channel. A transport session identifier field may indicate a transport field identifier. A transport object identifier field may indicate an identifier of an object transmitted through the transport session.

A ROUTE (ALC) header may include additional information of the preceding LCT header, such as a payload identifier related to a forward error correction scheme.

Payload data may indicate a data part of the payload of the packet.

FIG. 18 illustrates a method for transmitting signaling data by the future broadcast system according to an embodiment of the present invention.

Signaling data of the future broadcast system may be transmitted as shown in the figure. To enable the receiver to support fast service/content scan and acquisition, the future broadcast transmission system may transmit signaling data with respect to a broadcast service delivered through a physical layer frame, via a fast information channel (FIC). In the specification, the FIC may refer to information about a service list. Unless an additional FIC is present, the signaling data may be delivered through a path through which link layer signaling is delivered. That is, signaling information including information about services and components (audio and video) thereof may be encapsulated in an IP/UDP datagram and transmitted through one or more DPs in the physical layer frame. According to an embodiment, signaling information about services and service components may be encapsulated in an application layer transport packet (e.g. a ROUTE packet or an MMTP packet) and transmitted.

The upper part of FIG. 18 illustrates an example of delivering the aforementioned signaling data through an FIC or one or more DPs. That is, signaling data for supporting fast service scan/acquisition may be delivered through the FIC and signaling data including detailed information about services may be encapsulated in an IP datagram and transmitted through a specific DP. In the specification, the signaling data including detailed information about services may be referred to as service layer signaling.

The middle part of FIG. 18 illustrates an example of delivering the aforementioned signaling data through an FIC and one or more DPs. That is, signaling data for supporting fast service scan/acquisition may be delivered through the FIC and signaling data including detailed information about services may be encapsulated in an IP datagram and transmitted through a specific DP. In addition, part of signaling data including information about a specific component included in a service may be delivered through one or more transport sessions in the application layer transport protocol. For example, part of the signaling data may be delivered through one or more transport sessions in a ROUTE session.

The lower part of FIG. 18 illustrates an example of delivering the aforementioned signaling data through an FIC and one or more DPs. That is, signaling data for supporting fast service scan/acquisition may be delivered through the FIC and signaling data including detailed information about services may be delivered through one or more sessions in a ROUTE session.

FIG. 19 is a diagram showing a section of a service list table (SLT) according to an embodiment of the present invention.

The SLT supports fast channel scanning and service acquisition by including certain information for each service in the broadcast stream. The information included in the SLT supports initial service selection by channel number and/or channel up/down selection, and includes information needed to present a meaningful service list to a viewer and/or information necessary for identifying the position of service layer signaling (service level signaling (SLS)) for each listed service.

The SLT according to an embodiment of the present invention may include table_id information, SLT_section_version information, SLT_section_length information, SLT_protocol_version information, broadcast_stream_id information, SLT_section_number information, last_SLT_section_number information, num_services information, information, service_id information, SLT_service_seq_number information, protected information, major_channel_number information, minor_channel_number information, service_category information, short_service_name_length information, the short_service_name( ) element, broadcast_signaling_present information, SLS_source_IP_address_present information, broadband_access_required information, SLS_protocol_type information, SLS_PLP_ID information, SLS_destination_IP_address information, SLS_destination_UDP_port information, SLS_source_IP_address information, SLS_protocol_version information, num_ext_length_bits information, reserved1 information, ext_length information, the reserved2( ) element, num_service_level_descriptors information, the service_level_descriptor( ) element, num_SLT_level_descriptors information, SLT_level_descriptor( ) element, and/or reserved3 information.

The table_id information is information for identifying the table. The table_id information may have a value for identifying the current table as an SLT.

The SLT_section_version information is information indicating the version number of the section of the SLT. The SLT_section_version information may be incremented by 1 when there is a change in the information transmitted by the SLT section. When the value of the SLT_section_version information reaches the maximum value of '1111b', the subsequent increase may return the SLT_section_version information to '0'.

The SLT_section_length information indicates the number of bytes of the instance of the SLT section, starting from the information following the SLT_section_length information.

The SLT_protocol_version information indicates the version of the structure of this SLT. The upper four bits of the SLT_protocol_version information may indicate the major version, and the lower four bits may indicate the minor version.

The broadcast_stream_id information is information for identifying the entire broadcast stream. The broadcast_stream_id information may have a unique value within a geographic area (e.g., North America).

The SLT_section_number information is information indicating the number of the section, which starts from 0. The SLT may include a plurality of SLT sections.

The last_SLT_section_number information is information for identifying a section having the greatest value among the values of the SLT_section_number information of the SLT to which the current section belongs. For example, if the value of the last_SLT_section_number information is '0010b', the SLT may include a total of three sections and SLT_section_number information having a value of '0000b', '0001b', or '0010b'.

The num_services information is information indicating the number of services described by the SLT section.

The service_id information is information that uniquely identifies a service within a broadcast area or a range of a broadcast stream.

The SLT_service_seq_number information may indicate the sequence number of the service information having a service identifier having the same value as that of the service_id information in the corresponding iteration of the "for" loop. The SLT_service_seq_number information may start from "0" for each service and be incremented by "1" every time the SLT service information for the service identified by the service_id information is changed. If the SLT service information for a specific service is not changed when compared with the previous service information having SLT_service_seq_number information of a specific value, the SLT_service_seq_number information may not increase. The SLT_service_seq_number information may be returned to "0" once it reaches the maximum value.

Protected information is information for identifying whether one or more components needed for meaningful presentation have been protected. If the value of this information is set to '0', this may indicate that there is no protected component among the components needed for meaningful presentation of the service.

The major_channel_number information is information indicating a 'major' channel number associated with a service defined by a service element. Each service will be associated with a major channel number and a minor channel number. Along with the minor channel number, the major channel number may correspond to a user's reference number for a virtual channel. The value of the major_channel_number information will be set such that there is no redundant pair of major_channel_number information and minor_channel_number information in the service list.

The minor_channel_number information is information indicating a 'minor' or 'sub' channel number. The minor_channel_number information and the major_channel_number information constitute a two-part channel number, and the minor_channel_number information represents the right part or the second part of the two-part channel number.

The service_category information is information indicating a category of the service. For example, if the value of the service_category information is '0x00', this indicates that the category of the service is not identified. If the value of the service_category information is '0x01', this indicates that the service corresponds to the linear A/V service. If the value of the service_category information is '0x02', this indicates that the service corresponds to the linear audio service. If the value of the service_category information is '0x03', this indicates that the service corresponds to the application-based service. If the value of the service_category information is in a range from '0x04' to '0x0F', information may be reserved for future use.

The short_service_name_length information is information indicating the length of the short_service_name( ) element in bytes. If the short_service_name( ) element is not provided, the short_service_name_length information may be set to '0'.

The short_service_name( ) element may contain information indicating the short name of the service. Each character in the short service name may be encoded in UTF-8.

If the broadcast_signaling_present information is set to "1", there may be SLS_PLP_ID information, SLS_destination_IP_address information, SLS_destination_UDP_port information, SLS_source_IP_address information, SLS_protocol_version information, num_ext_length_bits information, reserved1 information, ext_length information, and/or a reserved2( ) element. If the broadcast_signaling_present information is set to "0", SLS_PLP_ID information, SLS_destination_IP_address information, SLS_destination_UDP_port information, SLS_source_IP_address information, SLS_protocol_version information, num_ext_length_bits information, reserved1 information, ext_length information, and/or a reserved2( ) element may not be present in the corresponding iteration of the "for" loop.

If the SLS_source_IP_address_present information is set to '0', this indicates that the SLS_source_IP_address information is present. If the SLS_source_IP_address_present information is set to '0', this indicates that the SLS_source_IP_address information is not present in the instance of the current SLT section.

If the broadband_access_required information is set to "1", this may indicate that the service identified by the service_id information requires the receiver to perform broadband access to provide meaningful reproduction of the service. If the broadband_access_required information is set to "0", this may indicate that the service identified by the service_id information does not require the receiver to perform broadband access to provide meaningful reproduction of the service.

The SLS_protocol_type information is information indicating the protocol type of the service layer signaling channel. The receiver may discard the received SLT section if the SLS_protocol_type information is unknown or not supported. For example, the value of the SLS_protocol_type information may be '0x00', and the values from '0x03' to '0x0F' may be reserved for future use. If the value of the SLS_protocol_type information is '0x01', this may indicate that the service layer signaling is transmitted according to the ROUTE protocol. If the value of the SLS_protocol_type information is '0x02', this may indicate that the service layer signaling is transmitted according to the MMTP protocol.

The SLS_PLP_ID information is information indicating the identifier of the PLP including service layer signaling for this service. Generally, this PLP may correspond to a robust PLP compared to other pipes used in this service. The SLS_PLP_ID information may be transmitted via the link layer signaling described above. In this case, the receiver is allowed to identify the PLP for transmission of the SLS before acquiring the SLT.

The SLS_destination_IP_address information is information indicating the destination IP address of the service layer signaling for this service. For example, this IP address may use 32-bit IPv4.

The SLS_destination_UDP_port information is information indicating the destination UDP port number of the service layer signaling for this service.

The SLS_source_IP_address information is information indicating the source IP address of the service layer signaling for this service. For example, this IP address may use IPv4.

The SLS_protocol_version information may indicate the version of the protocol identified in the SLS_protocol_type information that may be used to provide an SLS for the corresponding service. The meaning of the SLS_protocol_version information may depend on the protocol used (for example, the value of the SLS_protocol_type information).

If the value of the SLS_protocol_type information is "1", this may indicate that the protocol in use is the ROUTE protocol. In this case, the 4 most significant bits of the SLS_protocol_version information may indicate the major protocol version of the ROUTE protocol, and the 4 least significant bits may indicate the minor protocol version of the ROUTE protocol. For the ROUTE protocol described in the present invention, the major protocol version may be '0x1' and the minor protocol version may be '0x0'.

If the value of the SLS_protocol_type information is "0", this may indicate that the protocol in use is the MMT protocol. In this case, the 4 most significant bits of the SLS_protocol_version information may indicate the major protocol version of the MMT protocol, and the 4 least significant bits may indicate the minor protocol version of the ROUTE protocol. For the ROUTE protocol described in the present invention, the major protocol version may be '0x1' and the minor protocol version may be '0x0'.

The num_ext_length_bits information may indicate the length of the ext_length information (length in bits). If the value of the num_ext_length_bits information is "0", the reserved1 information, the ext_length information, and/or the reserved2( ) element may not be present in the corresponding iteration of the "for" loop.

The reserved1 information may have a length calculated by "8−num_ext_length_bits % 8". Each bit of the reserved1 information may have a value of "1". The "%" operator may compute an integer residue value obtained by dividing a first operand by a second operand. If "num_ext_length_bits % 8"

yields a value of "0", the reserved1 information may not be present in the corresponding iteration of the "for" loop.

The ext_length information may indicate the length of the reserved2( ) element (length in bytes).

The reserved2( ) element may contain data for protocol extension.

The num_service_level_descriptors information is information indicating the number of service level descriptors for the service. Zero or one or more descriptors providing additional information for the service may be included in the SLT. If the value of this information is 0, this may indicate that there is no service level descriptor.

The service_level_descriptor( ) element may include a service level descriptor.

The num_SLT_level_descriptors information is information for identifying the number of SLT level descriptors in the SLT section. Zero or one or more descriptors providing additional information for the SLT may be included in the SLT.

The SLT_level_descriptor( ) element includes an SLT level descriptor.

The reserved3 information may include data for SLT extension.

Figure 20:
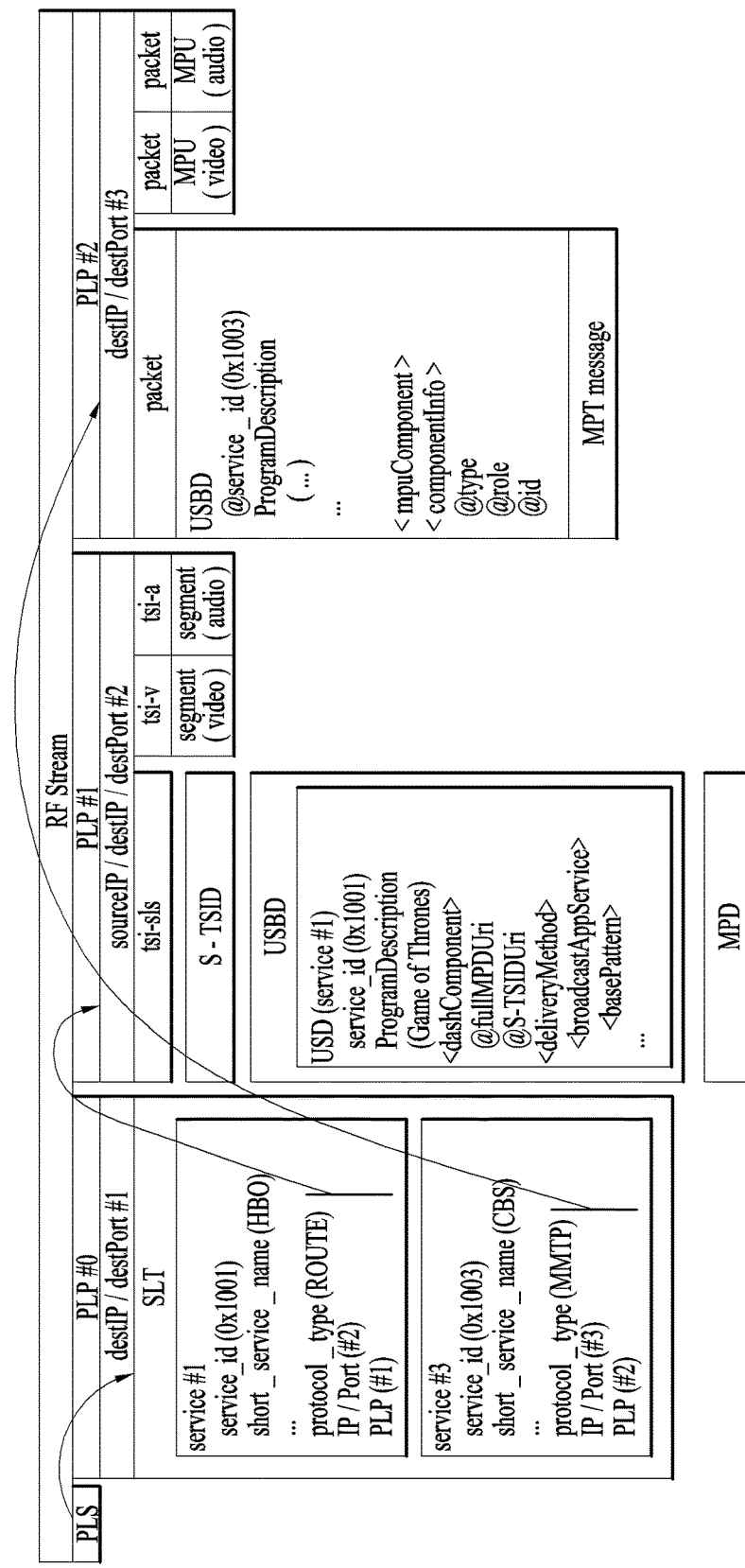
FIG. 20 is a diagram illustrating a method of transmitting service signaling data according to an embodiment of the present invention.

FIG. 20 is a diagram illustrating a method of transmitting service signaling data according to an embodiment of the present invention.

A broadcast stream according to an embodiment of the present invention may include physical layer signaling information (PLS) and at least one physical layer pipe (PLP). For example, the PLP may include a first PLP (PLP #0) for transmitting an SLT, a second PLP (PLP #1) for transmitting a service using the ROUTE protocol, and/or a third PLP (PLP #3) for transmitting a service using the MMT protocol. The service data and service layer signaling data (SLS) may be transmitted via the PLP. For example, the service data may include video data and/or audio data, and the format of the service data may be a segment or MPU. The SLS data for the ROUTE protocol may include S-TSID, USBD, and/or MPD. The SLS data for the MMT protocol may include USBD, MPD, and/or MPT messages.

The physical layer signaling data may include bootstrap information for acquisition of the SLT. For example, the physical layer signaling data may include information about a PLP for transmitting the SLT, source_IP_address, destination_IP_address, and/or destination_UDP_port.

The SLT supports fast channel scans that may be transmitted via a specific PLP (PLP #0) and allow the receiver to build up a list of all services it may receive with channel names, channel numbers, and so on. SLT also provides bootstrap information that allows the receiver to discover the SLS for each service.

For example, the SLT may include a first service element for a first service (service #1) and a third service element for a third service (service #3).

The first service element may include protocol type information indicating the ROUTE protocol and first bootstrap information enabling the SLS for the first service to be discovered. The first bootstrap information may include PLP information(#1), source_IP_address information(#2), destination_IP_address information(#2), and/or destination_UDP_port information(#2). The receiver may acquire the SLS for the first service based on the first bootstrap information and acquire the service data based on the SLS.

The third service element may include protocol type information indicating the MMT protocol and third bootstrap information enabling the SLS for the third service to be discovered. The third bootstrap information may include PLP information(#2), source_IP_address information(#3), destination_IP_address information(#3), and/or destination_UDP_port information(#3). The receiver may acquire the SLS for the third service based on the third bootstrap information, and acquire the service data based on the SLS.

Figure 21:
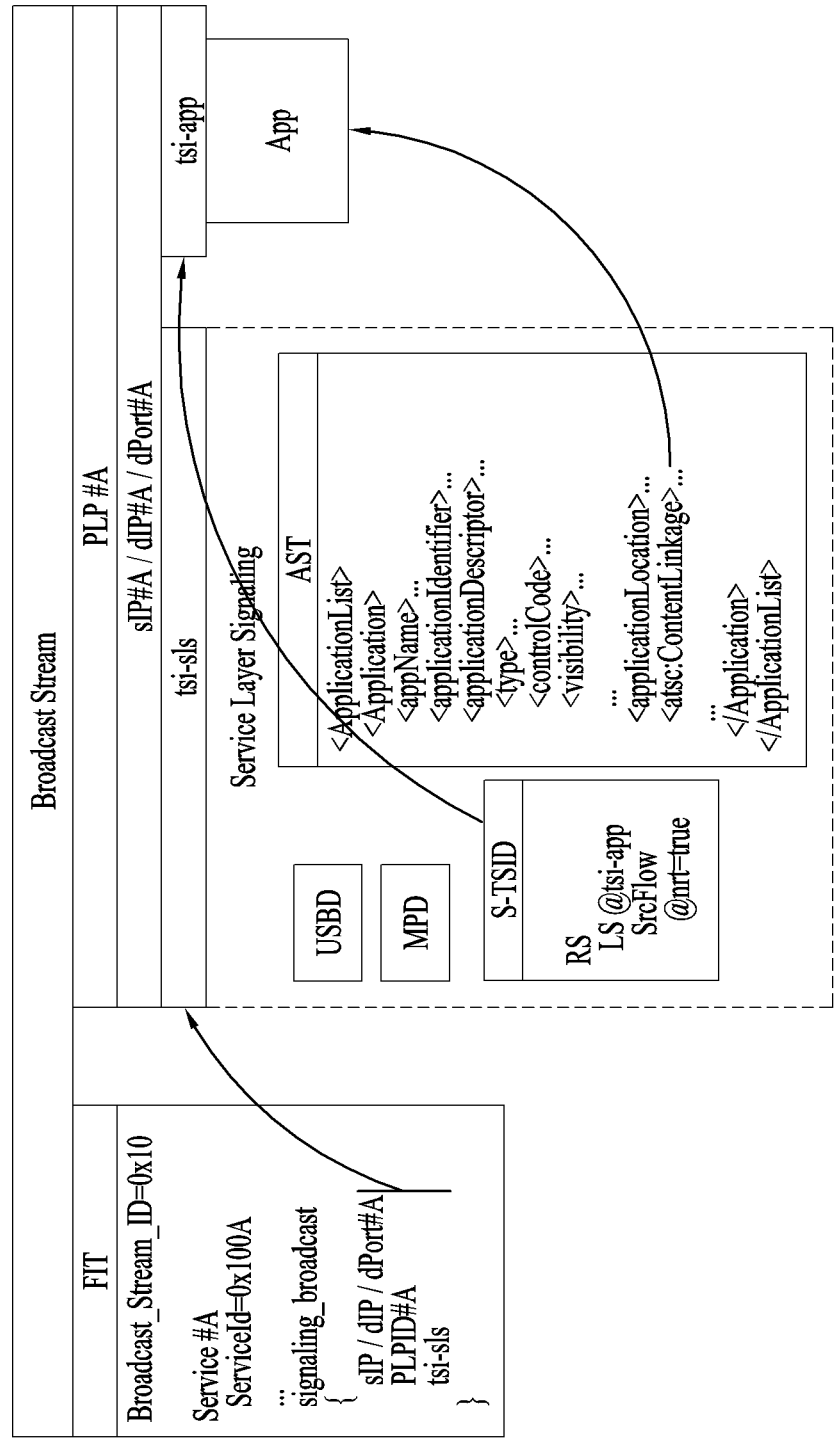
FIG. 21 is a diagram illustrating AST transmitted in broadcast according to an embodiment of the present invention.

FIG. 21 is a diagram illustrating AST transmitted in broadcast according to an embodiment of the present invention.

When the AST is transmitted through a broadcast network, the AST for application enhancement may be transmitted through a service signaling channel of a broadcast service related to corresponding application enhancement. Here, the service signaling channel of a service may refer to a path for transmitting the aforementioned SLS.

A broadcast signal (broadcast stream) with a specific frequency may include service data and/or signaling data for a service. For example, the broadcast signal may be identified by a specific frequency.

The broadcast signal may include a first ROUTE session (sIP#A/dIP#A/dPort#A). The service data for a service may be transmitted through the first ROUTE session.

The service data may include a video component and/or an audio component for a service. The video component may include at least one video segment including video data. The audio component may include at least one audio segment including audio data. The video component may be transmitted through a specific transport session of the first ROUTE session. The audio component may be transmitted through another transport session of the first ROUTE session.

The signaling data may include low level signaling data and/or service layer signaling data. For example, the low level signaling data may include FIT and/or SLT. The low level signaling data may be transmitted in an IP/UDP packet. The service layer signaling data may be referred to as SLS. The service layer signaling data may include USBD, MPD, S-TSID, and/or AST. The USBD, the MPD, the S-TSID, and/or the AST may be transmitted through a specific transport session. For example, the SLS may be transmitted through a specific LCT transport session included in a first ROUTE session (sIP#A/dIP#A/dPort#A). In detail, the SLS may be transmitted through a first transport session(tsi-sls) specified with tsi=0.

The first ROUTE session (sIP#A/dIP#A/dPort#A) may be identified by a combination of a source IP Address (sIP#A), a destinationIP Address (dIP#A), and a destination port number (dPort#A). The first ROUTE session may be transmitted through at least one PLP. For example, the first ROUTE session may be transmitted through a first PLP (PLP #A). The first ROUTE session may include a first transport session (tsi-sls), a second transport session (tsi-app), and/or a third transport session (not shown).

The first transport session (tsi-sls) may include at least one service layer signaling information item. For example, the service layer signaling information may include at least one of the aforementioned USBD, MPD, S-TSID, and/or AST.

The second transport session (tsi-app) may include at least one application item. For example, an application may refer to a set of documents (HTML, CSS, JavaScript, etc.) constituting an enhancement/interactive service.

The third transport session may include a video component. For example, the video component may include at least one video segment. A transport object identifier for the video segment may have a specific value.

Hereinafter, SLT (or FIT) will be described.

The SLT may permit a receiver to write a basic service list and to bootstrap discovery of the SLS of each service. The SLT may be transmitted through UDP/IP. The SLT may include basic information related to a service and bootstrapping information for acquisition of service layer signaling information.

For example, the SLT may include Broadcast_Stream_id attribute and first service element (Service#A).

The Broadcast_Stream_id attribute may be an identifier of entire broadcast stream. A value of the Broadcast_Stream_id field may be unique in a regional level.

The first service element (Service #A) may include at least one of serviceId attribute and/or signaling_broadcast element.

The serviceId attribute may be an integer number for uniquely identifying a corresponding service in a range of a corresponding broadcast region.

The signaling_broadcast element may include information for signaling information for a service transmitted in broadcast. The signaling_broadcast element may permit a receiver to bootstrap discovery of the SLS of each service.

The signaling_broadcast element may include at least one of a source IP Address related to the SLS of each service, a destination IP Address, a destination port number, a PLPID, and a transport session identifier (TSI).

For example, the source IP Address, the destination IP Address, and/or the destination port number may indicate the first ROUTE session (sIP#A/dIP#A/dPort#A). The PLPID may indicate a first PLP (PLP #A). The transport session identifier (TSI) may indicate a first transport session (tsi-sls).

Hereinafter, the SLS will be described.

The SLS may be transmitted through a broadcast network. The SLS may be transmitted through a specific LCT transport session included in the first ROUTE session (sIP#A/dIP#A/dPort#A). In detail, the SLS may be transmitted through the first transport session (tsi-sls) specified with tsi=0. The SLS may include at least one of USBD, MPD, S-TSID, and/or AST.

The USBD may describe service layer attributes. The USBD may include reference information (or Uniform Resource Identifier, URI) that refers to the MPD and/or the S-TSID. A detailed description of a USBD C620210 may include the entire aforementioned description of the USBD.

The MPD may include resource identifiers for separate media components of a linear/streaming service. For example, the MPD may include DASH MPD of all components transmitted through a mobile broadcast network, a general broadcast network, and/or the Internet. The DASH MPD may include formalized description of DASH Media Presentation. The DASH MPD may include resource identifiers for separate media components of a linear/streaming service. The DASH MPD may include context of identified resources in media presentation. For example, the resource identifier may be information for identifying representation related to a component for a service. For example, the resource identifier may be the form of segment URL.

The S-TSID may be a type of a service layer signaling (SLS) XML fragment for providing all session description information items for at least one transport session for transmitting at least one content components of a service.

The S-TSID may include a first ROUTE session element (RS) for providing information on a ROUTE session for a service and/or a component included in the service. The first ROUTE session element (RS) may include transport path information for the first ROUTE session. The first ROUTE session element (RS) may include information on a transport session (or a layered coding transport session) in the ROUTE session. For example, the first ROUTE session element (RS) may include a second transport session element (LS) including information on a second transport session. The second transport session element (LS) may include transport path information for the second transport session.

In detail, the second transport session element (LS) may include tsi attribute for identifying a transport session for transmitting a content component for a service and a SrcFlow element for describing source flow included in the ROUTE session. The SrcFlow element may include nrt attribute indicating whether a corresponding SrcFlow element transmits non-real time service data. The SrcFlow element may include rt attribute indicating whether the corresponding SrcFlow element transmits streaming media data. That is, the nrt attribute may perform the same function as the rt attribute and may be replaced with each other. For example, when the tsi attribute is "tsi-app", the corresponding transport session element may include information for the second transport session. When the nrt attribute is "true", the corresponding SrcFlow element may transmit non-real time service data.

The AST may include signaling information for an application. A detailed description of the AST may include the entire aforementioned description.

The AST may include ContentLinkage attribute. The ContentLinkage attribute may indicate an application that is supposed to use the corresponding content item. Signaling may be performed on a specific application by the attribute value and information (EventStream element, emsg box, etc.) on events to be described later.

For example, the ContentLinkage attribute may provide an application identifier for identifying an application (App) transmitted through the second transport session. The ContentLinkage attribute may provide a transport session identifier for identifying the second transport session (or LCT session).

The broadcast reception apparatus according to an embodiment of the present invention may acquire a service based on signaling data. In detail, the broadcast reception apparatus may acquire low level signaling data and acquire service layer signaling data based on the low level signaling data.

The broadcast reception apparatus may acquire attribute of a service using service layer signaling data (USBD). The broadcast reception apparatus may refer to and/or acquire MPD and/or S-TSID using the USBD.

The broadcast reception apparatus may acquire information on at least one component (or representation) for a service using the service layer signaling data (USBD and/or MPD). For example, the broadcast reception apparatus may acquire information on the video component.

The broadcast reception apparatus may acquire transmission path information of at least one component using service layer signaling data (S-TSID). The broadcast reception apparatus may acquire transmission path information of other components for at least one component using the service layer signaling data (S-TSID). For example, other components for at least one component may include an application.

The broadcast reception apparatus may acquire service data for a service based on service layer signaling data (transmission path information). For example, the broadcast reception apparatus may receive an application (App) through the second transport session (tsi-app) in non-real time.

The broadcast reception apparatus may acquire information for identifying an application (App) based on the service layer signaling data (AST).

The broadcast reception apparatus may execute an application at a predetermined timing while playback of the video component.

Figure 22:
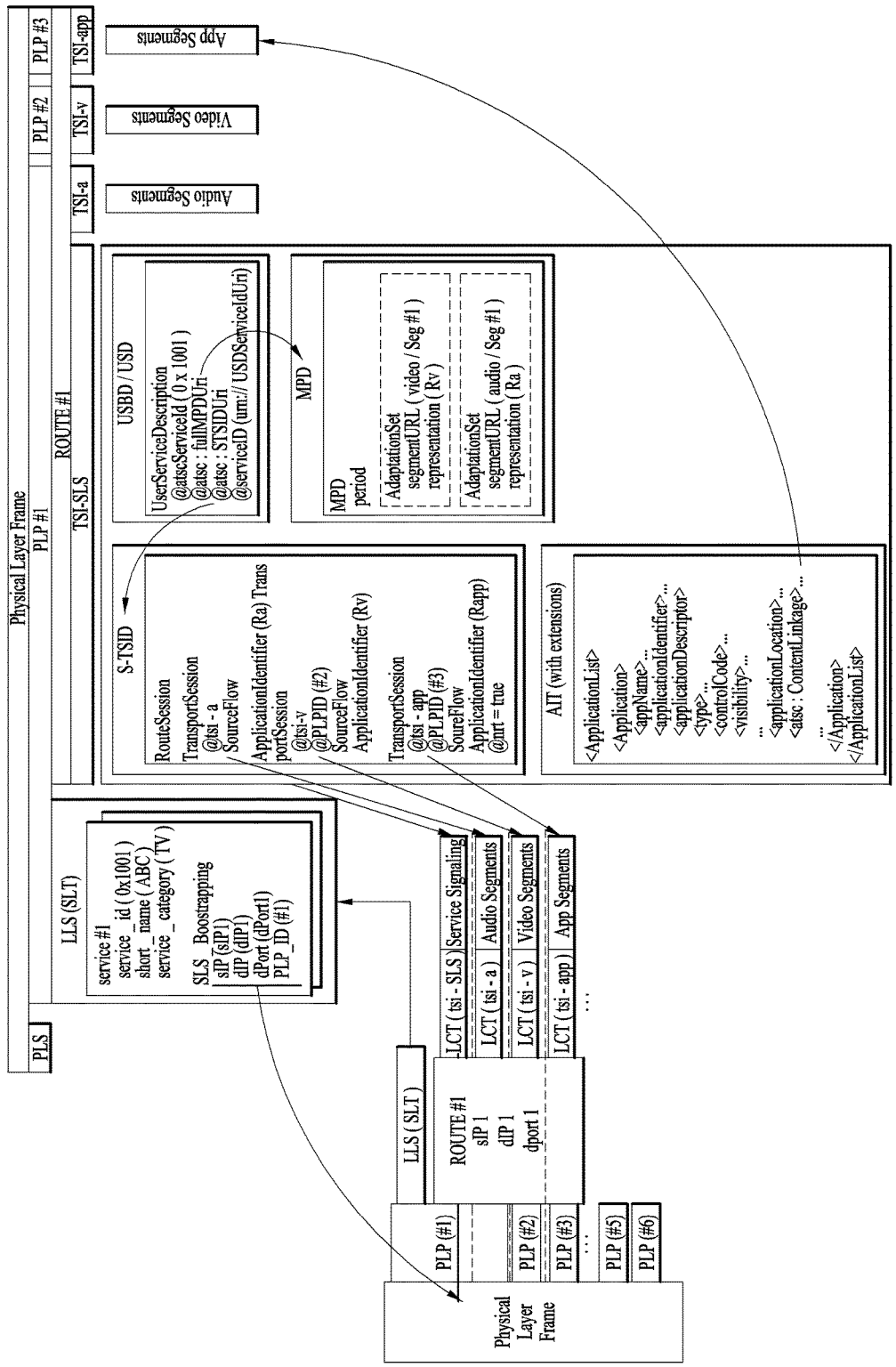
FIG. 22 is a diagram illustrating an AIT transmitted by broadcast according to an embodiment of the present invention.

FIG. 22 is a diagram illustrating an AIT transmitted over broadcast according to an embodiment of the present invention.

The application signaling table (AST) according to an embodiment of the present invention may be represented by an application information table (AIT).

A broadcast signal according to an embodiment of the present invention may include physical layer signaling information (PLS) and at least one physical layer frame including a first PLP (PLP #1), a second PLP (PLP #2), and/or a third PLP (PLP #3). The SLT may be transmitted through the first PLP. The first ROUTE session (ROUTE #1) may be configured using PLP #1, PLP #2, and/or PLP #3. ROUTE #1 may include a first transport session (TSI-SLS) for transmitting service layer signaling information, a second transport session (TSI-a) including audio segments that constitute an audio component, a third transport session (TSI-v) including video segments that constitute a video component, and/or a fourth transport session (TSI-app) including application segments that constitute an application.

The SLT may include bootstrap information for acquiring the SLS for the service. For example, the bootstrap information may include PLP information(#1), source_IP_address information(sIP1), destination_IP_address information(dIP3), and/or destination_UDP_port information (dPort1). The bootstrap information may indicate the position of the first transport session (TSI-SLS) over which the SLS is transmitted. The receiver may acquire the SLS via the first transport session (TSI-SLS) based on the bootstrap information.

The SLS may include USBD, S-TSID, MPD, and/or AIT (or AST). The USBD may contain @atsc:SLSIDUri (or @atsc:sTSIDUri) information referencing the S-TSID and @atsc:fullMPDUri information referencing the MPD. The S-TSID includes information on a second transport session (TSI-a) in which audio segments constituting an audio component are transmitted, information on a third transport session (TSI-v) in which video segments constituting a video component are transmitted, and information on a fourth transport session (TSI-app) in which application segments constituting an application are transmitted.

For example, the information on the fourth transport session (TSI-app) may include a tsi attribute (TSI-app), a PLPID attribute (#3), and a SrcFlow element. The SrcFlow element may include an ApplicationIdentifier element (Rapp) and an nrt attribute (true).

The AIT may include signaling information for the application. Details related to the AIT may include all the details of the AST mentioned above.

The AIT may include a ContentLinkage attribute. The ContentLinkage attribute may indicate an application that will utilize a corresponding content item. Signaling of a specific application may be performed by this attribute value and information about an event (EventStream element, emsg box, etc.).

For example, the ContentLinkage attribute may provide an app identifier for identifying the application (App) that is transmitted over the fourth transport session.

The receiver may acquire video components, audio components, and/or applications based on the SLT and the SLS in the same manner as described above.

Figure 23:
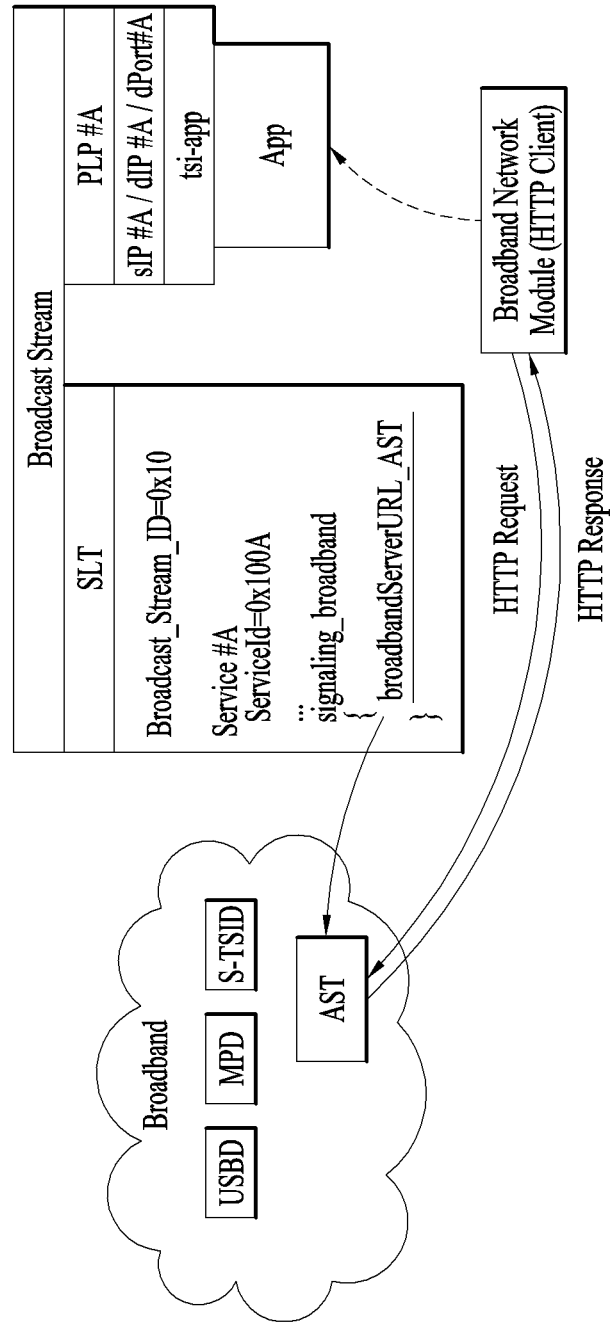
FIG. 23 is a diagram illustrating an AST transmitted over broadband using a query according to an embodiment of the present invention.

FIG. 23 is a diagram illustrating an AST transmitted over broadband using a query according to an embodiment of the present invention.

When an AST is delivered over broadband, the AST may be acquired via a query. This query may be generated using the base URL information in the SLT described above. This base URL may be URL information for acquiring the AST. Here, the SLT may be an SLT that includes bootstrap information about a broadcast service associated with the AST.

A broadcast stream having a specific frequency may include service data and/or signaling data for a service. The broadcast signal may include a first ROUTE session (sIP #A/dIP #A/dPort #A). The first ROUTE session may be transmitted via the first PLP (PLP #A). In addition, the first ROUTE session may include a first transport session (not shown), a second transport session (tsi-app), and/or a third transport session (not shown). The first transport session may include at least one piece of service layer signaling information. The second transport session (tsi-app) may include at least one application. The third transport session may include a video component. Details of the first ROUTE session (sIP #A/dIP #A/dPort #A), the first PLP (PLP #A), the first transport session, the second transport session (tsi-app) and/or the third transport session according to the embodiment may include all the details of the first ROUTE session (sIP #A/dIP #A/dPort #A), the first PLP (PLP #A), the first transport session, the second transport session (tsi-app), and/or the third transport session described above.

Hereinafter, the SLT (or FIT) will be described.

Details of the SLT according to an embodiment of the present invention may include all the details of the SLT described above. Hereinafter, differences will be mainly described.

For example, the SLT may include a Broadcast_Stream_id attribute and a first service element (Service #A).

The first service element (Service #A) may include at least one of a serviceId attribute and/or a signaling_broadband element.

The serviceId attribute may be an integer number that uniquely identifies the service within the range of the broadcast area.

The signaling_broadband element may include path information (or URL) through which Internet signaling information (e.g., SLS) for the service can be accessed. The signaling_broadband element allows the receiver to bootstrap discovery of the SLS for each service. In this case, SLS may be transmitted over broadband.

The signaling_broadband element may include a broadbandServerURL_AST containing path information (or URL) through which the AST for the service can be accessed. In this case, the AST may be transmitted over broadband.

Hereinafter, the SLS will be described.

The SLS may include at least one of USBD, MPD, S-TSID, and/or AST. Details related to the SLS may include all the details of the SLS described above. One difference is that the SLS can be transmitted over broadband.

A broadcast reception apparatus according to an embodiment of the present invention may receive a broadcast signal containing at least one of service data and signaling data (e.g., low level signaling data or SLT) for a service over a broadcast network.

According to an embodiment of the present invention, the broadcast reception apparatus may acquire a service based on the signaling data. Specifically, the broadcast reception apparatus may acquire low level signaling data and acquire service layer signaling data based on the low level signaling data. The service level signaling data may be transmitted over broadband.

Further, the broadcast reception apparatus may acquire an attribute of a service using the service layer signaling data (USBD). Further, the broadcast reception apparatus may reference and/or acquire the MPD and/or the S-TSID using the USBD.

In addition, the broadcast reception apparatus may use the service layer signaling data (USBD and/or MPD) to acquire information on at least one component (or representation) for the service. For example, the broadcast reception apparatus may acquire information about a video component.

In addition, the broadcast reception apparatus may acquire transport path information for at least one component using the service layer signaling data (S-TSID). In addition, the broadcast reception apparatus may acquire transport path information for another component for at least one component using the service layer signaling data (S TSID). For example, the other component for at least one component may include an application.

Further, the broadcast reception apparatus may acquire service data for a service based on the service layer signaling data (transport path information). For example, the broadcast reception apparatus may receive the application (App) in a non-real-time via the second transport session (tsi-app).

Further, the broadcast reception apparatus may acquire information for identifying the application (App) based on the service layer signaling data (AST).

The broadcast reception apparatus may operate the application (App) at a predetermined timing while reproducing the video component.

According to an embodiment of the present invention, the broadcast reception apparatus may include a broadband network module (HTTP Client). The broadband network module (HTTP Client) may make a request for an SLS to the server based on the HTTP request. The server may transmit the SLS to the broadcast reception apparatus based on the HTTP response. Accordingly, the broadcast reception apparatus may receive the SLS through the broadband using the broadband network module (HTTP Client).

For example, the broadcast reception apparatus may make a request for the AST to the server using the HTTP request based on broadbandServerURLAST. The server may transmit the AST to the broadcast reception apparatus based on the HTTP response.

Figure 24:
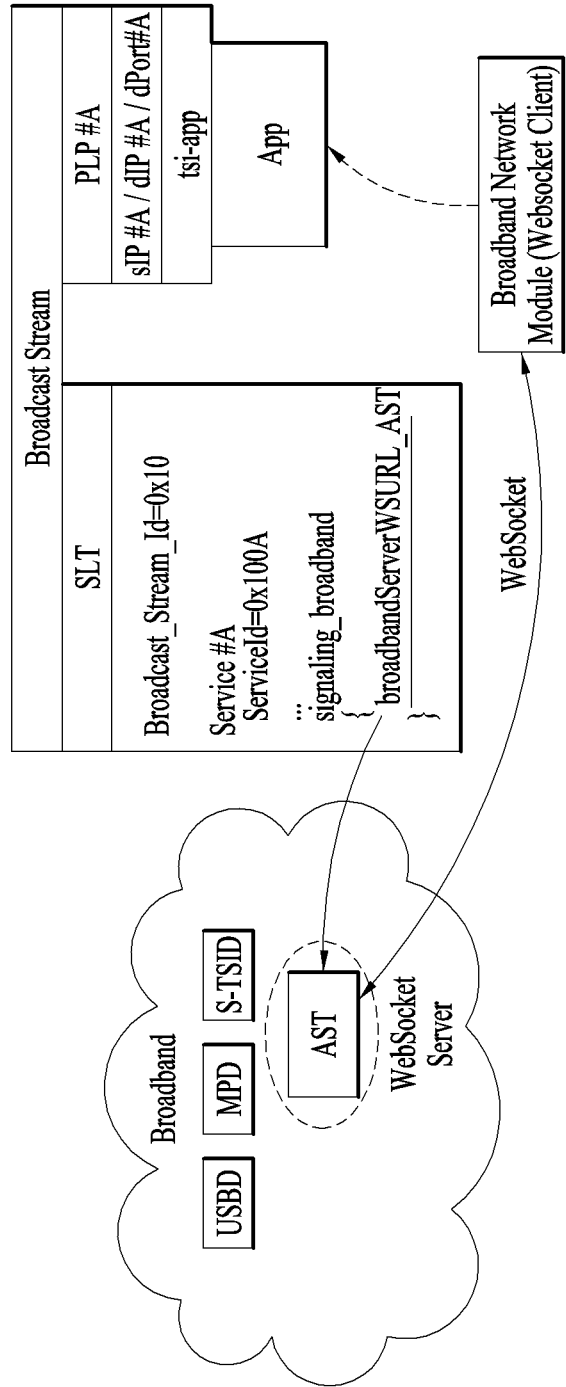
FIG. 24 is a diagram illustrating an AST transmitted over broadband using WebSocket according to an embodiment of the present invention.

FIG. 24 is a diagram illustrating an AST transmitted over broadband using WebSocket according to an embodiment of the present invention.

When an AST is delivered over broadband, the AST may be acquired via WebSocket. Through the Web socket server, the AST may be acquired using the base URL information in the SLT described above. This base URL may be URL information for acquiring the AST. For example, the base URL information may be broadbandServerWSURL_AST.

The detailed description of the figure may include all the descriptions of the previous figures. Hereinafter, differences will be mainly described.

A broadcast system may include a broadcast transmission apparatus for transmitting a broadcast signal for a service over a broadcast network, a broadcast reception apparatus for receiving a broadcast signal for the service over the broadcast network, and/or a server for transmitting service layer signaling information (SLS) for the service.

The broadcast transmission apparatus may transmit a broadcast signal containing the SLT. The SLT may include a signaling_broadband element. The signaling_broadband element may include a broadbandServerWSURL_AST containing path information (or URL) through which the AST for the service can be accessed.

The server may include a WebSocket server and a first controller. The first controller may control all operations of the server. The broadcast reception apparatus may include a tuner, a broadband network module (WebSocket Client), and a second controller. The second controller may control all operations of the broadcast reception apparatus.

The first controller may make a request to the WebSocket server for connection to the broadcast reception apparatus (or the broadband network module). The WebSocket server may put the connection request received from the first controller in a standby state. This is because connection to the broadcast reception apparatus (or the broadband network module) has not been established yet.

Thereafter, the first controller may receive the connection request from the broadcast reception apparatus (or the broadband network module). The WebSocket server may retrieve the connection request of the matching first controller based on the information received from the broadcast reception apparatus (or the broadband network module). The WebSocket server may connect the broadcast reception apparatus (or the broadband network module) and the first controller when the matching connection request is retrieved.

When the WebSocket connection is established, the server may transmit the SLS to the broadcast reception apparatus each time the SLS is updated, even if there is no request (e.g., HTTP request) from the broadcast reception apparatus.

For example, information received from the broadcast reception apparatus (or the broadband network module) by the WebSocket server may include broadbandServerWSURL_AST containing path information (or URL) through which the AST can be accessed. That is, WebSocket connection may be established between the server and the broadcast reception apparatus through broadbandServerWSURL_AST.

Then, the server may transmit the AST to the broadcast reception apparatus each time the AST is updated, even if there is no request (e.g., an HTTP request) from the broadcast reception apparatus. The server may transmit the AST to the broadcast reception apparatus each time the AST is updated in response to the request (or connection request) from the broadcast reception apparatus.

The broadcast reception apparatus may receive the SLT and service data over a broadcast network using the tuner. In addition, the broadcast reception apparatus may receive the SLS over broadband using the broadband network module. Then, the broadcast reception apparatus may acquire the service data based on the SLT and/or SLS using the second controller. For example, the service data may include a video component and an audio component as well as an application.

Figure 25:
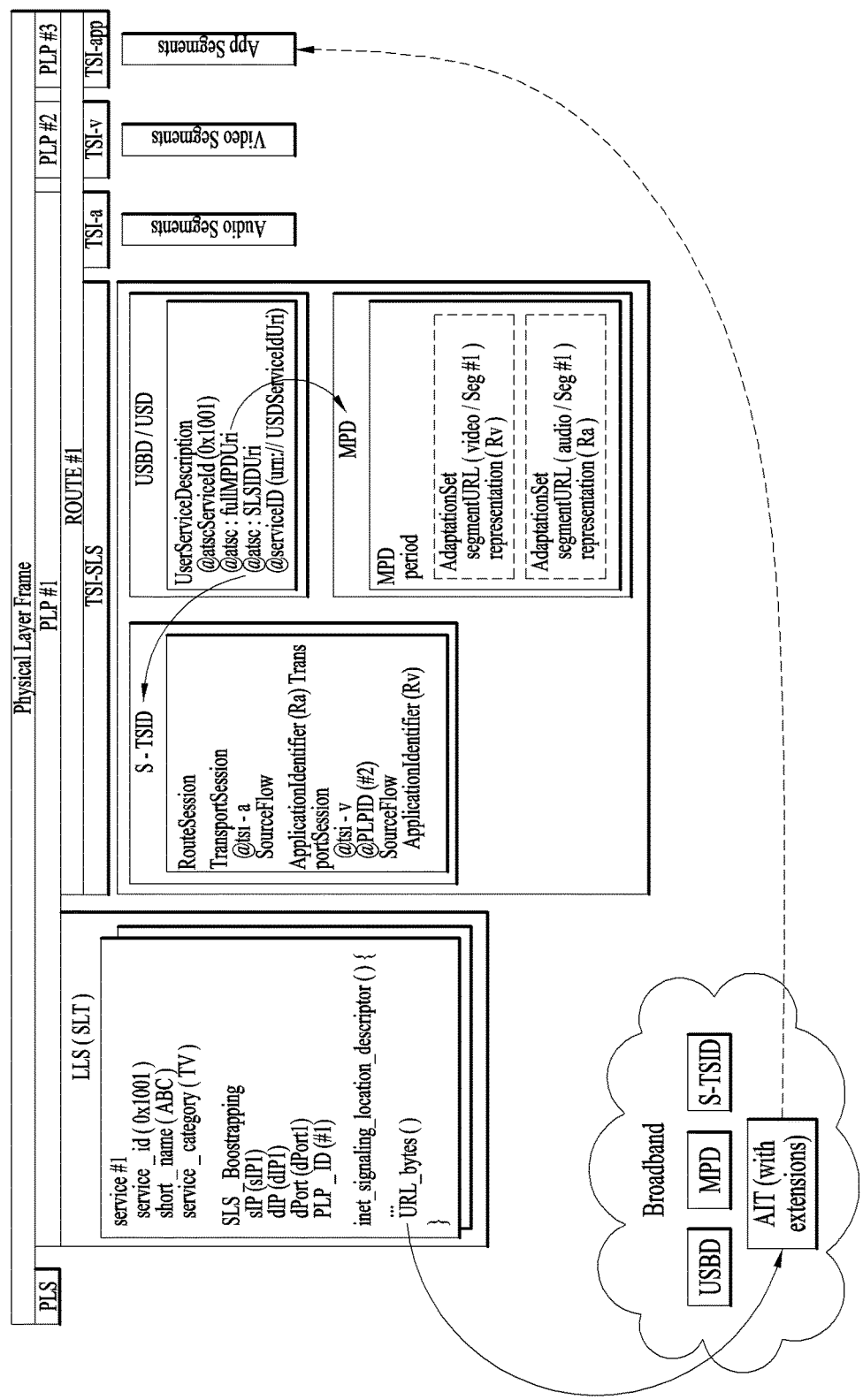
FIG. 25 is a diagram illustrating an AIT transmitted over broadband according to an embodiment of the present invention.

FIG. 25 is a diagram illustrating an AIT transmitted over broadband according to an embodiment of the present invention.

The detailed description of the figure may include all of the descriptions of the previous figures. Hereinafter, differences will be mainly described.

The SLS according to an embodiment of the present invention may be transmitted over broadband and/or a broadcast network. The SLS may include USBD, S-TSID, MPD, and AIT. For example, a part of the SLS may be transmitted over broadband using HTTP or WebSocket.

When the SLS is transmitted through the HTTP, the broadcast reception apparatus may transmit an HTTP request including query term(s) to the server.

For example, the query term for requesting "SLS Set" may be "?SLS=ALL[&svc=<service_id>]". The query term for requesting "SLS Diff Set" may be "?SLS=DiffALL [&svc=<service_id>]". The query term for requesting "SLS Template" may be "?SLS=Template[&svc=<service_id>]". The query term for requesting "USD" may be "?SLS=USD [&svc=<service_id>]". The query term for requesting "S-TSID "may be "?SLS=S-TSID[&svc=<service_id>]". The query term for requesting "ESG" may be "?ESG". In addition, the query term for requesting an AIT may be "?SLS=AIT[&svc=<service_id>]".

The SLT according to an embodiment of the present invention may include inet_signaling_location_descriptor( ). Inet_signaling_location_descriptor( ) may describe the signaling information transmitted over broadband. For example, inet_signaling_location_descriptor( ) may include URL_bytes( ) information for accessing the service layer signaling information transmitted over broadband. The URL_bytes( ) information may include path information (or a URL) through which the AIT (or AST) can be accessed.

The broadcast reception apparatus may receive the SLT, SLS, and service data over a broadcast network. The broadcast reception apparatus may receive the SLS over the broadcast network based on the SLT. At this time, the AIT may not be included in the SLS. In this case, the broadcast reception apparatus may receive the AIT over broadband based on the SLT.

Then, the broadcast reception apparatus may acquire service data based on the received SLS and/or AIT. For example, the service data may include video components, audio components, and/or applications.

Figure 26:
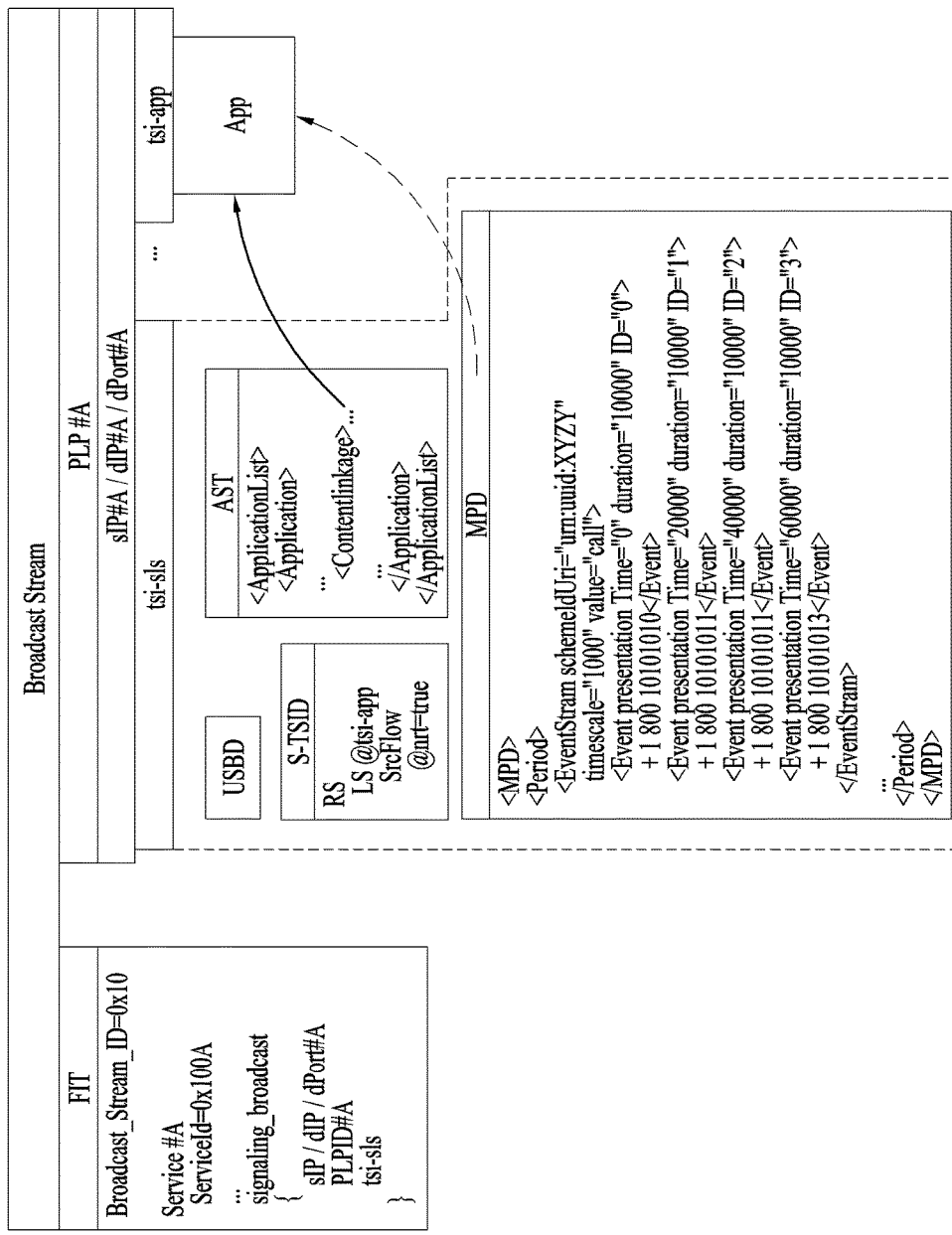
FIG. 26 is a diagram illustrating an event transmitted in the form of EventStream element in broadcast according to an embodiment of the present invention.

FIG. 26 is a diagram illustrating an event transmitted in the form of EventStream element in broadcast according to an embodiment of the present invention.

The event may be transmitted in the form of EventStream element indicated in a Period element of MPD. A description of the EventStream element transmitted through a broadcast network may include the entire aforementioned description of the EventStream element.

A broadcast signal (broadcast stream) with a specific frequency may include service data and/or signaling data for a service. The broadcast signal may include a first ROUTE session (sIP#A/dIP#A/dPort#A). The first ROUTE session may be transmitted through the first PLP (PLP#A). The first ROUTE session may include the first transport session (tsi-sls), the second transport session (tsi-app), and/or a third transport session (not shown). The first transport session (tsi-sls) may include at least one service layer signaling information item. For example, the service layer signaling information may include at least one of the aforementioned USBD, MPD, S-TSID, and/or AST. The second transport session (tsi-app) may include at least one application. The third transport session may include a video component. A description of the first ROUTE session (sIP#A/dIP#A/dPort#A), the first PLP(PLP #A), the first transport session, the second transport session (tsi-app), and/or the third transport session according to an embodiment of the present invention may include the entire description of the first ROUTE session (sIP#A/dIP#A/dPort#A), the first PLP(PLP #A), the first transport session, the second transport session (tsi-app), and/or the third transport session.

Hereinafter, the SLT will be described.

The SLT may permit a receiver to write a basic service list and to bootstrap discovery of the SLS of each service. For example, the SLT may include path information for the first ROUTE session (sIP#A/dIP#A/dPort#A). The SLT may include path information for the first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the MPD will be described in more detail.

The MPD may provide signaling information in a time interval unit of a service referred to as a period as service signaling information on a service. The signaling information on the period may be included in the MPD Period element and the Period element may include EventStream element. The EventStream element may provide signaling (event) required for operation of applications during a corresponding period of a corresponding service.

The EventStream element may include schemeIdUri attribute, value attribute, timescale attribute, and/or at least one Event sub element. Each Event sub element may include presentationTime attribute, duration attribute, and/or id attribute. A detailed description of the EventStream element may include the entire aforementioned description of the EventStream element.

For example, a value of the schemeIdUri attribute may be "urn:uuid:XYZY". A value of the value attribute may be "call". A value of the timescale attribute may be "1000".

With regard to the first event, a value of the presentationTime attribute may be "0", a value of the duration attribute may be "10000", a value of the id attribute may be "0", and/or a value of the data element/attribute may be "+1 800 10101010". With regard to the second event, a value of the presentationTime attribute may be "20000", a value of the duration attribute may be "10000", a value of the id attribute may be "1", and/or a value of the data element/attribute may be "+1 800 10101011". With regard to the third event, a value of the presentationTime attribute may be "40000", a value of the duration attribute may be "10000", a value of the id attribute may be "2", and/or a value of the data element/attribute may be "+1 800 10101012". With regard to the fourth event, a value of the presentationTime attribute may be "60000", a value of the duration attribute may be "10000", a value of the id attribute may be "3", and/or a value of the data element/attribute may be "+1 800 10101013".

The broadcast reception apparatus according to an embodiment of the present invention may receive a broadcast signal including at least one of service data and signaling data (e.g., low level signaling data or service layer signaling data) for a service through a broadcast network.

The broadcast reception apparatus according to an embodiment of the present invention may acquire a service based on signaling data. In detail, the broadcast reception apparatus may acquire low level signaling data and acquire service layer signaling data based on the low level signaling data.

The broadcast reception apparatus may acquire attribute of a service using service layer signaling data (USBD). The broadcast reception apparatus may refer to and/or acquire the MPD and/or the S-TSID using the USBD.

The broadcast reception apparatus may acquire information on at least one component (or representation) for a service using service layer signaling data (USBD and/or MPD). For example, the broadcast reception apparatus may acquire information on the video component.

The broadcast reception apparatus may acquire transmission path information of at least one component using service layer signaling data (S-TSID). The broadcast reception apparatus may acquire transmission path information of other components for at least one component using the service layer signaling data (S-TSID). For example, other components for at least one component may include an application.

The broadcast reception apparatus may acquire service data for a service based on the service layer signaling data (transmission path information). For example, the broadcast reception apparatus may receive an application (App) in non-real time through the second transport session (tsi-app).

The broadcast reception apparatus may acquire information for identifying an application (App) based on the service layer signaling data (AST).

The broadcast reception apparatus may execute the application (App) based on an event. For example, the event may be transmitted in the form of EventStream element indicated in the Period element of the MPD. The broadcast reception apparatus may execute an application (App) at a predetermined timing while playback of the video component.

Figure 27:
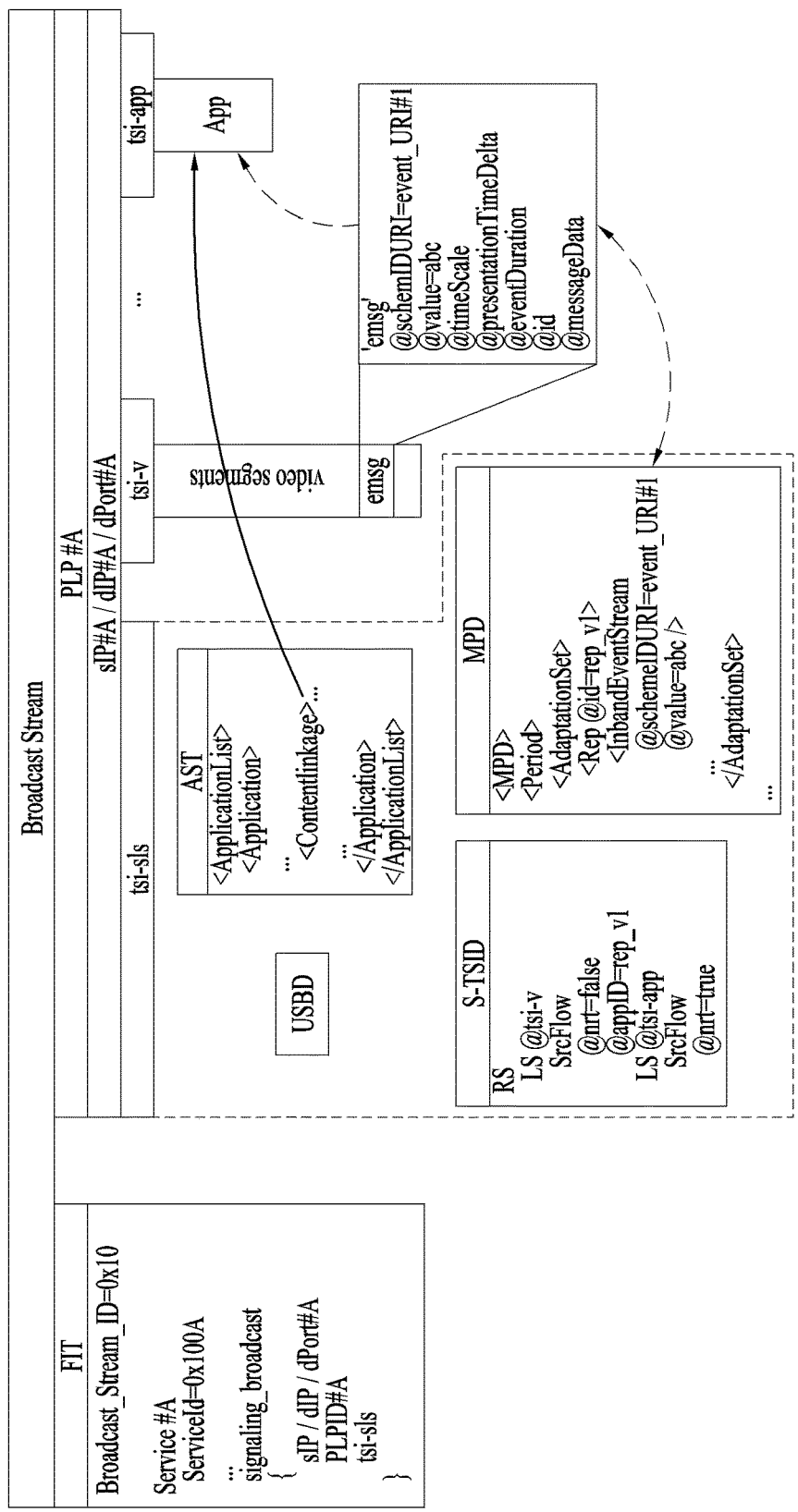
FIG. 27 is a diagram illustrating an event transmitted in the form of emsg box in broadcast according to an embodiment of the present invention.

FIG. 27 is a diagram illustrating an event transmitted in the form of emsg box in broadcast according to an embodiment of the present invention.

The event may be transmitted in the form of emsg box indicated in segments (or Representation segments) of Representation. A description of the emsg box transmitted through a broadcast network may include the entire aforementioned description of the emsg box.

The broadcast signal (broadcast stream) with a specific frequency may include service data and/or signaling data for a service. The broadcast signal may include a first ROUTE session (sIP#A/dIP#A/dPort#A). The first ROUTE session may be transmitted through a first PLP (PLP#A). The first ROUTE session may include the first transport session (tsi-sls), the second transport session (tsi-app), and/or the third transport session (tsi-v). The first transport session (tsi-sls) may include at least one service layer signaling information item. For example, the service layer signaling information may include at least one of the aforementioned USBD, MPD, S-TSID, and/or AST. The second transport session (tsi-app) may include at least one application. The third transport session may include a video component. The video component may include at least one video segment including video data. At least one video segment may include emsg box.

A description of the first ROUTE session (sIP#A/dIP#A/dPort#A), the first PLP (PLP #A), the first transport session, the second transport session (tsi-app), and/or the third transport session (tsi-v) according to an embodiment of the present invention may include the entire description of the first ROUTE session (sIP#A/dIP#A/dPort#A), the first PLP (PLP #A), the first transport session, the second transport session(tsi-app), and/or the third transport session (tsi-v).

Hereinafter, emsg box included in a segment will be described.

The emsg box may provide signaling information for generic events related to media presentation time. The emsg box may include at least one of a schemeIdUri field, a value field, a timescale field, a presentationTimeDelta field, an eventDuration field, an id field, and/or a messageData field. A description of the emsg box may include the entire aforementioned description of the emsg box.

Hereinafter, the SLT will be described.

The SLT may permit a receiver to write a basic service list and to bootstrap discovery of the SLS of each service. For example, the SLT may include path information for a first ROUTE session (sIP#A/dIP#A/dPort#A). The SLT may include path information for a first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the S-TSID and/or the MPD will be described.

The S-TSID may include a first ROUTE session element (RS) for providing information on a ROUTE session for a service and/or a component included in the service. The first ROUTE session element (RS) may include transmission path information for a first ROUTE session. The first ROUTE session element (RS) may include information on a transport session (or layered coding transport session) in the ROUTE session. For example, the first ROUTE session element (RS) may include a second transport session element (LS) including information on the second transport session. The second transport session element (LS) may include transmission path information for the second transport session. The first ROUTE session element (RS) may include the third transport session element (LS) including information on the third transport session. The third transport session element (LS) may include transmission path information for the third transport session.

In detail, the second transport session element (LS) and/or the third transport session element (LS) may each include tsi attribute for identifying a transport session for transmitting a content component for a service and a SrcFlow element described for source flow included in the ROUTE session.

The SrcFlow element may include nrt attribute indicating whether the corresponding SrcFlow element transmits non-real time service data. The SrcFlowelement may include rt attribute indicating whether the corresponding SrcFlow element transmits streaming media data. That is, the nrt attribute performs the same function as the rt attribute and may be replaced with each other.

The SrcFlow element may further include appID attribute including additional information mapped to a service (or application service) transmitted through a transport session. The appID attribute may be referred to as ContentInfo element. The ContentInfo element may include additional information mapped to a service (or an application service) transmitted through the transport session. For example, the ContentInfo element may include representation identifier (Representation ID) of DASH content and/or adaptation set parameters of DASH media representation in order to select an LCT transport session for rendering. The representation identifier may be related to a component for a service and may be referred to as id attribute. Accordingly, the appID attribute in the SrcFlow element may be matched with id attribute in the Representation element of the MPD.

With regard to the second transport session element (LS), when tsi attribute is "tsi-app", the corresponding transport session element may include information for the second transport session. When the nrt attribute is "true", the corresponding SrcFlow element may transmit non-real time service data. That is, an application (App) may be transmitted through the second transport session (tsi-app) in non-real time.

With regard to the third transport session element (LS), when the tsi attribute is "tsi-v", the corresponding transport session element may include information for the third transport session. When the nrt attribute is "false", the corresponding SrcFlow element may transmit real time service data. When the appID attribute is "rep_v1", a representation identifier of the video component may be "rep_v1". That is, at least one video segment of a video component identified by "rep_v1" may be transmitted through the third transport session (tsi-v) in real time.

The MPD may include resource identifiers for separate media components of a linear/streaming service. The MPD may include a Period element. The Period element may include AdaptationSet element including information on a video component. The AdaptationSet element may include at least one Representation element. The Representation element may include information on representation related to a component.

The Representation element may include id attribute for identifying representation. For example, a value of the id attribute may be "rep_v1". That is, the id attribute may indicate a video component transmitted through the third transport session (tsi-v).

The Representation attribute may further include InbandEventStream element that clearly describes presence of an in-band event stream in related representation. The InbandEventStream element of the Representation element of the MPD may signal whether an event is present in the emsg box in segments.

The InbandEventStream element may include schemeIdURI attribute and/or value attribute. The two attributes may indicate a type of an event in the emsg box. In some embodiments, the two attributes may be used to identify an event. The schemeIdURI attribute and/or value attribute included in the InbandEventStreamelement may be matched with schemeIdURI attribute and/or value attribute in the emsg box. For example, a value of the schemeIdURI attribute may be "event_URI #1" and a value of the value attribute may be "abc".

The broadcast reception apparatus according to an embodiment of the present invention may receive a broadcast signal including at least one of service data and signaling data (e.g., low level signaling data or service layer signaling data) for a service through a broadcast network.

The broadcast reception apparatus according to an embodiment of the present invention may acquire a service based on the signaling data. In detail, the broadcast reception apparatus may acquire low level signaling data and acquire service layer signaling data based on the low level signaling data.

The broadcast reception apparatus may acquire attribute of a service using service layer signaling data (USBD). The broadcast reception apparatus may refer to and/or acquire MPD and/or S-TSID using the USBD.

The broadcast reception apparatus may acquire information on at least one component (or representation) for a service using the service layer signaling data (USBD and/or MPD). For example, the broadcast reception apparatus may acquire information on a video component. In this case, a Representation element of the MPD may include the InbandEventStream element that clearly describes presence of the emsg box (or in-band event stream) in the video component.

The broadcast reception apparatus may acquire transmission path information of at least one component using service layer signaling data (S-TSID). The broadcast reception apparatus may acquire transmission path information of other components for at least one component using the service layer signaling data (S-TSID). For example, other components for at least one component may include an application.

The broadcast reception apparatus may acquire service data for a service based on the service layer signaling data (transmission path information). For example, the broadcast reception apparatus may receive an application (App) through a second transport session (tsi-app) in non-real time. The broadcast reception apparatus may receive at least one video segment of a video component identified with "rep_v1" in real time through the third transport session (tsi-v). At least one video segment may include the emsg box.

The broadcast reception apparatus may acquire information for identifying an application (App) based on the service layer signaling data (AST).

The broadcast reception apparatus may execute an application (App) based on the event. For example, the event may be included in a segment in the form of emsg box. The broadcast reception apparatus may execute an application (App) at a predetermined timing while playback of a video component.

Figure 28:
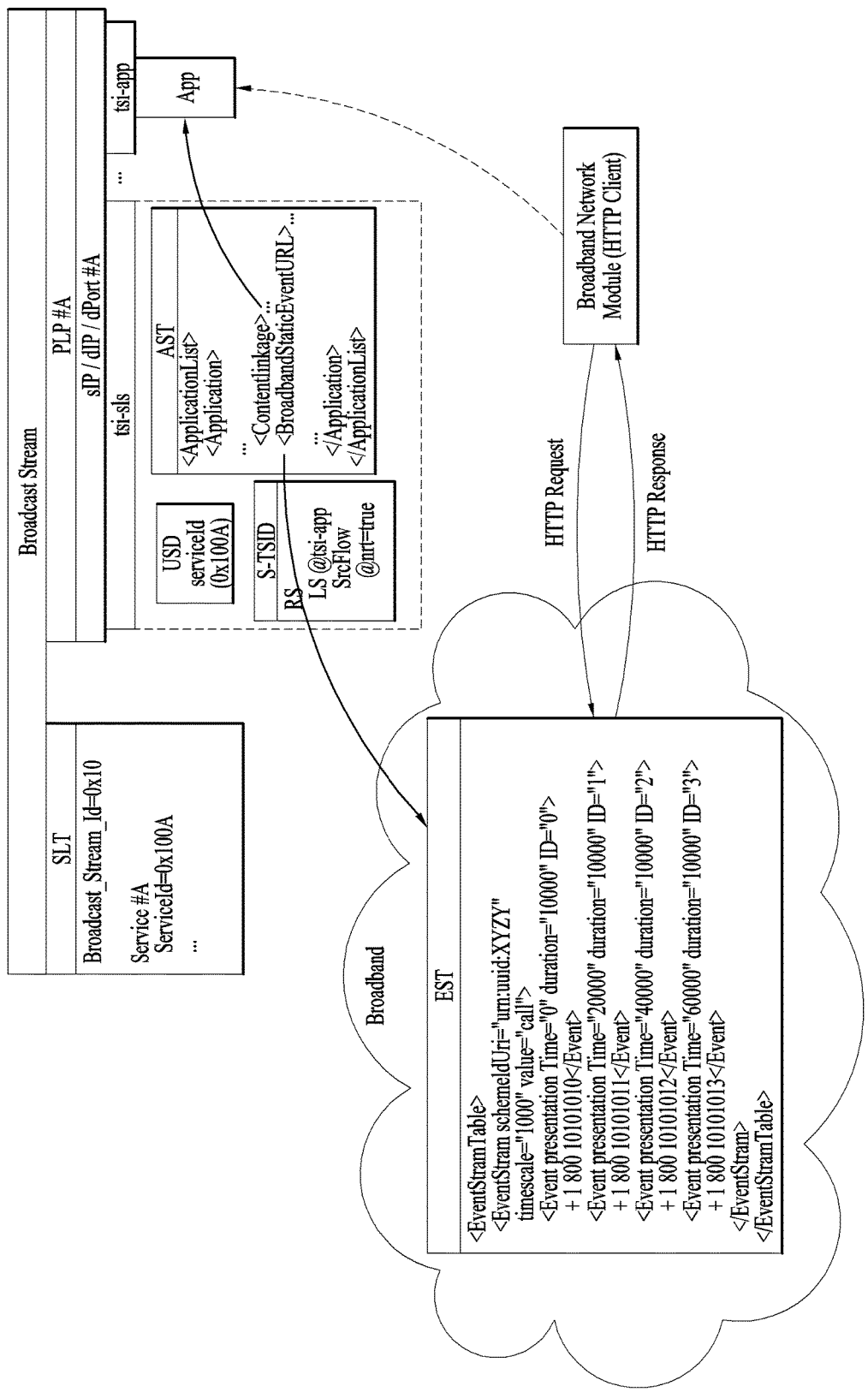
FIG. 28 is a diagram illustrating an event transmitted in the form of an EventStream element over broadband according to an embodiment of the present invention.

FIG. 28 is a diagram illustrating an event transmitted in the form of an EventStream element over broadband according to an embodiment of the present invention.

An event may be transmitted in the form of an EventStream element included in the EST (event stream table) transmitted over broadband. If the EST is delivered over broadband, the EST may be acquired via a query. This request may be generated using the URL information in the AST. This URL information may be URL information for acquiring the EST. Details of the EventStream element sent over broadband may include all the details of the EventStream element described above.

A broadcast stream having a specific frequency may include service data and/or signaling data for a service. The broadcast signal may include a first ROUTE session (sIP #A/dIP #A/dPort #A). The first ROUTE session may be transmitted via the first PLP (PLP #A). In addition, the first ROUTE session may include a first transport session (not shown), a second transport session (tsi-app), and/or a third transport session (not shown). The first transport session may include at least one piece of service layer signaling information. For example, the service layer signaling information may include at least one of the above-described USBD, MPD (not shown), S-TSID, and/or AST. The second transport session (tsi-app) may include at least one application. The third transport session may include a video component. Depending on the embodiment, the MPD may be omitted. Details of the first ROUTE session (sIP #A/dIP #A/dPort #A), the first PLP (PLP #A), the first transport session, the second transport session (tsi-app) and/or the third transport session according to the embodiment may include all the details of the first ROUTE session (sIP #A/dIP #A/dPort #A), the first PLP (PLP #A), the first transport session, the second transport session (tsi-app), and/or the third transport session described above.

Hereinafter, the SLT will be described.

The SLT may include path information for the first ROUTE session (sIP #A/dIP #A/dPort #A). The SLT may include path information for the first transport session (tsi-sls). Details of the SLT according to an embodiment of the present invention may include all the details of the SLT described above.

Hereinafter, the SLS will be described.

The SLS may include at least one of USBD, MPD, S-TSID, and/or AST. Details of the SLS may include all the details of the SLS described above. Hereinafter, the AST will be described in more detail.

The AST may include a ContentLinkage attribute. The ContentLinkage attribute may indicate an application that will utilize a corresponding content item. Signaling of a specific application may be performed by this attribute value and information (EventStream element, emsg box, etc.) about an event, which will be described later.

For example, the ContentLinkage attribute may provide an application identifier for identifying the application (App) that is transmitted over the second transport session. Alternatively, the ContentLinkage attribute may provide a transport session identifier for identifying the second transport session (or LCT session).

The AST may further include a BroadbandStaticEventURL attribute. The BroadbandStaticEventURL attribute may contain path information (or URL) through which the EST for the service can be accessed. In this case, the EST may be transmitted over broadband. The EST may include an EventStream element. The EventStream element may provide necessary signaling (event) for operation of the applications.

The EventStream element may include a schemeIdUri attribute, a value attribute, a timescale attribute, and/or at least one Event subelement. Each Event subelement may contain a presentationTime attribute, a duration attribute, and/or an id attribute. The specific contents of the EventStream element may include all the contents of the EventStream element described above.

For example, the value of the schemeIdUri attribute may be "urn:uuid:XYZY". The value of the value attribute may be "call". The value of the timescale attribute may be "1000".

For the first event, the value of the presentationTime attribute may be "0", the value of the duration attribute may be "10000", and/or the value of the id attribute may be "0". The data element/attribute may be "+1 800 10101010". For the second event, the value of the presentationTime attribute may be "20000", the value of the duration attribute may be "10000", and/or the value of the id attribute may be "1". The data element/attribute may be "+1 800 10101011". For the third event, the value of the presentationTime attribute is "40000", the value of the duration attribute is "10000", and/or the value of the id attribute may be "2". The data element/attribute may be "+1 800 10101012". For the fourth event, the value of the presentationTime attribute may be "60000", the value of the duration attribute may be "10000", and/or the value of the id attribute may be "3". The data element may be "+1 800 10101013".

A broadcast reception apparatus according to an embodiment of the present invention may receive a broadcast signal containing at least one of service data and signaling data (e.g., low level signaling data or service layer signaling data) for a service.

According to an embodiment of the present invention, the broadcast reception apparatus may acquire a service based on the signaling data. Specifically, the broadcast reception apparatus may acquire low level signaling data and acquire service layer signaling data based on the low level signaling data.

Further, the broadcast reception apparatus may acquire the attribute of the service using the service layer signaling data (USBD). Further, the broadcast reception apparatus may refer to and/or acquire the MPD and/or the S-TSID using the USBD.

In addition, the broadcast reception apparatus may use the service layer signaling data (USBD and/or MPD) to acquire information on at least one component (or representation) for the service. For example, the broadcast reception apparatus may acquire information about a video component.

In addition, the broadcast reception apparatus may acquire transport path information for at least one component using the service layer signaling data (S-TSID). In addition, the broadcast reception apparatus may acquire transport path information for another component for at least one component using the service layer signaling data (S-TSID). For example, the other component for at least one component may include an application.

Further, the broadcast reception apparatus may acquire service data for a service based on the service layer signaling data (transport path information). For example, the broadcast reception apparatus may receive the application (App) in non-real-time via the second transport session (tsi-app).

Further, the broadcast reception apparatus may acquire information for identifying the application (App) based on the service layer signaling data (AST). The broadcast reception apparatus may also acquire the EST over broadband based on the service layer signaling data (AST).

Further, the broadcast reception apparatus may operate the application (App) based on the event. For example, the event may be transmitted in the form of an EventStream element contained in the even stream table (EST) that is transmitted over broadband.

The broadcast reception apparatus may operate the application (App) at a predetermined timing while reproducing the video component.

According to an embodiment of the present invention, the broadcast reception apparatus may include a broadband network module (HTTP Client). The broadband network module (HTTP Client) may request the EST from the server based on the HTTP request. For example, the broadcast reception apparatus may make a request for the EST to the server using an HTTP request based on the BroadbandStaticEventURL attribute. The server may transmit the EST to the broadcast reception apparatus based on the HTTP response.

Figure 29:
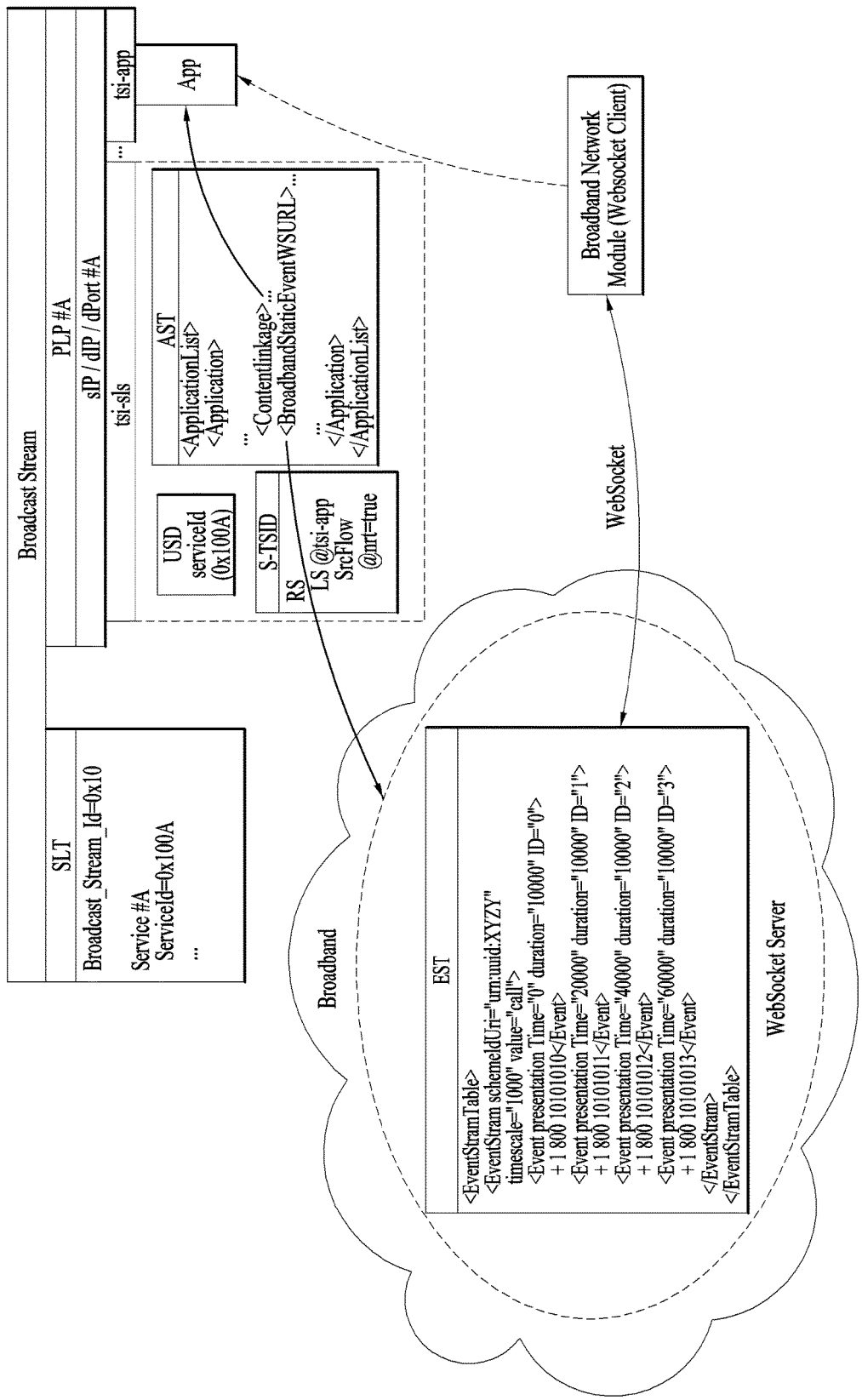
FIG. 29 is a diagram illustrating an EST transmitted over broadband using WebSocket according to an embodiment of the present invention.

FIG. 29 is a diagram illustrating an EST transmitted over broadband using WebSocket according to an embodiment of the present invention.

When an EST (or static event) is delivered over broadband, the EST may be acquired via WebSocket. Through the WebSocket server, the EST may be acquired using the BroadbandStaticEventWSURL attribute in the AST described above. This BroadbandStaticEventWSURL attribute may be URL information for acquiring the EST.

A broadcast system may include a broadcast transmission apparatus for transmitting a broadcast signal for a service over a broadcast network, a broadcast reception apparatus for receiving a broadcast signal for the service over the broadcast network, and/or a server for transmitting the EST over broadband. The detailed description of the figure may include all the descriptions of the previous figures. Hereinafter, differences will be mainly described.

The server and the broadcast reception apparatus may be connected using a WebSocket server.

Once WebSocket connection is established, the server may transmit the EST to the broadcast reception apparatus each time every time the EST is updated even if there is no request (e.g., HTTP request) from the broadcast reception apparatus.

For example, the information that the WebSocket server receives from the broadcast reception apparatus (or the broadband network module) may include a BroadbandStaticEventWSURL attribute including path information (or URL) through which the EST can be accessed. That is, WebSocket connection may be established between the server and the broadcast reception apparatus based on the BroadbandStaticEventWSURL attribute.

Then, the server may transmit the EST to the broadcast reception apparatus each time the EST is updated, even if there is no request (e.g., an HTTP request) from the broadcast reception apparatus. The server may transmit the EST to the broadcast reception apparatus each time the EST is updated in response to the request (or connection request) from the broadcast reception apparatus.

The broadcast reception apparatus may receive the SLT, SLS and service data over a broadcast network using the tuner. The broadcast reception apparatus may receive the EST over broadband using the broadband network module. Then, the broadcast reception apparatus may acquire the service data based on the SLT and/or SLS using the second controller. For example, the service data may include video components and audio components as well as applications.

The broadcast reception apparatus may operate the application (App) based on the event. For example, the event may be transmitted in the form of an EventStream element contained in the even stream table (EST) that is transmitted over broadband.

Figure 30:
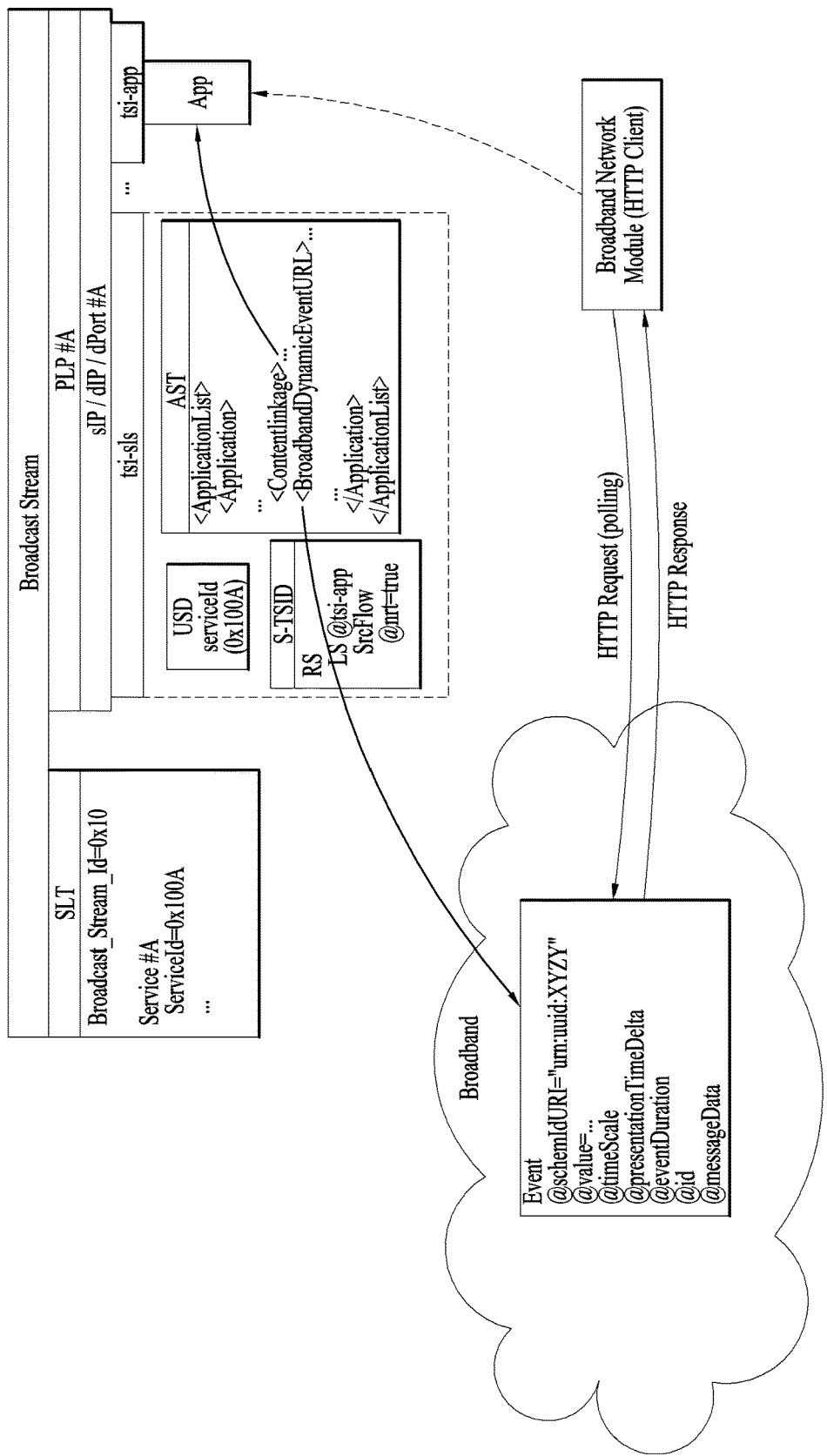
FIG. 30 is a diagram illustrating an event transmitted in the form of an emsg box over broadband according to an embodiment of the present invention.

FIG. 30 is a diagram illustrating an event transmitted in the form of an emsg box over broadband according to an embodiment of the present invention.

An event may be transmitted in the form of an emsg box that is transmitted over broadband. In this case, the event may be delivered through the live event server. Polling to the live event server may be performed periodically. If there is an event to be delivered within the period, the event server may deliver the event to the receiver. Details of the emsg box transmitted over broadband may include all the details of the emsg box described above.

A broadcast stream having a specific frequency may include service data and/or signaling data for a service. The broadcast signal may include a first ROUTE session (sIP #A/dIP #A/dPort #A). The first ROUTE session may be transmitted via the first PLP (PLP #A). In addition, the first ROUTE session may include a first transport session (tsi-sls), a second transport session (tsi-app), and/or a third transport session (not shown). The first transport session (tsi-sls) may include at least one piece of service layer signaling information. For example, the service layer signaling information may include at least one of the above-described USBD, MPD (not shown), S-TSID, and/or AST. The second transport session (tsi-app) may include at least one application. The third transport session may include a video component. Depending on the embodiment, the MPD may be omitted. Details of the first ROUTE session (sIP #A/dIP #A/dPort #A), the first PLP (PLP #A), the first transport session, the second transport session (tsi-app) and/or the third transport session according to the embodiment may include all the details of the first ROUTE session (sIP #A/dIP #A/dPort #A), the first PLP (PLP #A), the first transport session, the second transport session (tsi-app), and/or the third transport session described above.

Hereinafter, the SLT will be described.

The SLT may include path information for the first ROUTE session (sIP #A/dIP #A/dPort #A). The SLT may include path information for the first transport session (tsi-sls). Details of the SLT according to an embodiment of the present invention may include all the details of the SLT described above.

Hereinafter, the SLS will be described.

The SLS may include at least one of USBD, MPD, S-TSID, and/or AST. Details of the SLS may include all the details of the SLS described above. Hereinafter, the AST will be described in more detail.

The AST may include a ContentLinkage attribute. The ContentLinkage attribute may indicate an application that will utilize a corresponding content item. Signaling of a specific application may be performed by this attribute value and information (EventStream element, emsg box, etc.) about an event, which will be described later.

For example, the ContentLinkage attribute may provide an application identifier for identifying the application (App) that is transmitted over the second transport session. Alternatively, the ContentLinkage attribute may provide a transport session identifier for identifying the second transport session (or LCT session).

The AST may further include a BroadbandDynamicEventURL attribute. The BroadbandDynamicEventURL attribute may contain path information (or URL) through which the emsg box for the service can be accessed. In this case, the emsg box may be transmitted over broadband. The emsg box may provide necessary signaling (events) for operation of the applications.

The emsg box may provide signaling information for generic events related to the media presentation time. The emsg box may include at least one of a schemeIdUri field, a value field, a timescale field, a presentationTimeDelta field, an eventDuration field, an id field, and/or a messageData field. Details of the emsg box may include all the details of the emsg box described above.

For example, the value of the schemeIdUri field may be "urn:uuid:XYZY".

A broadcast reception apparatus according to an embodiment of the present invention may receive a broadcast signal containing at least one of service data and signaling data (e.g., low level signaling data or service layer signaling data) for a service over a broadcast network.

According to an embodiment of the present invention, the broadcast reception apparatus may acquire a service based on the signaling data. Specifically, the broadcast reception apparatus may acquire low level signaling data and acquire service layer signaling data based on the low level signaling data.

Further, the broadcast reception apparatus may acquire an attribute of a service using the service layer signaling data (USBD). Further, the broadcast reception apparatus may reference and/or acquire the MPD and/or the S-TSID using the USBD.

In addition, the broadcast reception apparatus may use the service layer signaling data (USBD and/or MPD) to acquire information on at least one component (or representation) for the service. For example, the broadcast reception apparatus may acquire information about a video component.

In addition, the broadcast reception apparatus may acquire transport path information for at least one component using the service layer signaling data (S-TSID). In addition, the broadcast reception apparatus may acquire transport path information for another component for at least one component using the service layer signaling data (S-TSID). For example, the other component for at least one component may include an application.

Further, the broadcast reception apparatus may acquire service data for a service based on the service layer signaling data (transport path information). For example, the broadcast reception apparatus may receive the application (App) in non-real-time via the second transport session (tsi-app).

Further, the broadcast reception apparatus may acquire information for identifying the application (App) based on the service layer signaling data (AST). In addition, the broadcast reception apparatus may acquire the emsg box over broadband based on the service layer signaling data (AST).

Further, the broadcast reception apparatus may operate the application (App) based on the event. For example, the event may be transmitted in the form of an emsg box that is transmitted over broadband.

The broadcast reception apparatus may operate the application (App) at a predetermined timing while reproducing the video component.

According to an embodiment of the present invention, the broadcast reception apparatus may include a broadband network module (HTTP Client). The broadband network module (HTTP Client) may make a request for an emsg box to the server based on the HTTP request (or polling). For example, the broadcast reception apparatus may make a request for the emsg box to the server using an HTTP request (or polling) based on the BroadbandDynamicEventURL attribute. Further, the server may transmit the emsg box to the broadcast reception apparatus based on the HTTP response.

Figure 31:
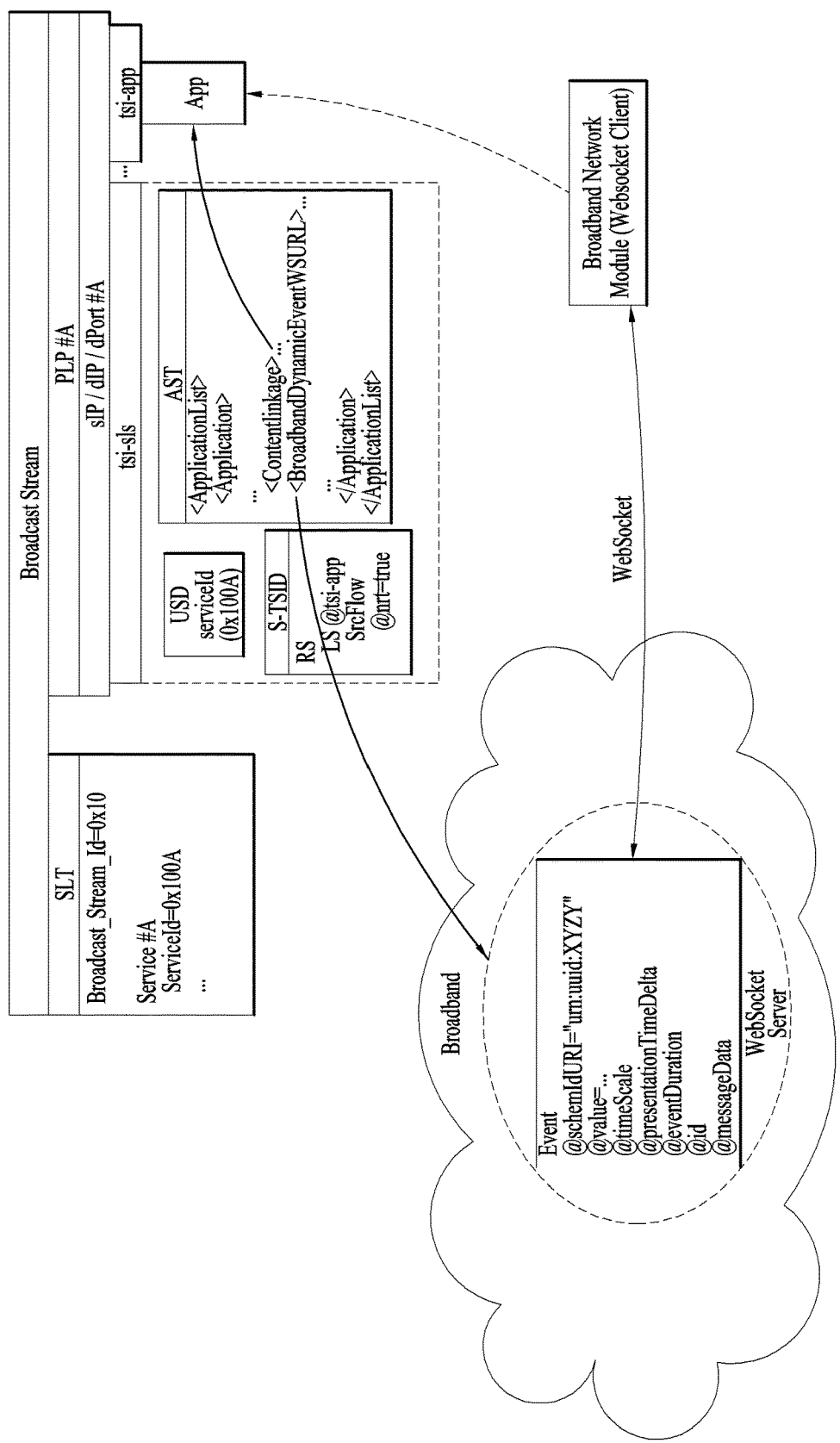
FIG. 31 is a diagram illustrating an emsg box transmitted over broadband using WebSocket according to an embodiment of the present invention.

FIG. 31 is a diagram illustrating an emsg box transmitted over broadband using WebSocket according to an embodiment of the present invention.

When an emsg box (or dynamic event) is delivered over broadband, the emsg box may be acquired via WebSocket. Through the WebSocket server, the emsg box may be acquired using the BroadbandDynamicEventWSURL attribute in the AST described above. The BroadbandDynamicEventWSURL attribute may be the URL information for acquiring the emsg box.

A broadcast system may include a broadcast transmission apparatus for transmitting a broadcast signal for a service over a broadcast network, a broadcast reception apparatus for receiving a broadcast signal for the service over the broadcast network, and/or a server for transmitting an emsg box over broadband. The detailed description of the figure may include all the descriptions of the previous figures. Hereinafter, differences will be mainly described.

The server and the broadcast reception apparatus may be connected using a WebSocket server.

When the WebSocket connection is established, the server may transmit an emsg box to the broadcast reception apparatus each time the emsg box is updated, even if there is no request (e.g., HTTP request, polling) from the broadcast reception apparatus.

For example, information received from the broadcast reception apparatus (or the broadband network module) by the WebSocket server may include a BroadbandDynamicEventWSURL attribute containing path information (or URL) through which the emsg box can be accessed. That is, WebSocket connection may be established between the server and the broadcast reception apparatus based on the BroadbandDynamicEventWSURL attribute.

Then, the server may transmit the emsg box to the broadcast reception apparatus each time the emsg box is updated, even if there is no request (e.g., HTTP request, polling) from the broadcast reception apparatus. The server may transmit the emsg box to the broadcast reception apparatus each time the emsg box is updated in response to the request (or connection request) from the broadcast reception apparatus.

The broadcast reception apparatus may receive the SLT, SLS and service data over a broadcast network using the tuner. The broadcast reception apparatus may receive the emsg box over broadband using the broadband network module. Then, the broadcast reception apparatus may acquire the service data based on the SLT and/or SLS using the second controller. For example, the service data may include video components and audio components as well as applications.

The broadcast reception apparatus may operate the application (App) based on the event. For example, the event may be transmitted in the form of an emsg box over broadband.

Figure 32:
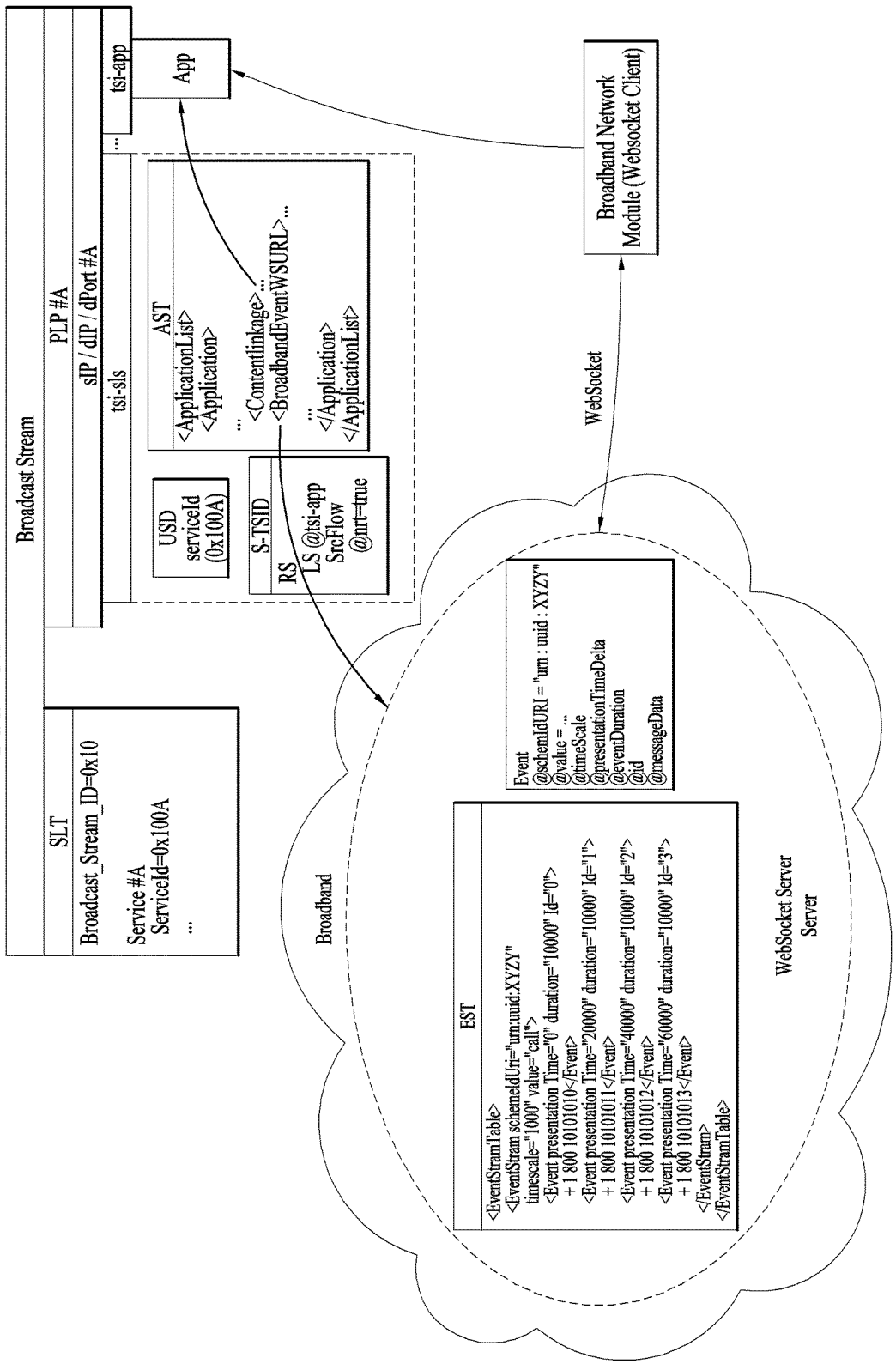
FIG. 32 is a diagram illustrating an EST and an emsg box transmitted over broadband using WebSocket according to an embodiment of the present invention.

FIG. 32 is a diagram illustrating an EST and an emsg box transmitted over broadband using WebSocket according to an embodiment of the present invention.

When the EST (static event) and the emsg box (or dynamic event) are delivered over broadband, the EST and the emsg box may be acquired via WebSocket. Through the WebSocket server, the EST and emsg box may be acquired using the BroadbandEventWSURL attribute in the AST described above. The BroadbandEventWSURL attribute may be URL information for acquiring the EST and emsg box.

Referring to the figure, the EST and emsg box may be transmitted simultaneously and/or via one WebSocket server. The detailed description of the figure may include all the details described above.

Figure 33:
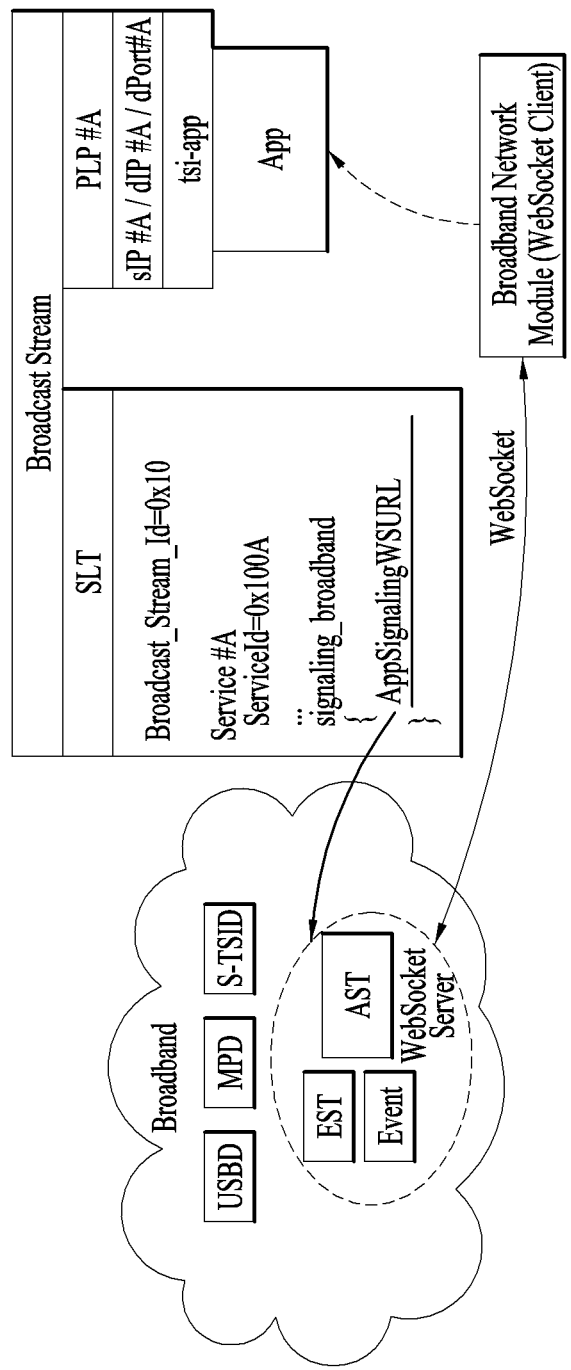
FIG. 33 is a diagram illustrating an AST, an EST, and an emsg box transmitted over broadband using WebSocket according to an embodiment of the present invention.

FIG. 33 is a diagram illustrating an AST, an EST, and an emsg box transmitted over broadband using WebSocket according to an embodiment of the present invention.

In transmitting the SLS over broadband, the SLS may be transmitted through the WebSocket server based on the URL information.

For example, when the AST, the EST (static event), and the emsg box (or dynamic event) are delivered over broadband, the AST, EST, and emsg boxes may be acquired via WebSocket. Through the WebSocket server, the AST, EST, and emsg box may be acquired using the AppSignalingWSURL information in the SLT described above. The AppSignalingWSURL information may be URL information for acquiring the AST, EST, and emsg box.

Referring to the figure, the AST, EST, and emsg box may be transmitted simultaneously and/or via one WebSocket server. In addition, the detailed description of the figure may include all the details described above.

FIG. 34 is a diagram illustrating API and an event listener according to an embodiment of the present invention.

Referring to FIG. (a), a listener is shown.

An event processor may be a code that is executed in response to event occurrence. For example, the event processor may be a java script code to be executed in response to event occurrence. The event processor may include an event listener (an event listener or a listener). Differently from an event handler for processing only one event with respect to one element, the event listener may process at least one event with respect to one element.

The listener may include a general signature of a document object mode (DOM) event listener. Here, the DOM may refer to a model (system) for supporting the event handler to be connected to all element nodes.

The listener according to an embodiment of the present invention may include a StreamEvent type of object. For example, the listener may be configured in the form of listener (StreamEvent event).

A StreamEvent type of object transmitted to the listener may be obtained by extending a general DOM Event type of object.

The StreamEvent type of object may include name attribute, data attribute, text attribute, status attribute, and/or time attribute.

The name attribute may indicate a name of an event. The name attribute may be reading dedicated attribute and may be of a String type.

The data attribute may indicate data of an event encoded in hexadecimal. For example, data attribute may have a value of "0A10B81033". The data attribute may be reading dedicated attribute and may be of a String type.

The text attribute may indicate text data of an event. For example, when the data attribute includes a text, the text attribute may have values of ASCII code. The text attribute may be a child element of an Event element for activation of an event and may include data identified by data identifier (dataID) that is clearly described in a trigger or in the Event element of the EMT. The text attribute may be reading dedicated attribute and may be of a String type.

The status attribute may indicate a state of an event. When an event is activated in response to a trigger, the status attribute may indicate "trigger". When some types of errors occur, the status attribute may indicate "error". The status attribute may be reading dedicated attribute and may be of a DOMString type.

The time attribute may indicate a time at which an event occurs. The time attribute may be reading dedicated attribute and may be of an integer type.

Referring to FIG. (b), API for addition and/or deletion of an event listener (or a listener) is shown.

An event processing method according to an embodiment of the present invention may include a method of connecting an object of an event listener and a method of the object. In this method, the event listener may be connected to a method of an object and, then, when an event occurs, the method of the object is executed.

In order to support the event processing method, addStreamEventListener API and/or removeStreamEventListener API according to an embodiment of the present invention may be used.

The addStreamEventListener API may add a listener (e.g., an event listener or a stream event listener) for an event. The addStreamEventListener API may add a listener for an event determined by an event identifier (e.g., eventID) in a range of a currently executed html application, to the AST. When a corresponding event is activated by a trigger, the listener is called. A TriggerEvent type (or StreamEvent type) object may be transmitted. Listeners may be added only when a video/broadcast object is presented and/or stopped.

The addStreamEventListener API may include at least one of targetURL parameter, eventName parameter, and/or Listener parameter. For example, the addStreamEventListener API may have the same format as addStreamEventListener (targetURL, eventName, and listener).

The targetURL parameter may indicate URL of a StreamEvent object for describing an event. The targetURL parameter may be mapped to schemeIdURI attribute of a DASH EventStream element.

The eventName parameter may indicate a name of an event as a subscription target. The eventName may be mapped to value attribute of the DASH EventStream element.

The Listener parameter may indicate a listener for an event. The Listener parameter may be a call-back function. When an event occurs, the listener parameter may be called as a parameter along with the transmitted StreamEvent object.

The targetURL parameter and the eventName parameter may be an event identifier for identifying an event. For example, the addStreamEventListener API may include an event identifier (eventId) parameter and a listener parameter. For example, the addStreamEventListener API may be of an addTriggerEventListener (String eventide and EventListener listener) type. The event identifier may be an identifier of an event present in an event element in the EMT. The event identifier may be an identifier (e.g., id field of emsg box) of events that are dynamically updated by a trigger.

The removeStreamEventListener API may remove a listener for an event. The removeStreamEventListener API may remove a listener for an event determined by an event identifier (e.g., eventID).

The removeStreamEventListener API may include at least one of targetURL parameter, eventName parameter, and/or Listener parameter. For example, the removeStreamEventListener API may have the same format as removeStreamEventListener (targetURL, eventName, and listener).

The targetURL parameter may indicate URL of a StreamEvent object. The targetURL parameter may be mapped to schemeIdURI attribute of the DASH EventStream element.

The eventName parameter may indicate a name of an event that is a removal target of subscription. The eventName may be mapped to value attribute of the DASH EventStream element.

The Listener parameter may indicate a listener for an event. The Listener parameter may be a call-back function. When an event occurs, the Listener parameter may be called as a parameter along with the transmitted StreamEvent object.

The targetURL parameter and the eventName parameter may be an event identifier for identifying an event. For example, the removeStreamEventListener API may include an event identifier (eventId) parameter and a listener parameter. For example, the removeStreamEventListener API may be of format of removeTriggerEventListener (StringeventId and EventListener listener). The event identifier may be an identifier (e.g., EventID attribute or id attribute) of an event present in an event element in the EMT. The event identifier may be an identifier (e.g., id field of emsg box) that is dynamically updated by a trigger.

The broadcast reception apparatus according to an exemplary embodiment of the present invention may add a listener for an event based on the addStreamEventListener API. The broadcast reception apparatus may add the listener for the event based on the removeStreamEventListener API. The addStreamEventListener API and/or the removeStreamEventListener API may support synchronization of html application actions for broadcast programming.

FIG. 35 illustrates WebSocket opening handshake between a client and a server according to an embodiment of the present invention.

Various application information-related tables and event-related tables including dynamic events may be transmitted over broadband as well as broadcast. Use of notifications, as well as polling, may be supported for broadband transmission of application tables, event tables, and/or dynamic events, since new application information and/or event information need to be dynamically transmitted at any time.

Two dynamic notifications of the application and/or event table may be supported on broadband. The first is a notification of availability of an updated application and/or event table for a service. The second is a notification of availability of the updated application and/or event table for the service, and may include the application and/or event table data in the notification.

Hereinafter, a dynamic notification will be described.

Dynamic notification of an application and/or event table on a broadband connection may include the following steps.

First, a broadband server URL that may receive table notifications may be signaled in the SLT in the broadcast stream.

Then, WebSocket connection with the table notification URL server may be established by the receiver to receive a table availability notification (and/or table data notification) message.

Hereinafter, the WebSocket connection will be described in detail.

In the WebSocket-based architecture, communication may be performed between the server and the receiver (or an application running on the receiver). In the WebSocket-based architecture, the server may include a WebSocket server, and the receiver may include respective applications. Here, the receiver and/or each application of the receiver may be referred to as a WebSocket client.

The WebSocket server in the server may have endpoints for each of the operations/functions provided by the server. The end points may be connected to the receiver (or an application on the receiver side) to transmit data and/or signaling information, or to allow communication between the server and the receiver (or an application on the receiver side). For example, an endpoint may include a table notification URL server.

First, a discovery process may be performed between the server and the receiver (or an application running on the receiver side). In this process, the information about the end points of the WebSocket server may be transmitted to the receiver (or application on the receiver side).

For each endpoint, the receiver (or application on the receiver side) and the WebSocket server on the server side may perform a handshake process. When the receiver (or the application on the receiver side) first requests opening of the handshake, the WebSocket server may send a response thereto.

In this way, the WebSocket server and receiver (or application on the receiver side) may be connected via an endpoint.

In the WebSocket architecture, when the WebSocket server and the receiver (or application on the receiver side) are connected to an endpoint, the information may flow via the endpoint. Messages may be freely relayed between the server and the receiver (or the application on the receiver side) in two ways.

Hereinafter, the WebSocket opening handshake will be described in detail.

Referring to FIG. (a), an HTTP upgrade request from the receiver (or client) to the server is shown.

The HTTP upgrade request may include Host information, Upgrade information, Connection information, Sec-WebSocket-Key information, Sec-WebSocket-Protocol information, Sec-WebSocket-Version information, and/or NotificationType information.

Host information may indicate the address of the Host. The upgrade information may indicate an upgrade scheme. For example, the Upgrade information may indicate WebSocket or HTTP. The Connection information may indicate a connection scheme. For example, when communication is performed to update data, the Connection information may indicate "upgrade". The Sec-WebSocket-Key information may indicate the key value of the WebSocket. The Sec-WebSocket-Protocol information may indicate the protocol information of the WebSocket. For example, the Sec-WebSocket-Protocol information may indicate "ATSCAppSignaling". The Sec-WebSocket-Version information may indicate the version of the WebSocket.

The NotificationType information may indicate the type of notification as to whether or not the notification is requested. That is, the NotificationType information may indicate the type of notification as to whether or not the notification including table data is requested.

For example, the NotificationType information may indicate whether only the table availability notification is requested (e.g., a case when the value of the NotificationType information is "0") or the table availability notification is requested together with the table data (e.g., a case when the value of the NotificationType information is "1").

Referring to FIG. (b), a successful response from the server to the receiver (or client) is shown.

The response may include Upgrade information, Connection information, Sec-WebSocket-Accept information, Sec-WebSocket-Protocol information, and/or NotificationType information.

The upgrade information may indicate the upgrade scheme. For example, the Upgrade information may indicate WebSocket or HTTP. The Connection information may indicate a connection scheme. For example, when communication is performed to update data, the Connection information may indicate "upgrade". The Sec-WebSocket-Accept information may indicate the Accept value of the WebSocket. The Sec-WebSocket-Protocol information may indicate the protocol information on the WebSocket. For example, the Sec-WebSocket-Protocol information may indicate "ATSCAppSignaling".

The NotificationType information may indicate the type of notification regarding whether the response is a notification or not. That is, the NotificationType information may indicate whether the response is a notification including table data.

For example, the NotificationType information may indicate whether only the table availability notification is transmitted (e.g., a case when the value of the NotificationType information is "0") or the table availability notification is transmitted together with the table data (e.g., a case when the value of the NotificationType information is "1").

FIG. 36 illustrates extension of NotificationType information according to an embodiment of the present invention.

NotiType information (or NotificationType information) may be further defined in the Sec-WebSocket-Extensions header field. The NotiType information may have a value of "0" or "1". An extension-parameter may also be defined for the NotiType information having a value of "0" or "1". That is, the extension-parameter may be expressed as "ntval= (0|1)".

Referring to FIG. (a), an HTTP upgrade request from a receiver (or client) to a server is shown. Details of the HTTP upgrade request may include all the details of the HTTP upgrade request described above. Hereinafter, differences will be mainly described.

The HTTP upgrade request may further include Sec-WebSocket-Extension information (or Sec-WebSocket-Extension request header field) describing the WebSocket extension information. The Sec-WebSocket-Extension information may include NotiType information.

For example, the NotiType information may indicate a notification type regarding whether or not a notification is requested. That is, the NotiType information may indicate a notification type regarding whether or not a notification including table data is requested.

For example, if the NotiType information is used in the Sec-WebSocket-Extension request header, the NotiType information may indicate whether only the table availability notification is requested (e.g., a case when the value of the extension-parameter is "0" or the value of the NotiType information is "0") or the table availability notification is requested together with the table data (e.g., a case when the value of the expansion-parameter is "1" or the value of the NotiType information is "1").

Referring to FIG. (b), a successful response from the server to the receiver (or client) is shown. Details of the response may include all the details of the above-described response. Hereinafter, differences will be mainly described.

The response may further include Sec-WebSocket-Extension information (or Sec-WebSocket-Extension response header field) describing the WebSocket extension information. The Sec-WebSocket-Extension information may further include NotiType information.

For example, the NotiType information may indicate a notification type regarding whether the response is a notification or not. That is, the NotiType information may indicate whether or not the response is a notification including table data.

For example, if the NotiType information is used in the Sec-WebSocket-Extensions response header, the NotiType information may indicate whether only the table availability notification is transmitted in the notification response (e.g., a case when the value of the extension-parameter is "0" or the value of the NotiType information is "0") or the table availability notification is transmitted together with the table data (e.g., a case when the value of the expansion-parameter is "1" or the value of the NotiType information is "1").

FIG. 37 illustrates a binary format notification message according to an embodiment of the present invention.

FIG. 38 illustrates a binary format notification message according to an embodiment of the present invention.

A Notification message according to an embodiment of the present invention may include both the notification described above, the table availability notification, and/or the notification for the table data. The Notification message may be expressed as an ATSCNotify subprotocol message or an ATSCAppSignaling subprotocol message.

The Notification message may include a NOTIFY_ID element, a TT (TABLE_TYPE) element, a TABLE_VERSION element, a SERVICE_ID element, an AC (ACTION_CODE) element, a DATA_LENGTH element, a DATA_FORMAT element, a DATA_ENCODING element, a TABLE_DATA element, a URL_LENGTH element, a URL_FORMAT element, a URL_ENCODING element, and/or a TABLE_URL element.

The NOTIFY_ID element may indicate a notification identifier that uniquely identifies the corresponding ATSC notification connection.

The TT (TABLE_TYPE) element may indicate the type of the table which the updated data can use. If the value of the TT (TABLE_TYPE) element is "0", this may indicate that the updated data can use the AST and/or AIT. If the value is "1", this may indicate that the updated data can use static events (i.e., Event Signaling Table, Event Message Table). If the value is "2", this may indicate that the updated data can use dynamic events (e.g., event elements or emsg boxes). If the value is "3", this may indicate that the updated data can use all the above (e.g., AST, AIT, static events, and/or dynamic events).

The TABLE_VERSION element may indicate the version of the table which the updated data can use. The three most significant bits may indicate a major version of the table, and the least significant bit may indicate a minor version of the table.

The SERVICE_ID element may indicate a service identifier to which notifications and table data are applicable. The SERVICE_ID element can uniquely identify the service.

The AC (ACTION_CODE) element may define the type of an action.

In a first embodiment, if the value of the AC (ACTION_CODE) element is "0", this may indicate a table notification from the server to the client (or receiver). If the value of the AC (ACTIONCODE) element is "1", this may indicate a notification cancel request from the client to the server for a notification stream identified by the NOTIFY_ID element, a service identified by the SERVICE_ID element, and a table type identified by the TT (TABLE_TYPE) element. If the value of the AC element is "2", this may indicate a notification renew request from the client to the server for a notification connection identified by the NOTIFY_ID element, a service identified by the SERVICE_ID element, and a table of a type identified by the TT (TABLE_TYPE) element.

In a second embodiment, if the value of the AC (ACTION_CODE) element is "0", this may indicate a table notification from the server to the client (or receiver). If the value of the AC (ACTION_CODE) element is "1", this may indicate a Notification PAUSE request from the client to the server for a notification connection identified by the NOTIFY_ID element, a service identified by the SERVICE_ID element, and a table type identified by the TT (TABLE_TYPE) element. If the value of the AC (ACTION_CODE) element is "2", this may indicate a Notification RESUME request from the client to the server for a notification connection identified by the NOTIFY_ID element, a service identified by the SERVICE_ID element, and a table type identified by the TT (TABLE_TYPE) element. If the value of the AC (ACTION_CODE) element is "3", this may indicate a request from the client to the server to receive the current table data of a table type indicated by the TT (TABLE_TYPE) element. The NOTIFY_ID element may provide an identifier for the request. If the value of the AC (ACTION_CODE) element is "4", this may indicate a table response from the server to the client for the request from the client. The server may use the same NOTIFY_ID element as used for the request from the client.

The Notification cancel request may be represented by the Notification PAUSE request. In addition, the Notification renew request may be represented by the Notification RESUME request.

The DATA_LENGTH element may provide the length in bytes of the following TABLE_DATA element. If the value of the DATA_LENGTH element is "0", the TABLE_DATA element may not be included in the notification and may be retrieved from the URL for the table. If the value of the AC (ACTION_CODE) element is "1" to "3", the value of the DATA_LENGTH element may be "0".

The DATA_FORMAT element may define the format of the TABLE_DATA element. If the value of the DATA_FORMAT element is "0", the format may not be defined. If the value of the DATA_FORMAT element is "1", the format used for the TABLE_DATA element may be a binary bit stream. If the value of the DATA_FORMAT element is "2", the format used for the TABLE_DATA element may be XML. If the value of the DATA_FORMAT element is "3", the format used for the TABLE_DATA element may be JSON.

The DATA_ENCODING element may define the encoding type of the TABLE_DATA element. If the value of the DATA_ENCODING element is "0", the encoding type may not be defined. If the value of the DATA_ENCODING element is "1", the encoding type may indicate Null (unencoded or uncompressed). If the value of the DATA_ENCODING element is "2", the encoding type may indicate DEFLATE (RFC1951). If the value of the DATA_ENCODING element is "3", the encoding type may indicate GZIP (RFC1952).

The TABLE_DATA element may contain (optional) table data for the table indicated by the TT (TABLE_TYPE) element. The content of the TABLE_DATA element may conform to the syntax of an individual table indicated by the TT (TABLE_TYPE) element. If the value of the AC (ACTION_CODE) element is "1" to "3", the TABLE_DATA element may not be provided. The table data may be in a bit stream (binary), XML, or JSON format. Rules specified in the NotificationType header field regarding inclusion of TABLE_DATA element shall be followed.

The URL_LENGTH element may provide the length in bytes of the data of the following TABLE_URL element. If the value of the URL_LENGTH element is "0", the TABLE_URL element may not be included in the notification. If the value of the AC (ACTION_CODE) element is "1" to "3", the value of the URL_LENGTH element may be The URL_FORMAT element may define the format of the TABLE URL element. If the value of the URL_FORMAT element is "0", the format of the TABLEURL element may not be defined. If the value of the URL_FORMAT element is "1", the format of the TABLE_URL element may be a binary bit stream. If the value of the URL_FORMAT element is "2", the format of the TABLE_URL element may be XML. If the value of the UR_LFORMAT element is "1", the format of the TABLE_URL element may be JSON.

The URL_ENCODING element may define the encoding type of the TABLE_URL element. If the value of the URL_ENCODING element is "0", the encoding type of the TABLE_URL element may not be defined. If the value of the URL_ENCODING element is "1", the encoding type of the TABLE_URL element may indicate Null (unencoded or uncompressed). If the value of the URL_ENCODING element is "2", the encoding type may indicate DEFLATE (RFC1951). If the value of the URL_ENCODING element is "3", the encoding type may indicate GZIP (RFC1952).

The TABLE_URL element may indicate the URL of the table that the client (or receiver) may access to acquire table data. If the value of the AC (ACTION_CODE) element is "1" to "3", the TABLE_URL element may not be provided. Alternatively, the TABLE_URL element may contain an optional URL for the table indicated by the TT (TABLE_TYPE) element. The current table data may be retrieved from the URL by an HTTP GET request.

If the application information data (or AST) and/or the application information table (or AIT) are changed, and/or a new static event/dynamic event needs to be announced, the server may notify the client thereof within a few seconds (for example, 10 seconds) on the established WebSocket connection using a notification message with the AC (ACTION_CODE) element set to "0".

Hereinafter, pause and/or resumption of reception of an ATSC application and/or event notifications for a service will be described.

As the client transmits, to the server, an AC (ACTION_CODE) element set to "1" in the notification message, the client that is receiving notifications for a specific table type identified by the TT (TABLE_TYPE) element for a specific service identified by the SERVICE_ID element may pause reception of the notifications.

Upon receipt of the notification message indicating PAUSE, the server may pause transmission of the notifications to the client on a notification stream identified by the NOTIFY_ID element in the client request, for types of tables identified by the TT (TABLE_TYPE) element for the service identified by the SERVICE_ID element in the client request.

As the client transmits, to the server, an AC (ACTION_CODE) element set to "2" in the notification message, the client that has previously received notification messages indicating PAUSE and paused reception may resume reception of the notifications for the specific table type identified by the TT (TABLE_TYPE) element for the specific service identified by the SERVICE_ID element.

If the notifications have previously been paused, the server may resume transmission of the notifications on the notification stream identified by the NOTIFY_ID element in the client request, for the types of tables identified by the TT (TABLE_TYPE) element in the client request for the service identified by the SERVICE_ID element in the client request.

A Request and/or Response for supporting retrieval of an application and/or an event table for a service will be described.

The client may transmit, to the server, an ACTION_CODE element having a value of "3" in the notification message, thereby transmitting, to the server, a request (or request message) for receiving the current table for a specific table type identified by the TT (TABLE_TYPE) element for a service identified by the SERVICE_ID element. In this case, the client may arbitrarily assign a value of the NOTIFY_ID element in the range of "0xF000" to "0xFFFF" in order to identify the request (or the request message).

Upon receiving the request message, the server may transmit, to the client, the current table together with a NOTIFY_ID element set to the value included in the request of the client, for the specific table type identified by the TT (TABLE_TYPE) element in the client request for the specific service identified by the SERVICE_ID element in the client request.

The WebSocket connection may be terminated at any time by the server and/or the client.

FIG. 39 illustrates an XML format notification message according to an embodiment of the present invention.

The notification message according to an embodiment of the present invention may be configured in XML format as well as binary format.

The notification message in the XML format may include the entire information included in the above-described notification message of the binary format. In addition, the notification message in the XML format may perform the same function as the above-described notification message in the binary format.

FIG. 40 illustrates a JSON format notification message according to an embodiment of the present invention.

The notification message according to an embodiment of the present invention may be configured in a JSON format as well as a binary format and/or an XML format.

The notification message in the JSON format according to an embodiment of the present invention may include the entire information included in the notification message in the above-described binary format and/or XML format. In addition, the notification message in the JSON format may perform the same function as the notification message in the above-described binary format and/or XML format.

FIG. 41 illustrates a JSON format notification message according to an embodiment of the present invention.

The notification message according to an embodiment of the present invention may be configured in a JSON format as well as a binary format and/or an XML format.

The notification message of the JSON format according to an embodiment of the present invention shown in the figure may have a different structure from the notification message of the JSON format described above. However, the notification message in the JSON format according to the embodiment of the present invention illustrated in the figure may include the entirety of the information included in the notification message in the binary format, the XML format, and/or the JSON format described above. In addition, the notification message of the JSON format according to the embodiment of the present invention illustrated in the figure may perform the same function as the notification message of the binary format, the XML format, and/or the JSON format described above.

FIG. 42 illustrates a binary format message according to another embodiment of the present invention.

FIG. 43 illustrates a binary format message according to another embodiment of the present invention.

A message according to an embodiment of the present invention may include a request message and/or a response message.

The message may be merged with the notification message described above and transmitted as one notification message using WebSocket. In this case, the server and/or the client may request the data and/or respond using a request message and/or a response message, as well as when the data is updated, using the WebSocket.

In addition, the message may be separately transmitted using HTTP. In the case of using HTTP, the server and/or the client may request the data and/or respond using the request message and/or the response message according to HTTP.

The message may include a MESSAGE_ID element, a TT (TABLE_TYPE) element, a TABLE_VERSION element, a SERVICE_ID element, an AC (ACTION_CODE) element, a DATA_ LENGTH element, a DATA_FORMAT element, a DATA_ENCODING element, a TABLE_DATA element, a URL_LENGTH element, a URL_FORMAT element, a URL_ENCODING element, and/or a TABLE_URL element.

The MESSAGE_ID element may indicate a message identifier that uniquely identifies the message.

The TT (TABLE_TYPE) element may indicate the type of the table that the updated data can use. If the value of the TT (TABLE_TYPE) element is "0", this may indicate that the updated data can use the AST and/or AIT. If the value is "1", this may indicate that the updated data can use static events (i.e., Event Signaling Table, Event Message Table). If the value is "2", this may indicate that the updated data can use dynamic events (e.g., event elements or emsg boxes). If the value is "3", this may indicate that the updated data can use all the above (e.g., AST, AIT, static events, and/or dynamic events).

The TABLE_VERSION element may indicate the version of the table which the updated data can use. The three most significant bits may indicate a major version of the table, and the least significant bit may indicate a minor version of the table.

The SERVICE_ID element may indicate a service identifier to which the message and table data are applicable. The SERVICE_ID element may uniquely identify the service.

The AC (ACTION_CODE) element may define the type of an action.

For example, if the value of the AC (ACTION_CODE) element is "0", a table request from the client to the server may be indicated to receive the current table data of the table type indicated by the TT (TABLE_TYPE) element. The MESSAGE_ID element may provide an identifier for the request. If the value of the AC (ACTION_CODE) element is "1", a table response from the server to the client may be indicated for the request from the client. The server may use the same MESSAGE ID element as that for the request from the client.

The DATA_LENGTH element may provide the length in bytes of the following TABLE_DATA element. If the value of the DATA_LENGTH element is "0", the TABLE_DATA element may not be included in the message and may be retrieved from the URL for the table. If the value of the AC (ACTION_CODE) element is "0", the value of the DATA_LENGTH element may be "0".

The DATA_FORMAT element may define the format of the TABLE_DATA element. If the value of the DATA_FORMAT element is "0", the format may not be defined. If the value of the DATA_FORMAT element is "1", the format used for the TABLE_DATA element may be a binary bit stream. If the value of the DATA_FORMAT element is "2", the format used for the TABLE_DATA element may be XML. If the value of the DATA_FORMAT element is "3", the format used for the TABLE_DATA element may be JSON.

The DATA_ENCODING element may define the encoding type of the TABLE_DATA element. If the value of the DATA_ENCODING element is "0", the encoding type may not be defined. If the value of the DATA_ENCODING element is "1", the encoding type may indicate Null (unencoded or uncompressed). If the value of the DATA_ENCODING element is "2", the encoding type may indicate DEFLATE (RFC1951). If the value of the DATA_ENCODING element is "3", the encoding type may indicate GZIP (RFC1952).

The TABLE_DATA element may contain (optional) table data for the table indicated by the TT (TABLE_TYPE) element. The content of the TABLE_DATA element may conform to the syntax of an individual table indicated by the TT (TABLE_TYPE) element. If the value of the AC (ACTION_CODE) element is "0", the TABLE_DATA element may not be provided. The table data may be in a bit stream (binary), XML, or JSON format.

The URL_LENGTH element may provide the length in bytes of the data of the following TABLE_URL element. If the value of the URL_LENGTH element is "0", the TABLE_URL element may not be included in the message. If the value of the AC (ACTION_CODE) element is "0", the value of the URL_LENGTH element may be "0".

The URL_FORMAT element may define the format of the TABLE_URL element. If the value of the URL_FORMAT element is "0", the format of the TABLE_URL element may not be defined. If the value of the URL_FORMAT element is "1", the format of the TABLE_URL element may be a binary bit stream. If the value of the URL_FORMAT element is "2", the format of the TABLE_URL element may be XML. If the value of the URL_FORMAT element is "1", the format of the TABLE_URL element may be JSON.

The URL_ENCODING element may define the encoding type of the TABLE_URL element. If the value of the URL_ENCODING element is "0", the encoding type of the TABLE_URL element may not be defined. If the value of the URL_ENCODING element is "1", the encoding type of the TABLE_URL element may indicate Null (unencoded or uncompressed). If the value of the URL_ENCODING element is "2", the encoding type may indicate DEFLATE (RFC1951). If the value of the URL_ENCODING element is "3", the encoding type may indicate GZIP (RFC1952).

The TABLE_URL element may indicate the URL of the table that the client (or receiver) may access to acquire table data. If the value of the AC (ACTION_CODE) element is "0", the TABLE_URL element may not be provided. Alternatively, the TABLE_URL element may contain an optional URL for the table indicated by the TT (TABLE_TYPE) element. The current table data may be retrieved from the URL by an HTTP GET request.

The client may transmit, to the server, an AC (ACTION_CODE) element having a value of "0" in the message, for a specific service identified by the SERVICE_ID element, thereby transmitting, to the server, a request (or request message) for receiving the current table for a specific table type identified by the TT (TABLE_TYPE) element for a service identified by the SERVICE_ID element. In this case, the client may arbitrarily assign a value of the NOTIFY_ID element in the range of "0xF000" to "0xFFFF" in order to identify the request (or the request message).

Upon receiving the request message, the server may transmit, to the client, the current table together with a NOTIFY_ID element set to the value included in the request of the client, for the specific table type identified by the TT (TABLE_TYPE) element in the client request for the specific service identified by the SERVICE_ID element in the client request.

FIG. 44 illustrates an XML format message according to an embodiment of the present invention.

A message according to an embodiment of the present invention may be configured in XML format as well as binary format.

The message in the XML format may contain may include all of the information included in the above-described message of the binary format. In addition, the message in the XML format may perform the same function as the above-described message in the binary format.

FIG. 45 illustrates a JSON format message according to an embodiment of the present invention.

The message according to an embodiment of the present invention may be configured in the JSON format as well as the binary format and/or the XML format.

A JSON format message according to an embodiment of the present invention may include all of the information included in the binary format and/or XML format message described above. In addition, the JSON format message may perform the same function as the binary format and/or XML format message described above.

FIG. 46 illustrates a JSON format message according to an embodiment of the present invention.

The message according to an embodiment of the present invention may be configured in the JSON format as well as the binary format and/or the XML format.

The JSON format message according to an embodiment of the present invention shown in the figure may have a structure different from the JSON format message described above. However, the JSON format message according to the embodiment shown in the figure may include all of the information included in the above-described message of the binary format, the XML format, and/or the JSON format. Further, the JSON format message according to the embodiment shown in the figure may perform the same functions as the above-described message in the binary format, XML format, and/or JSON format.

Hereinafter, a method of transmitting a trigger using a DASH Event and an emsg box will be described.

Figure 47:
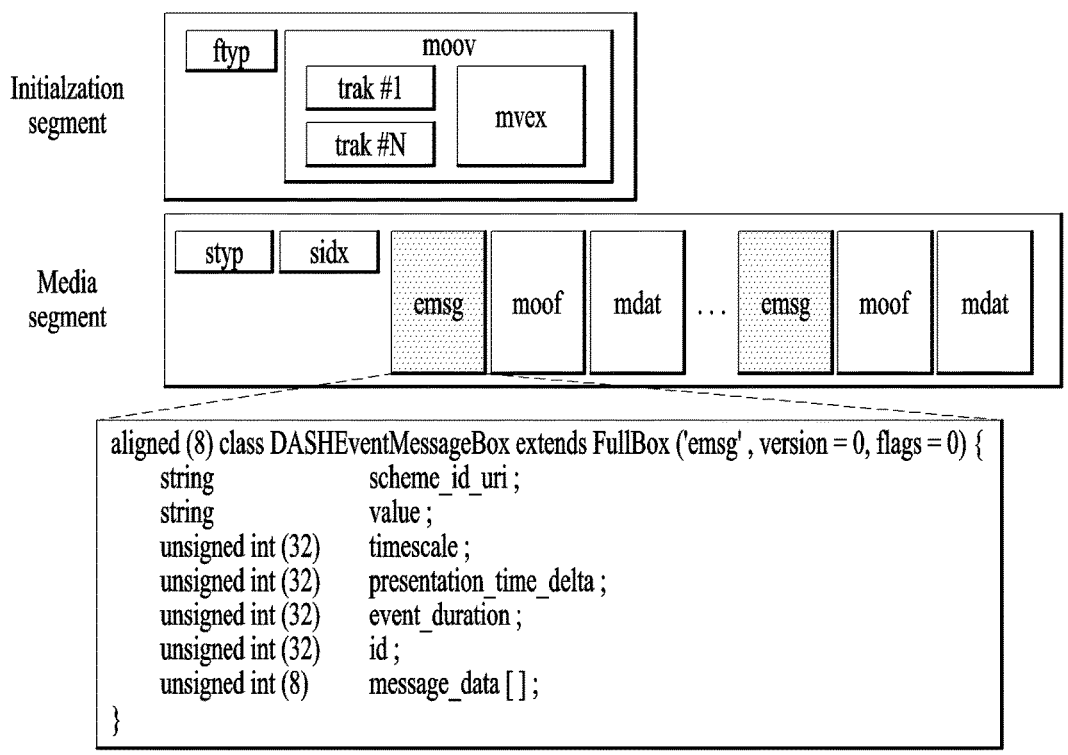
FIG. 47 is a diagram illustrating an emsg box according to an embodiment of the present invention.

FIG. 47 is a diagram illustrating an emsg box according to an embodiment of the present invention.

In an embodiment of the present invention, it is proposed that a trigger be transmitted via an audio segment and/or a video segment using an emsg box within an ISO BMFF file.

The service data may include ab audio component and/or a video component. The audio component may include at least one audio segment. The video component may include at least one video segment. Each audio segment and/or video segment may include an initialization segment and/or a media segment.

The Initialization segment is an object-type data unit containing initialization information for accessing a Representation. The initialization segment may include a file type box (ftyp) and a movie box (moov). The file type box (ftyp) may include file type, file version, and compatibility information. The movie box (moov) may include metadata describing the media content.

The media segment refers to a data unit in the form of a media-related object, separated by time and quality, to be transmitted to a receiver to support a streaming service. The media segment may include a segment type box (styp), a segment index box (sidx), a movie fragment box (moof), and a media data box (mdat). The segment type box (styp) may include segment type information. The segment index box (sidx) may provide the initial presentation time and data offset of the media data present in the corresponding media segment, SAP (Stream Access Points) information, and the like. The movie fragment box (moof) may contain metadata for the media data box (mdat). The media data box (mdat) may contain actual media data for the corresponding media component (video and audio, etc.).

The media segment may include an emsg box for transmitting a dynamic event and/or an in-band event, before the movie fragment box (moof).

The emsg box may provide signaling information for generic events related to media presentation time. The emsg box may include at least one of a schemeIdUri field, a value field, a timescale field, a presentationTimeDelta field, an eventDuration field, an id field, and/or a messageData field. The details of the emsg box may include all the details of the emsg box described above.

There are two methods to transmit a trigger using the emsg box. The first method is to map the fields of the emsg box to the trigger format. The second method is to include a trigger in the messageData field of the emsg box. Details will be described below.

FIG. 48 is a diagram illustrating fields of an emsg box mapped to a trigger format according to an embodiment of the present invention.

Referring to the figure, a method of mapping a field of an emsg box to a trigger format according to an embodiment of the present invention is shown.

To transmit the trigger, an emsg box according to an embodiment of the present invention may be obtained by extending and/or modifying an existing emsg box.

The emsg box according to an embodiment of the present invention may include at least one of a channelID field, a schemeIdUri field, a value field, an id field, and/or a messageData field. That is, the timescale field, the presentationTimeDelta field, and/or the eventDuration field may be selectively included in the emsg box.

The channelID field may be mapped to the channelID field of the trigger. That is, the channelID field may indicate an identifier for identifying the channel. The channelID field may be new information added to the emsg box.

The schemeIdUri field may specify that some fields of the emsg box shall be mapped to the trigger header format and/or the trigger payload format. That is, the schemeIdUri field may indicate that the content of the corresponding emsg box is a trigger. The same value as the value of the schemeIdUri field may be described in the InbandEventStream element of the MPD.

The value field may be mapped to the cmdID field of the trigger. The value field and/or the cmdID field may indicate the value for which the trigger is intended.

The id field may be mapped to the version field of the trigger. The id field and/or the version field may indicate a version. For example, the id field and/or the version field may indicate the version of the trigger, the version of the event associated with the trigger, and/or the version of the signaling data.

The messageData field may be mapped to the URI_byte field of the trigger. The messageData field and/or the URI_byte field may contain a trigger (or trigger data).

The trigger may include a domain part indicating a registered Internet domain name. The trigger may also include a directory path part representing a random character string for identifying the directory path of the domain name indicated by the domain part. In addition, the trigger may include a parameter part indicating a parameter for triggering the application. Specifically, the triggers may be in the following format:

<domain name part>/<directory path>[?<parameter>]

Here, the domain name part and the directory path part may be mandatory parts that the trigger necessarily includes. In addition, the parameter part may be an optional part that is optionally included in the trigger. The parameter part may include at least one of an event identifier for identifying an event, an application identifier for identifying an application to be triggered, and a timing value indicating a time at which the event is performed. The parameter part may also include a media time of the content. The parameter part may also include a content identifier for identifying the content that the receiver reproduces.

Figure 49:
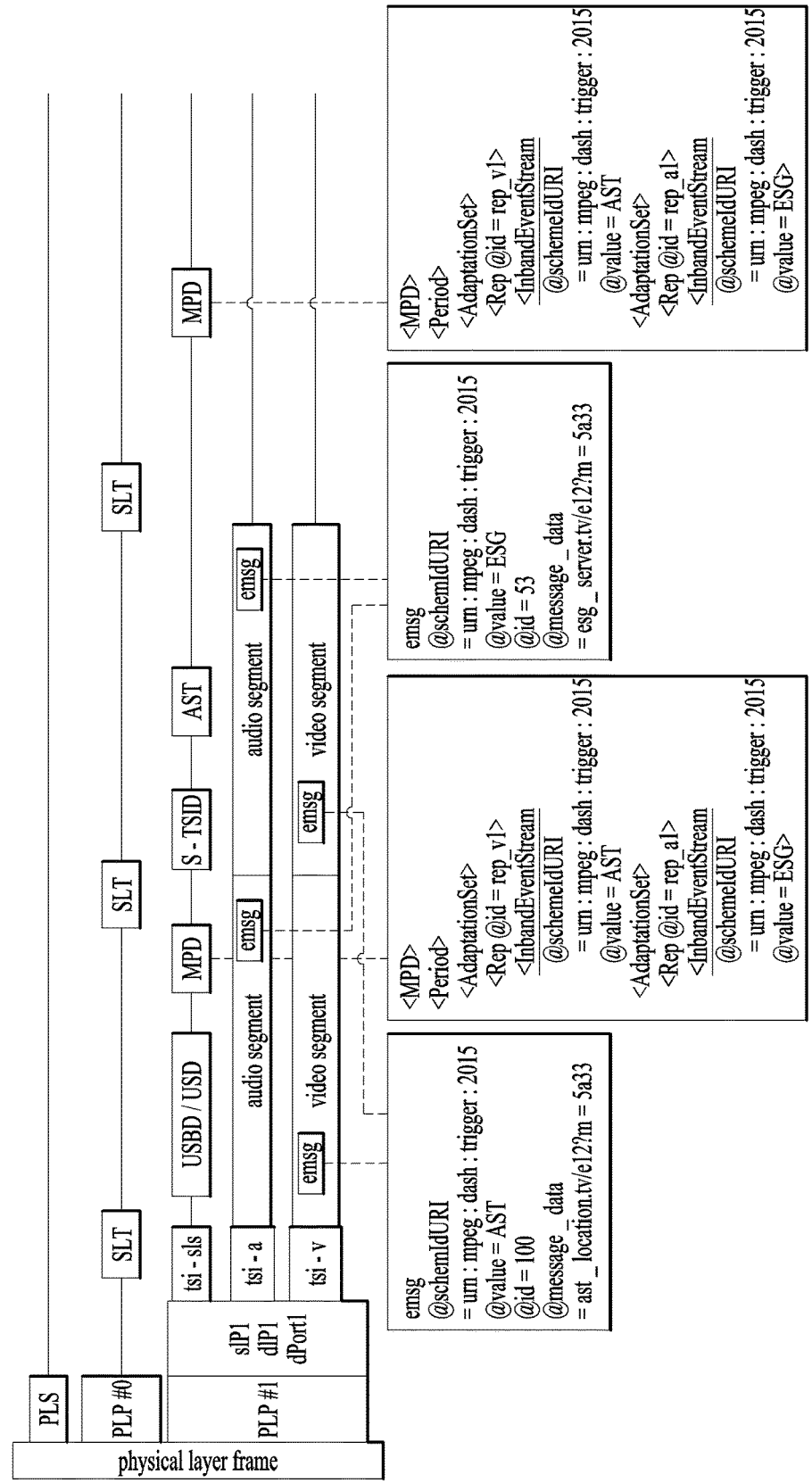
FIG. 49 is a diagram illustrating transmission of an emsg box mapped to a trigger format according to an embodiment of the present invention.

FIG. 49 is a diagram illustrating transmission of an emsg box mapped to a trigger format according to an embodiment of the present invention.

Referring to the figure, a broadcast signal may contain at least one physical layer frame. The physical layer frame may include physical layer signaling data for signaling of the physical layer and/or at least one physical layer pipe.

The SLT may be periodically and/or aperiodically transmitted through the first PLP (PLP #0).

The second PLP (PLP #1) may include a first ROUTE session (sIP1, dIP1, dPort1). The first ROUTE session may include a first transport session (tsi-sls) for transmitting service layer signaling data, a second transport session (tsi-a) for transmitting at least one audio segment (or audio component), and/or a second transport session (tsi-v) for transmitting at least one video segment (or video component).

The service layer signaling data may include USBD/USD, MPD, S-TSID, and/or AST and may be transmitted periodically and/or aperiodically through the first transport session (tsi-sls).

The MPD may include a Period element. The Period element may include a first AdaptationSet element that contains information about the video component and/or a second AdaptationSet element that contains information about the audio component.

The first AdaptationSet element may include a first Representation element that contains information about the representation associated with the video component. The first Representation element may include an InbandEventStream element that specifies presence of an in-band event stream (or dynamic event and/or in-band event) in the associated representation. The InbandEventStream element may include a schemeIdURI attribute and/or a value attribute. The schemeIdURI attribute and/or the value attribute included in the InbandEventStream element may match the schemeIdURI attribute and/or the value attribute in the emsg box included in the video segment. For example, the value of the schemeIdURI attribute may be "urn:mpeg:dash:trigger:2015", and the value of the value attribute may be "AST".

The second AdaptationSet element may include a second Representation element that contains information about the representation associated with the audio component. The second Representation element may include an InbandEventStream element. The InbandEventStream element may include a schemeIdURI attribute and/or a value attribute. The schemeIdURI and/or the value attribute included in the InbandEventStream element may match the schemeIdURI and/or the value attribute in the emsg box contained in the audio segment. For example, the value of the schemeIdURI attribute may be "urn:mpeg:dash:trigger:2015", and the value of the value attribute may be "ESG".

A trigger corresponding to the AST may be transmitted in the emsg box of the video segment.

The emsg box included in the video segment may include at least one of schemeIdUri information, value information, id information, and/or messageData information. The schemeIdUri information may have a value of "urn:mpeg:dash:trigger:2015", the value information may have a value of "AST", the id information may have a value of "100", and/or the messageData information may have a value of "ast_location.tv/e12?m=5a33".

Also, a trigger corresponding to the ESG may be transmitted in the emsg box of the audio segment.

The emsg box included in the audio segment may include at least one of schemeIdUri information, value information, id information, and/or messageData information. The schemeIdUri information may have a value of "urn:mpeg:dash:trigger:2015", the value information may have a value of "ESG", the id information may have a value of "53", and/or the messageData information may have a value of "esg_service.tv/e12?m=5a33".

FIG. 50 is a diagram illustrating an emsg box including a trigger according to an embodiment of the present invention.

Referring to the figure, a method of including a trigger in a messageData field of an emsg box according to an embodiment of the present invention is shown.

To transmit the trigger, an emsg box according to an embodiment of the present invention may be an existing emsg box extended and/or modified with respect to the existing emsg box.

The emsg box according to an embodiment of the present invention may include at least one of a schemeIdUri field, a value field, and/or a messageData field. A timescale field, a presentationTimeDelta field, an eventDuration field, and/or an id field may be selectively included in the emsg box.

The schemeIdUri field and/or the value field may be newly defined in the emsg box according to an embodiment of the present invention.

The schemeIdUri field may specify that the emsg box is a trigger. That is, the schemeIdUri field may be assigned a value indicating that the content of the emsg box is a trigger. The same value as the value of the schemeIdUri field may be described in the InbandEventStream element of the MPD.

The value field may indicate that the event is a trigger. That is, the value field has a value indicating that the event is a trigger.

The messageData field may include fields of the trigger. Specifically, the messageData field may include a channelID field, a cmdID field, a version field, and/or a URI_byte field.

Figure 51:
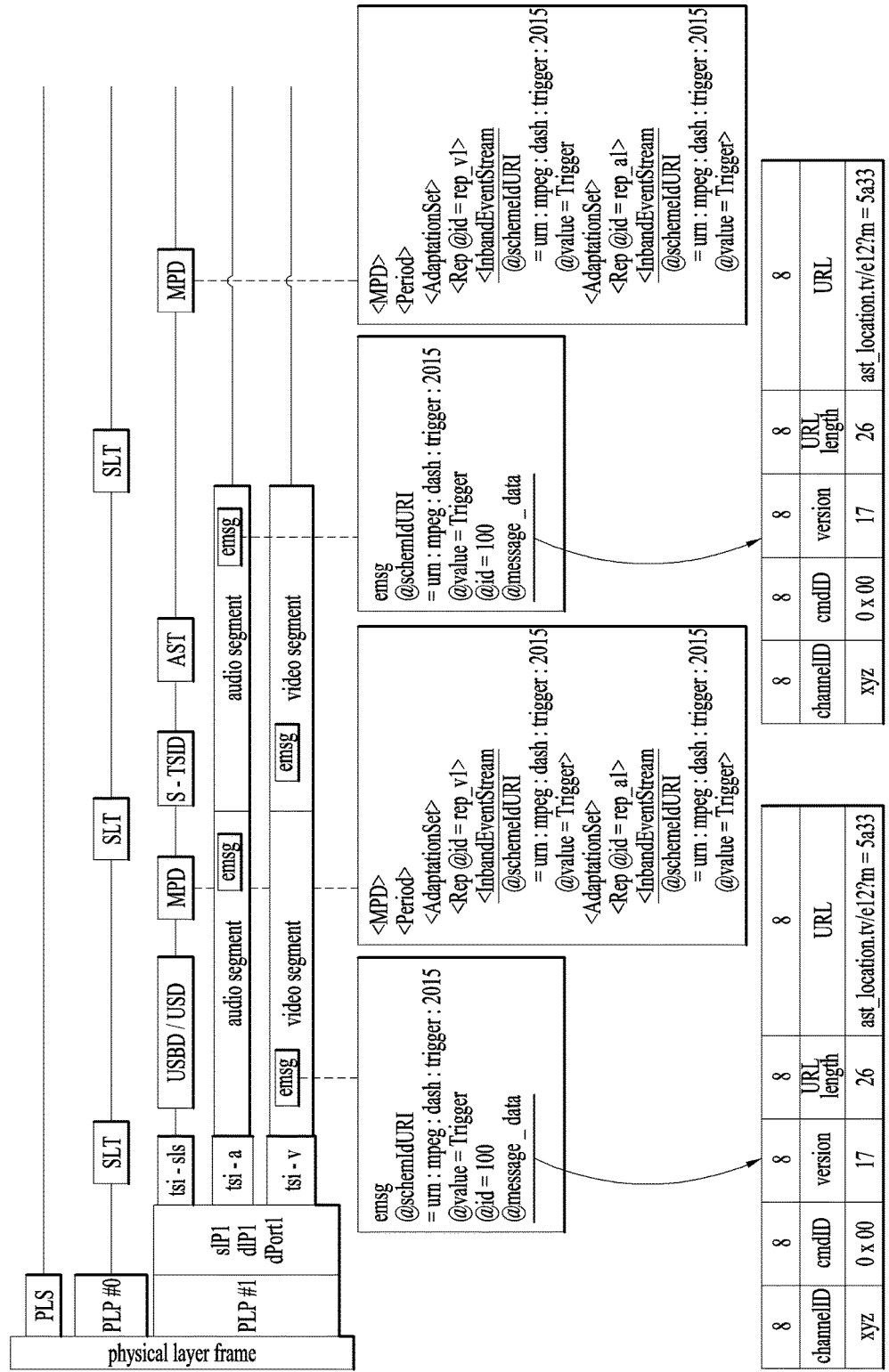
FIG. 51 is a diagram illustrating transmission of an emsg box including a trigger according to an embodiment of the present invention.

FIG. 51 is a diagram illustrating transmission of an emsg box including a trigger according to an embodiment of the present invention.

Referring to the figure, a broadcast signal may include at least one physical layer frame. The physical layer frame may include physical layer signaling data for signaling of the physical layer and/or at least one physical layer pipe. Details of the broadcast signal may include all the details of the broadcast signal described above. Hereinafter, differences will be mainly described.

The MPD may include a Period element. The Period element may include a first AdaptationSet element that contains information about the video component and/or a second AdaptationSet element that contains information about the audio component.

The first AdaptationSet element may include an InbandEventStream element. The schemeIdURI attribute and/or the value attribute contained in the InbandEventStream element may match the schemeIdURI attribute and/or the value attribute in the emsg box included in the video segment. For example, the value of the schemeIdURI attribute may be "urn:mpeg:dash:trigger:2015", and the value of the value attribute may be "Trigger".

The second AdaptationSet element may include an InbandEventStream element. The schemeIdURI and/or value attributes included in the InbandEventStream element may match the schemeIdURI and/or value attributes in the emsg box contained in the audio segment. For example, the value of the schemeIdURI attribute may be "urn:mpeg:dash:trigger:2015", and the value of the value attribute may be "Trigger".

A trigger may be transmitted in the emsg box of the video segment.

The emsg box included in the video segment may include at least one of schemeIdUri information, value information, id information, and/or messageData information. The schemeIdUri information may have a value of "urn:mpeg:dash:trigger:2015", the value information may have a value of "Trigger", and the id information may have a value of "100". The messageData information may include channelID information, cmdID information, version information, URL length information, and/or URI_byte information. The channelID information may have a value of "xyz", the cmdID information may have a value of "0x00", the version information may have a value of "17", the URL length information may have a value of "26", and/or the URI_byte information may have a value of "ast_location.tv/e12?m=5a33".

Also, a trigger may be transmitted in the emsg box of the audio segment.

The emsg box included in the audio segment may include at least one of schemeIdUri information, value information, id information, and/or messageData information. The schemeIdUri information may have a value of "urn:mpeg:dash:trigger:2015", the value information may have a value of "Trigger", and the id information may have a value of "100". The messageData information may include channelID information, cmdID information, version information, URL length information, and/or URI_byte information. The channelID information may have a value of "xyz", the cmdID information may have a value of "0x00", the version information may have a value of "17", the URL length information may have a value of "26", and/or the URL length information may have a value of "ast_location.tv/e12?m=5a33".

Figure 52:
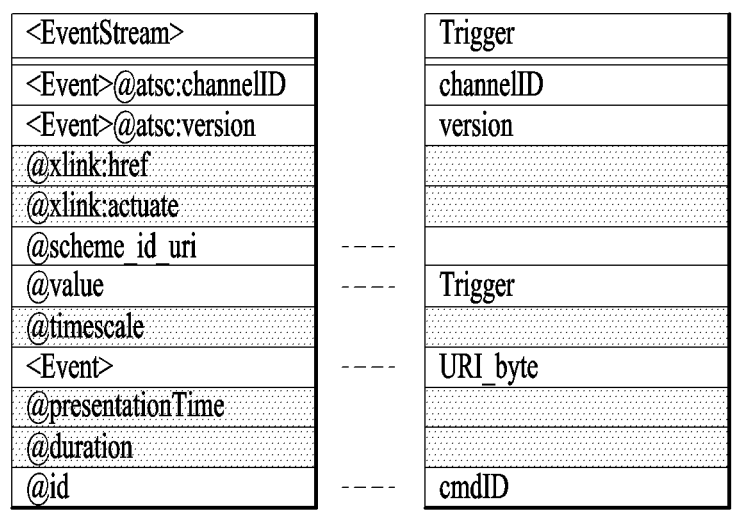
FIG. 52 is a diagram illustrating an EventStream element including a trigger, using the extensibility of an Event sub-element according to an embodiment of the present invention.

FIG. 52 is a diagram illustrating an EventStream element including a trigger, using the extensibility of an Event sub-element according to an embodiment of the present invention.

Hereinafter, a method of transmitting a trigger using the EventStream element of the MPD based on the extensibility of the Event subelement will be described.

Referring to the figure, a method in which an EventStream element according to an embodiment of the present invention includes a trigger is shown.

In order to transmit the trigger, the EventStream element according to an embodiment of the present invention may be obtained by extending and/or modifying the existing EventStream element.

The EventStream element according to an embodiment of the present invention may include a schemeIdUri attribute, a value attribute, and/or at least one Event subelement. The xlink:href attribute, xlink:actuate attribute, and/or timescale attribute may be optionally included in the EventStream element. Each Event subelement may include an id attribute. The presentationTime property and/or the duration property may optionally include an Event subelement. Details of the EventStream element may include all the details of the EventStream element described above.

The schemeIdUri attribute and/or the value attribute may be newly defined in the EventStream element according to an embodiment of the present invention.

The schemeIdUri attribute may specify that the Event subelement of the EventStream element is a trigger. That is, the schemeIdUri attribute may be assigned a value indicating that the content of the EventStream element is a trigger.

The value attribute may indicate that the event and/or Event subelement are triggers. That is, the value field has a value indicating that the event and/or Event subelement are triggers.

The values corresponding to the channelID field and the version field of the trigger may be extended using the extensibility of the Event subelement.

That is, the EventStream element according to an embodiment of the present invention may include <Event>@atsc:channelID, and/or <Event>@atsc:version. <Event>@atsc:channelID may be extended with the atsc:channelID attribute of the Event subelement. <Event>@atsc:version may be extended with the atsc:version attribute of the Event subelement. That is, the Event subelement may further include the atsc:channelID attribute and/or the atsc:version attribute in addition to the id attribute.

The Event subelement may have the same value as the URI_byte field of the trigger.

The id attribute may have the same value as the cmdID field of the trigger.

The atsc:channelID attribute may have the same value as the channelID field of the trigger.

The atsc:version attribute may have the same value as the version field of the trigger.

Figure 53:
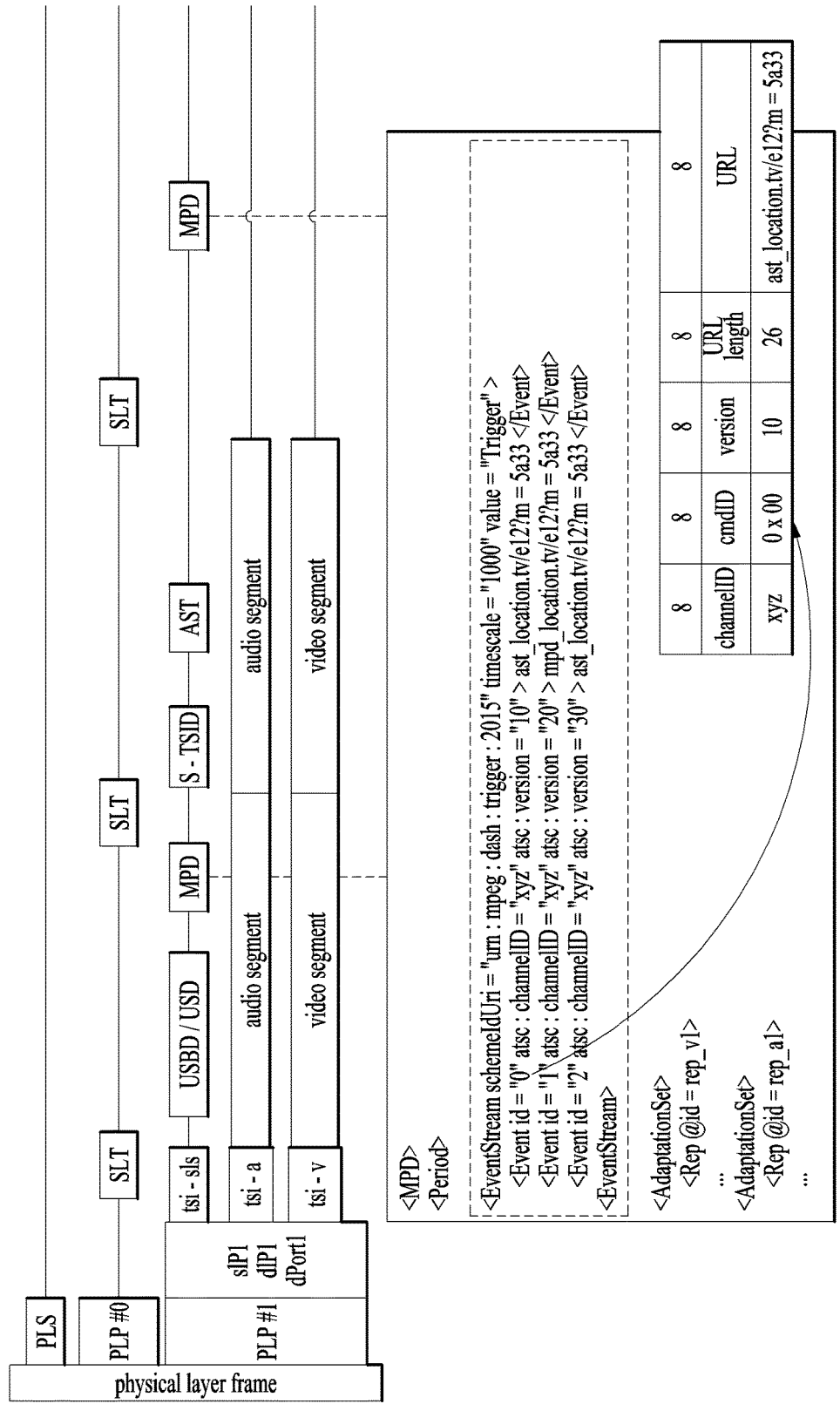
FIG. 53 is a diagram illustrating transmission of an EventStream element including a trigger according to an embodiment of the present invention.

FIG. 53 is a diagram illustrating transmission of an EventStream element including a trigger according to an embodiment of the present invention.

Referring to the figure, a broadcast signal may contain at least one physical layer frame. The physical layer frame may include physical layer signaling data for signaling of the physical layer and/or at least one physical layer pipe. Details of the broadcast signal may include all the details of the broadcast signal described above. Hereinafter, differences will be mainly described.

The MPD may include a Period element. The Period element may include a first AdaptationSet element that contains information about the video component and/or a second AdaptationSet element that contains information about the audio component.

The Period element may further include an EventStream element.

The EventStream element may include a schemeIdUri attribute, a timescale attribute, a value attribute, and/or at least one Event subelement. For example, the schemeIdUri attribute may have a value of "urn:mpeg:dash:trigger:2015", the timescale attribute may have a value of "1000", and the value attribute may have a value of "Trigger".

The Event subelement may include a first Event subelement, a second Event subelement, and/or a third Event subelement. Each of the Event subelements may include an id attribute, an atsc:channelID attribute, and/or an atsc:version attribute. In addition, the Event subelement may have the value of the URI_byte field of the trigger.

For example, in the first Event subelement, the value of the id attribute may be "0", the value of the atsc:channelID attribute may be "xyz", and the value of the attribute atsc:version may be "10". In addition, the value of the first Event subelement may be "ast_location.tv/e12?m=5a33".

For example, in the second Event subelement, the value of the id attribute may be "1", the value of the atsc:channelID attribute may be "xyz", and the value of the atsc:version attribute may be "20". In addition, the value of the second Event subelement may be "mpd_location.tv/e12?m=5a33".

For example, in the third Event subelement, the value of the id attribute may be "2", the value of the atsc:channelID attribute may be "xyz", and the value of the attribute atsc:version may be "20". In addition, the value of the third Event subelement may be "esg_location. tv/e12?m=5a33".

That is, the first Event subelement may include a first trigger. Here, the channelID information of the first trigger may have a value of "xyz", the cmdID information may have a value of "0x00", the version information may have a value of "10", and the URL length information may have a value of "26", and/or the URI_byte information may have a value of "ast_location.tv/e12?m=5a33".

Figure 54:
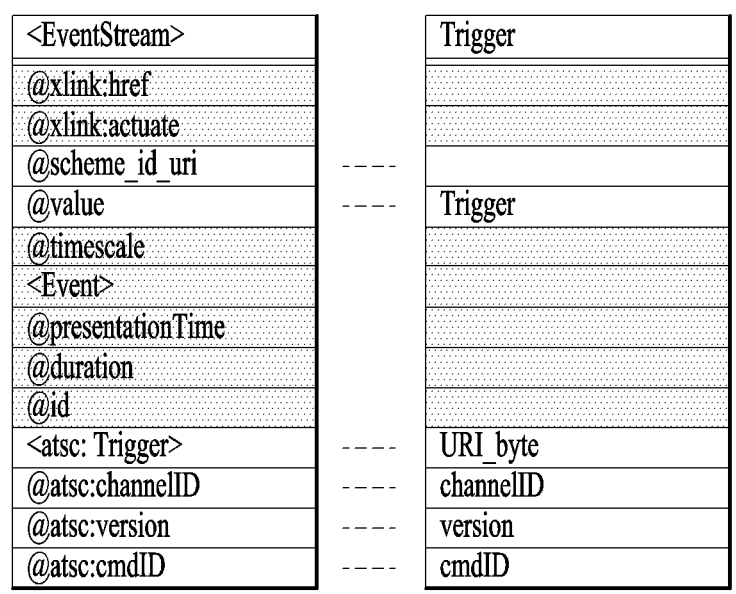
FIG. 54 is a diagram illustrating an EventStream element including a trigger, using the extensibility of an EventStream element according to an embodiment of the present invention.

FIG. 54 is a diagram illustrating an EventStream element including a trigger, using the extensibility of an EventStream element according to an embodiment of the present invention.

Hereinafter, a method of transmitting a trigger using the EventStream element of the MPD based on the extensibility of the EventStream element will be described.

Referring to the figure, a method in which an EventStream element according to an embodiment of the present invention includes a trigger is shown.

In order to transmit the trigger, the EventStream element according to an embodiment of the present invention may be obtained by extending and/or modifying the existing EventStream element.

The EventStream element according to an embodiment of the present invention may include a schemeIdUri attribute and/or a value attribute. An xlink:href attribute, an xlink:actuate attribute, a timescale attribute, and/or at least one Event subelement may be optionally included in the EventStream element. Details of the EventStream element may include all the details of the EventStream element described above.

Values corresponding to the channelID field, the version field, the URI_byte field, and/or the cmdID field of the trigger may be extended using the extensibility of the EventStream element.

That is, the EventStream element according to an embodiment of the present invention may further include an atsc:Trigger element. The atsc:Trigger element may correspond to a trigger or include a trigger.

The atsc:Trigger element may include an atsc:channelID attribute, an atsc:version attribute, and/or an atsc:cmdID attribute.

The atsc:Trigger element may have the same value as the URI_byte field of the trigger.

The atsc:channelID attribute may have the same value as the channelID field of the trigger.

The atsc:version attribute may have the same value as the version field of the trigger.

The atsc:cmdID attribute may have the same value as the cmdID field of the trigger.

Figure 55:
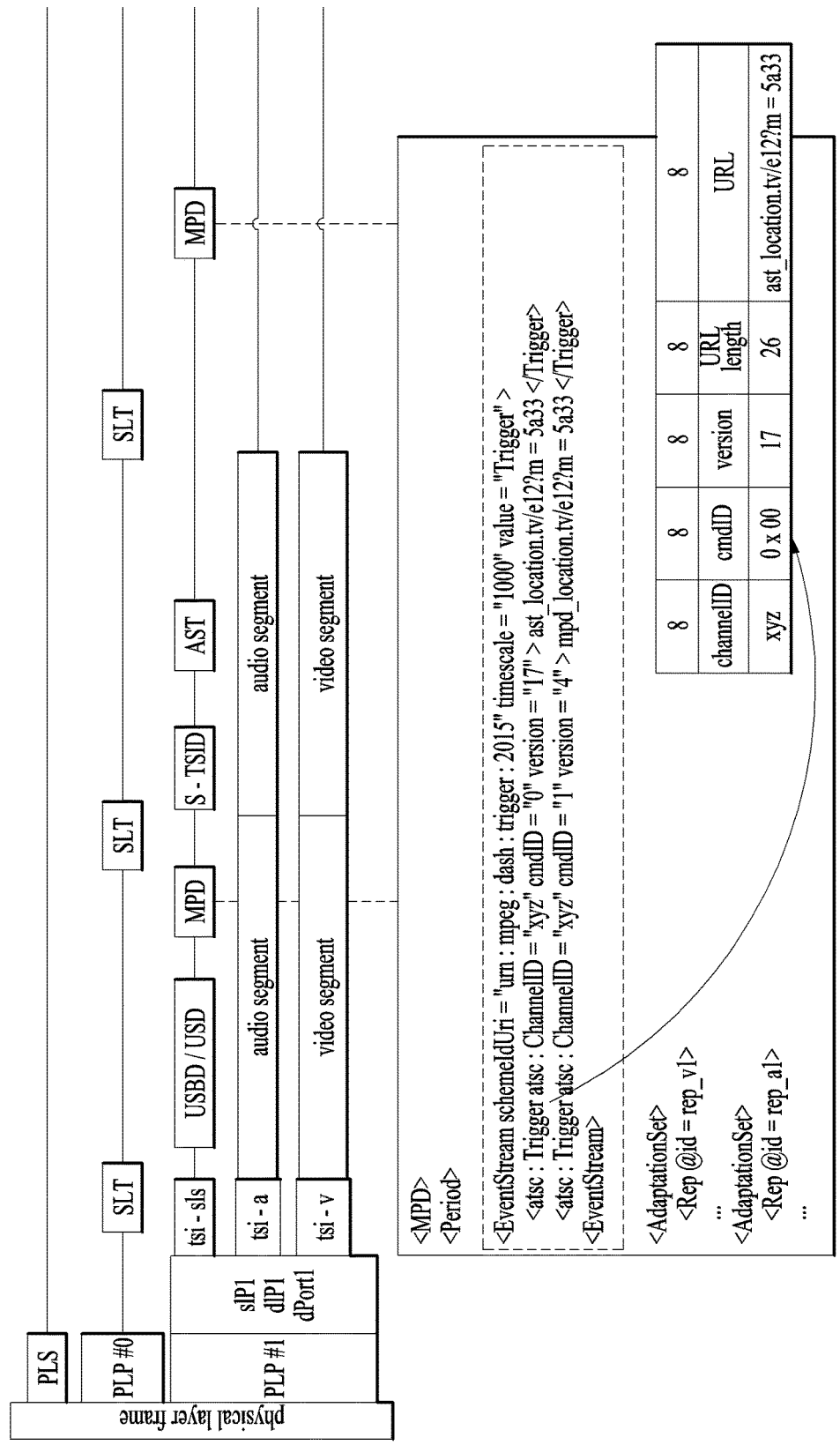
FIG. 55 is a diagram illustrating transmission of an EventStream element including a trigger according to an embodiment of the present invention.

FIG. 55 is a diagram illustrating transmission of an EventStream element including a trigger according to an embodiment of the present invention.

Referring to the figure, a broadcast signal may include at least one physical layer frame. The physical layer frame may include physical layer signaling data for signaling of the physical layer and/or at least one physical layer pipe. Details of the broadcast signal may include all the details of the broadcast signal described above. Hereinafter, differences will be mainly described.

The MPD may include a Period element. The Period element may include a first AdaptationSet element that contains information about the video component and/or a second AdaptationSet element that contains information about the audio component.

The Period element may further include an EventStream element.

The EventStream element may include a schemeIdUri attribute, a timescale attribute, a value attribute, and/or at least one Event subelement. For example, the schemeIdUri attribute may have a value of "um:mpeg:dash:trigger:2015", the timescale attribute may have a value of "1000", and the value attribute may have a value of "Trigger".

The atsc:Trigger element may include a first atsc:Trigger element, and/or a second atsc:Trigger element. Each of the atsc:Trigger elements may include an atsc:channelID attribute, an atsc:cmdID attribute, and/or an atsc:version attribute. The atsc:Trigger element may have the value of the URI_byte field of the trigger.

For example, in the first atsc:Trigger element, the value of the atsc:channelID attribute is "xyz", the value of the atsc:cmdID attribute is "0", and the value of the attribute atsc:version is "17". The value of the first atsc:Trigger element may be "ast_location.tv/e12?m=5a33".

For example, in the second atsc:Trigger element, the value of the atsc:channelID attribute may be "xyz", the value of the atsc:cmdID attribute may be "1", and the value of the attribute atsc:version may be "4". The value of the second atsc:Trigger element may be "mpd_location.tv/e12?m=5a33".

That is, the first atsc:Trigger element may include a first trigger. The channel ID information of the first trigger may have a value of "xyz", the cmdID information may have a value of "0x00", the version information may have a value of "17", and the URL length information may have a value of "26", and/or the URI_byte information may have a value of "ast_location.tv/e12?m=5a33".

Figure 56:
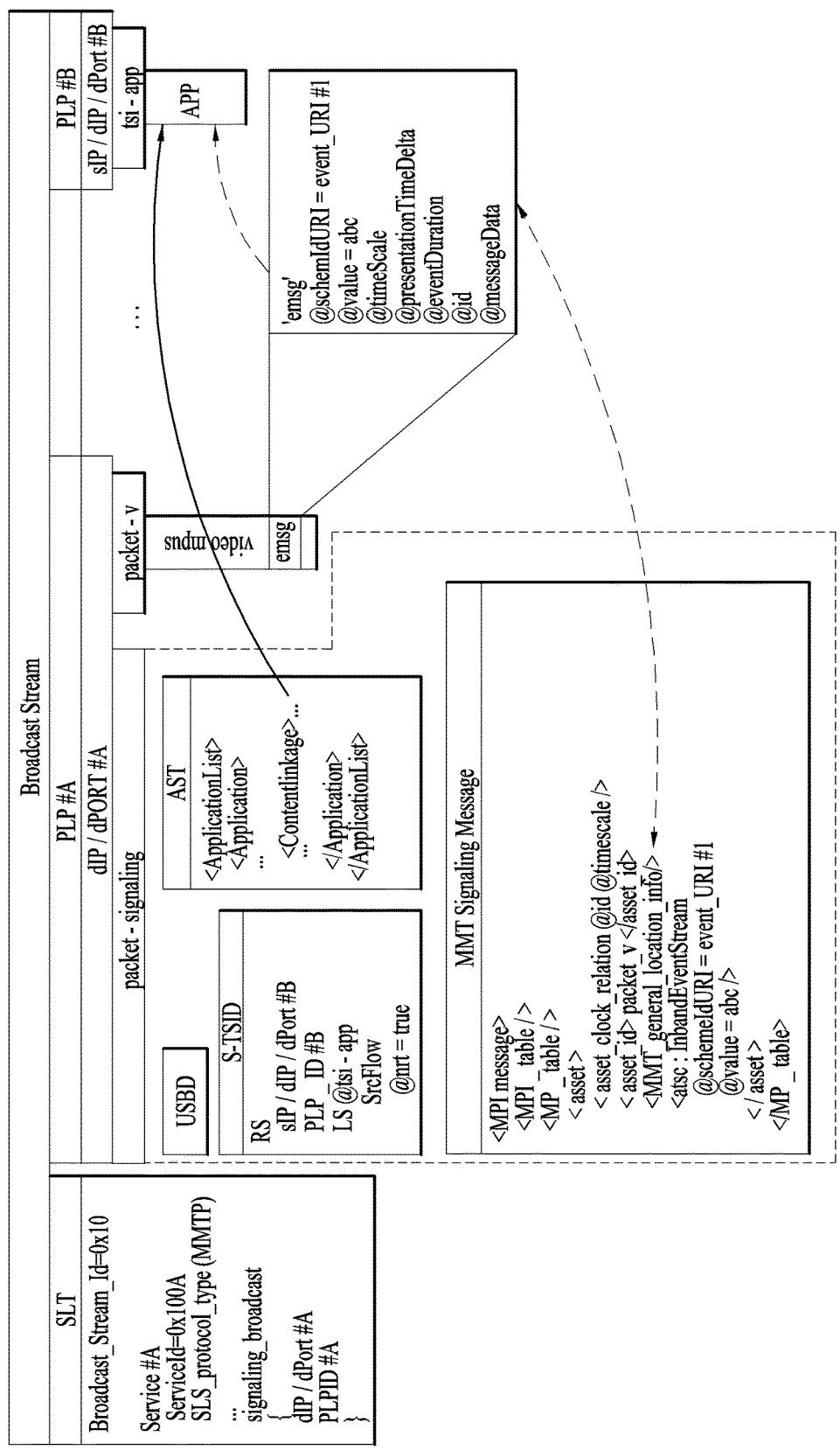
FIG. 56 is a diagram illustrating a method of transmitting an emsg box in an MMP protocol according to an embodiment of the present invention.

FIG. 56 is a diagram illustrating a method of transmitting an emsg box in an MMP protocol according to an embodiment of the present invention.

The event may be transmitted in the form of an emsg box in the MPU of the MMP protocol. Details of the emsg box transmitted over the broadcast network may include all the details of the emsg box described above. Hereinafter, differences will be mainly described.

A broadcast stream may include service data and/or signaling data for a service. For example, the service data may include a video component, and/or an application. The signaling data may include an SLT and/or SLS.

The SLT may be transmitted over IP/UDP.

The SLS and/or video component may be transmitted via the packet stream of an MMTP session (dIP #A/dPort #A). The MMTP session (dIP #A/dPort #A) may be transmitted through the first PLP (PLP #A). The application may be transmitted through a ROUTE session (sIP #B/dIP #B/dPort #B). The ROUTE session (sIP #B/dIP #B/dPort #B) may be transmitted through the second PLP (PLP #B).

For example, the SLS may include at least one of the USBD, AST, S-TSID, and/or MMP Signaling Message. The video component may include at least one video MPU including video data. The at least one video MPU may include an emsg box.

Hereinafter, the emsg box included in the MPU will be described.

The emsg box may include at least one of a schemeIdUri field, a value field, a timescale field, a presentationTimeDelta field, an eventDuration field, an id field, and/or a messageData field. The details of the emsg box may include all the details of the emsg box described above.

Hereinafter, the SLT will be described.

The SLT may include SLS_protocol_type information indicating the protocol type of the SLS. For example, the SLS_protocol_type information may indicate MMTP.

The SLT may include path information for an MMTP session (dIP #A/dPort #A). The SLT may include path information for the SLS of the MMTP session (dIP #A/dPort #A).

Hereinafter, the SLS will be described.

The SLS may include at least one of USBD, AST, S-TSID, and/or MMP Signaling Message. Details of the SLS may include all the details of the SLS described above. Hereinafter, the S-TSID and/or the MMP Signaling Message will be described in more detail.

The S-TSID may include a ROUTE session element RS for providing information about a ROUTE session for a service and/or a component included in the service. The ROUTE session element RS may include transmission path information for a ROUTE session (sIP #B/dIP #B/dPort #B). In addition, the ROUTE session element (RS) may include information about a transport session (or Layered Coding Transport session) within the ROUTE session. For example, the ROUTE session element RS may include a first transport session element LS containing information about the first transport session tsi-app.

Specifically, the first transport session element LS may include a tsi attribute for identifying a transport session in which the content component for the service is transmitted, and a SrcFlow element FOR describing the source flow included in the ROUTE session.

The SrcFlow element may include an nrt attribute indicating whether the SrcFlow element transmits non-real-time service data. Alternatively, the SrcFlow element may include an rt attribute indicating whether the SrcFlow element transmits streaming media data. That is, the nrt attribute may perform the same function as the rt attribute, and may be substituted for each other.

Regarding the first transport session element LS, if the tsi attribute is "tsi-app", the corresponding transport session element may contain information for the first transport session. In addition, if the nrt attribute is "true", the corresponding SrcFlow element may transmit non-real-time service data. That is, the application (App) may be transmitted in non-real-time through the first transport session (tsi-app).

The MMP Signaling Message may provide information about the service and/or the MMTP session for the components included in the service. The MMP Signaling Message may include an MPI message, the MPI message may include an MPI table, the MPI table may include an MP table, and the MP table may include at least one Asset element. The Asset element may contain information similar to the information of the aforementioned representation element and may perform a similar function.

For InbandEventStream signaling, the <xs:any namespace="##other" processContents="skip"> schema of the Asset element of the MP_table contained in the MPI message, which is one of the MMT Signaling messages, may be extended.

That is, the Asset element may further include an atsc:InbandEventStream element that specifies presence of an in-band event stream in the associated packet stream. The atsc:InbandEventStream element of the Asset element may signal whether an event is present in the emsg boxes in the MPUs.

The atsc:InbandEventStream element may include a schemeIdURI attribute and/or a value attribute. These two attributes may indicate the type of an event in the emsg box. In an embodiment, these two attributes may be used to identify the event. The schemeIdURI attribute and/or value attribute included in the atsc:InbandEventStream element may have values that match the schemeIdURI attribute and/or value attribute in an emsg box transmitted in the MPU and may be matched with each other. For example, the value of the schemeIdURI attribute may be "event_URI #1", and the value of the value attribute may be "abc".

A broadcast reception apparatus according to an embodiment of the present invention may transmit a broadcast signal containing at least one of service data for a service and signaling data (for example, low level signaling data or service layer signaling data (SLS)) over a broadcast network.

The broadcast reception apparatus according to the embodiment may acquire a service based on signaling data. Specifically, the broadcast reception apparatus may acquire low-level signaling data and acquire service layer signaling data based on low-level signaling data. For example, in may acquire USBD, AST, S-TSID, and/or MMP Signaling Message.

The broadcast reception apparatus may acquire transmission path information for at least one component transmitted through the MMTP session using service layer signaling data (MMP Signaling Message). At this time, the Asset element of the MMP Signaling Message may include an atsc:InbandEventStream element that specifies presence of an emsg box (or in-band event stream) in the MPU (or video component).

The broadcast reception apparatus may acquire the transmission path information on at least one component transmitted through the ROUTE session using the service layer signaling data (S-TSID). In addition, the broadcast reception apparatus may acquire transmission path information on another component for at least one component, using service layer signaling data (S-TSID). For example, the other component for at least one component may include an application.

Further, the broadcast reception apparatus may acquire service data for a service based on the service layer signaling data (transmission path information). For example, the broadcast reception apparatus may receive an application (App) through a ROUTE session in non-real-time. In addition, the broadcast reception apparatus may receive at least one video PU of the video component through the MMTP session in real time.

Further, the broadcast reception apparatus may acquire information for identifying the application (App) based on the service layer signaling data (AST).

Further, the broadcast reception apparatus may operate the application (App) based on the event. The broadcast reception apparatus may operate the application (App) at a predetermined timing while reproducing the video component.

Figure 57:
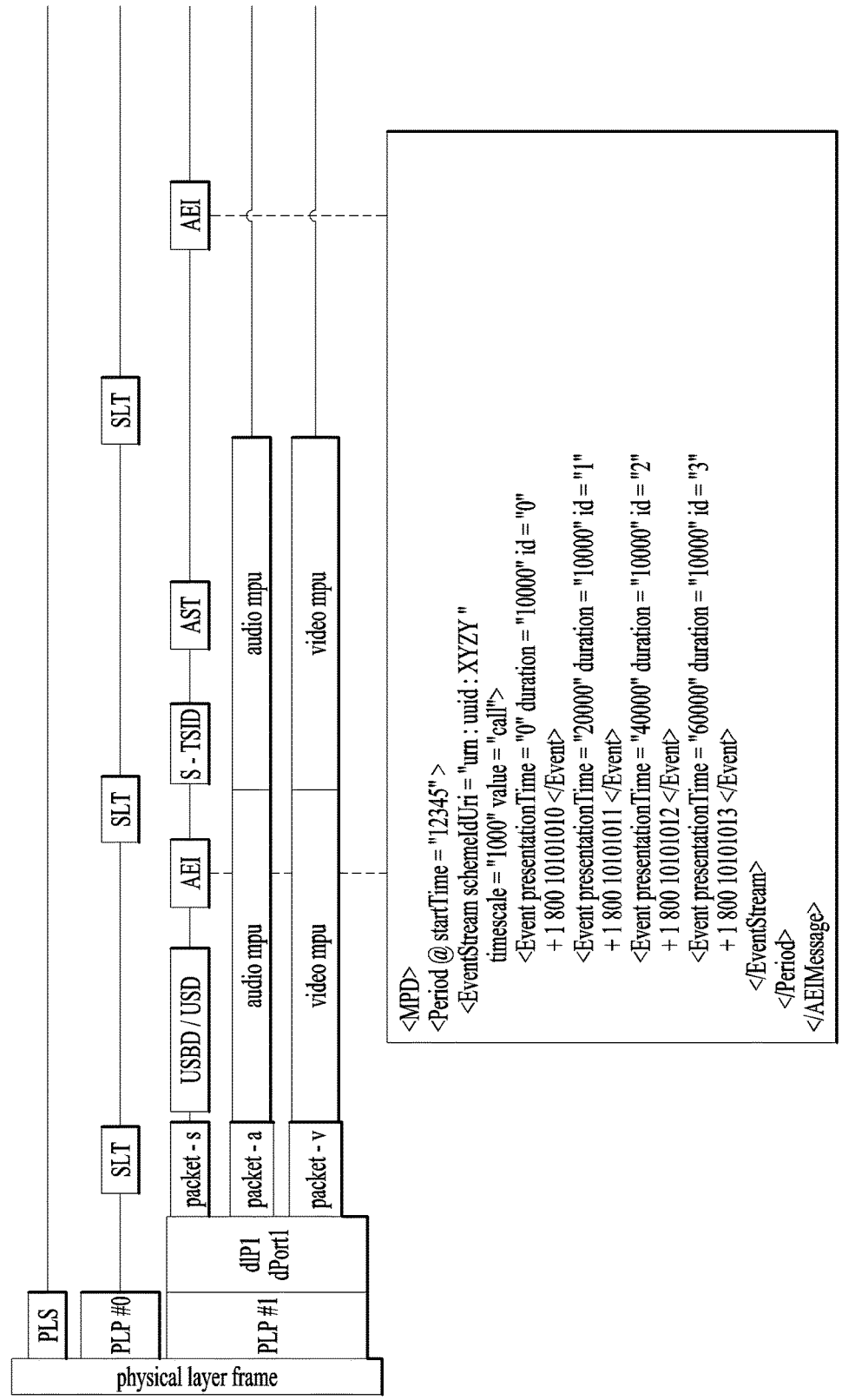
FIG. 57 is a diagram illustrating a method of transmitting an EventStream element in an MMP protocol according to an embodiment of the present invention.

FIG. 57 is a diagram illustrating a method of transmitting an EventStream element in an MMP protocol according to an embodiment of the present invention.

Referring to the figure, a broadcast signal may contain at least one physical layer frame. The physical layer frame may include physical layer signaling data for signaling of the physical layer and/or at least one physical layer pipe.

The SLT may be periodically and/or aperiodically transmitted through the first PLP (PLP #0).

The second PLP (PLP #1) may include an MMTP session (dIP1, dPort1). The MMTP session may include a first packet stream (packet-s) for transmitting service layer signaling data, a second packet stream (packet-a) for transmitting at least one audio MPU (or audio component), and/or a third packet stream (packet-v) for transmitting at least one video MPU (or video component).

The service layer signaling data may include USBD/USD, AEI, S-TSID, and/or AST and may be transmitted periodically and/or aperiodically through the first packet stream (packet-s).

Referring to the figure, an embodiment of a new signaling message scheme for Static Event Signaling is shown.

That is, the service layer signaling data according to an embodiment of the present invention may include AEIMessage. AEIMessage may perform the same function as MPD. AEIMessage may contain an EventStream element, and the corresponding structure is identical to the structure of the EventStream element of the MPD.

That is, the EventStream element may include a schemeIdUri attribute, a value attribute, a timescale attribute, and/or at least one Event subelement. Each Event subelement may include a presentationTime attribute, a duration attribute, and/or an id attribute. Details of the EventStream element may include all the details of the EventStream element described above.

For time information, AEIMessage may include a Period element as a root element. The Period element may include a Start time attribute indicating the start time. Each event may occur for a duration from a time corresponding to the sum of the start time and the presentationTime.

Figure 58:
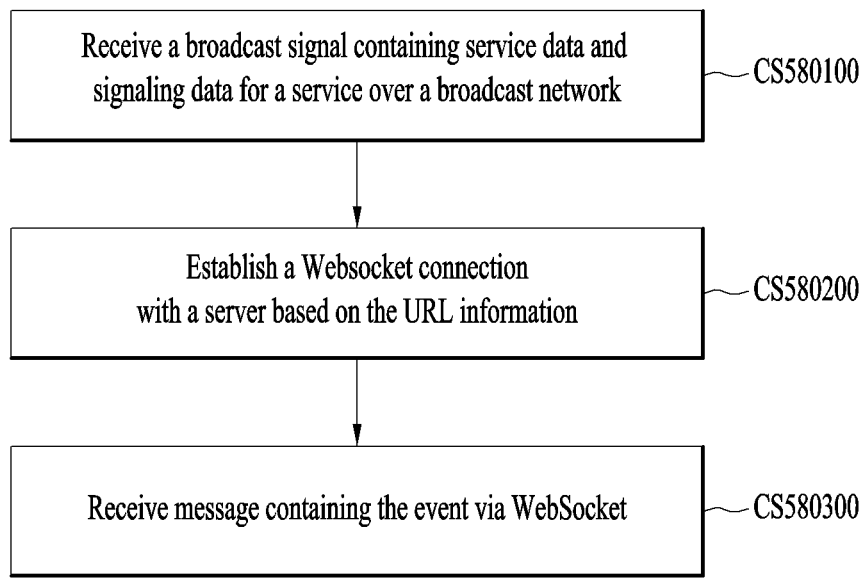
FIG. 58 is a diagram illustrating a broadcast signal reception method according to an embodiment of the present invention.

FIG. 58 is a diagram illustrating a broadcast signal reception method according to an embodiment of the present invention.

The broadcast signal reception apparatus according to an embodiment of the present invention may include a tuner, a websocket client, and/or a controller.

The broadcast signal reception apparatus may receive a broadcast signal containing service data and signaling data for a service over a broadcast network using a tuner (CS580100).

The service data may include an audio component, a video component and/or an application. The signaling data may include service layer signaling data (SLS) that provides information for acquiring the service and the components of the service. The service layer signaling data may include S-TSID, MPD, USBD/USD, AST, and/or EST. The signaling data may include a service list table (SLT) containing information used to provide a bootstrap for acquiring the service layer signaling data. For example, the SLT may be represented by a Fast Information Table. The SLT may include Uniform Resource Locator (URL) information for accessing the service layer signaling data for the service over broadband.

The broadcast signal reception apparatus may establish a WebSocket connection with the server based on the URL information using the Websocket client (CS580200). The Websocket client may be represented by a broadband network module and may include a device capable of receiving data over broadband.

Through the WebSocket connection, a message may be transmitted bidirectionally between the server and the client. The URL information may indicate a server URL for receiving the message over broadband. For example, the server URL may include AppSignalingWSURL, broadbandServerWSURL_AST, BroadbandStaticEventWSURL, BroadbandDynamicEventWSURL, and/or BroadbandEventWSURL. The message may be used for transmission of an event initiating an action performed by the application.

In addition, the broadcast signal reception apparatus may receive the message including the event via the WebSocket using the WebSocket client (CS580300).

Establishing the Websocket connection with the server based on the URL information may include opening a handshake between the server and the client. In addition, the opening of the handshake between the server and the client may include: sending a first request to the server; and receiving a first response from the server in response to the first request. All the above steps may be performed using a WebSocket client.

The first request may include request type information indicating whether the message including the event is requested. The first response may include response type information indicating whether the message includes the event. The request type information may include NotificationType information included in the information for the request. The response type information may include NotificationType information included in the information for the response.

The message may include a table type element that indicates the type of table in which the updated data of the event is available. The table type element may indicate one of a dynamic event including the event, an application table including information related to the application, and an event table including information related to the event. The application table and the event table may include the event.

The message may further include a message identifier element for identifying the message. The message may further include a service identifier element for identifying a service to which the message is applied. The message may further include an action code element indicating the type of operation of the message. The message may further include a table data element including data of the event.

In addition, the action code element may indicate a Notification RESUME request from the client to the server for a message identified by the message identifier element, a service identified by the service identifier element, and a table of a type identified by the table type element.

In addition, the action code element may indicate a request from the client to the server in order to receive table data of the table type indicated by the table type element.

The action code element may indicate a response from the server to the client in response to the request from the client.

Then, the broadcast signal reception apparatus may operate the application based on the message using the controller. The controller may include all parts of the broadcast signal reception apparatus (or receiver) except the tuner and the WebSocket client.

Figure 59:
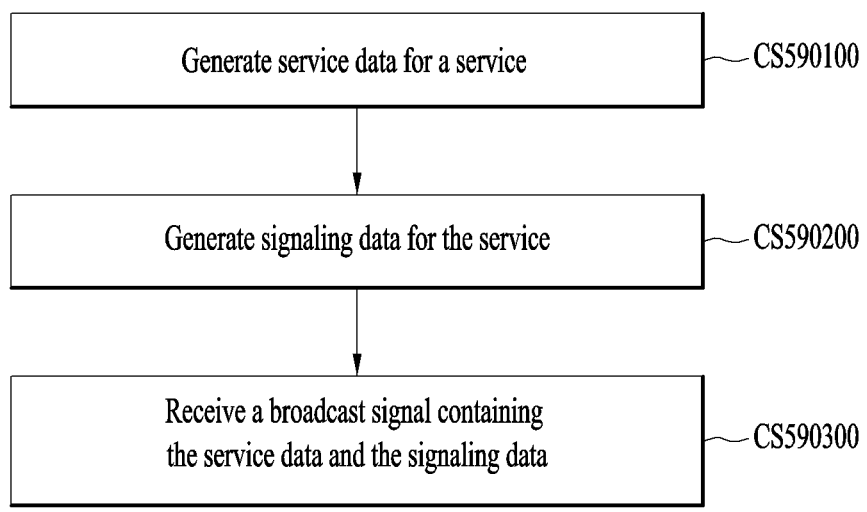
FIG. 59 is a diagram illustrating a broadcast signal transmission method according to an embodiment of the present invention.

FIG. 59 is a diagram illustrating a broadcast signal transmission method according to an embodiment of the present invention.

A broadcast signal transmission apparatus according to an embodiment of the present invention may include a controller and a transmitter.

The broadcast signal transmission apparatus may generate service data for a service using the controller (CS590100).

The broadcast signal transmission apparatus may generate signaling data for a service using the controller (CS290200).

The broadcast signal transmission apparatus may transmit a broadcast signal containing the service data and the signaling data using the transmission unit (CS590300).

The broadcast signal transmission apparatus may play a role corresponding to the broadcast signal reception apparatus. Thus, the service data and signaling data may include all of the above.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

[Mode for Invention]

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of receiving a broadcast signal, the method comprising:

receiving a broadcast signal including a service list table, service signaling information for a broadcast service and service components for the broadcast service, wherein the service signaling information and the service components are delivered according to a MPEG Media Transport (MMT) protocol or a Real-Time Object Delivery over Unidirectional Transport (ROUTE) protocol;

obtaining the service list table, the service signaling information and the service components from the received broadcast signal, wherein the service list table includes bootstrap information for accessing the service signaling information and protocol type information for indicating a type of a transport protocol used for delivering the service signaling information, wherein the service signaling information includes information for acquiring the service components, wherein the service list table includes at least one of a first Uniform Resource Locator (URL) for a WebSocket server or a second URL for a signaling server;

establishing a WebSocket connection with the WebSocket server based on the first URL included in the service list table;

receiving an event message from the WebSocket server via the WebSocket connection, the event message signaling an action to be taken by an application;

sending a HTTP request for an Application Event Information (AEI) to the signaling server based on the second URL included in the service list table; and receiving the AEI from the signaling server, wherein the AEI comprises ID attribute information, time attribute information for representing presentation time and an event stream element for at least one event stream, and the event stream element has scheme attribute information for specifying an identifier scheme for the at least one event stream and an event element for defining information about an event in the event stream element.

2. The method of claim 1, wherein the establishing the WebSocket connection with the WebSocket server further includes:
sending a HTTP request for opening handshake to the WebSocket server by using the first URL in the service list table; and
receiving a HTTP response from the WebSocket server, wherein the HTTP request for opening handshake and the HTTP response include extended type information indicating a type of the HTTP request and the HTTP response.

3. The method of claim 1,
wherein the method further comprises:
sending a HTTP request for an application signaling table to the signaling server based on the second URL; and
receiving the application signaling table from the signaling server, the application signaling table providing information about applications related to the broadcast service.

4. The method of claim 1,
wherein the service signaling information carried in the broadcast signal further includes an AEI for providing event signaling for service components of the MMT protocol.

5. The method of claim 1,
wherein the service signaling information carried by the broadcast signal further includes a MMT signaling message including inland event information, the inband event information indicating presence of an event message included in a corresponding service component of the MMT protocol, and
wherein the corresponding service component of the MMT protocol includes the event message having an event ID for an event and timing information indicating a start time of the event.

6. A method of receiving a broadcast signal, the method comprising:
receiving a broadcast signal including a service list table, service signaling information for a broadcast service and service components for the broadcast service,
wherein the service signaling information and the service components are delivered according to a MPEG Media Transport (MMT) protocol or a Real-Time Object Delivery over Unidirectional Transport (ROUTE) protocol;
parsing the broadcast signal and obtaining the service list table, the service signaling information and the service components,
wherein the service list table includes bootstrap information for accessing the service signaling information and protocol type information for indicating a type of a transport protocol used for delivering the service signaling information,
wherein the service signaling information includes information for acquiring the service components,
wherein the service list table includes a first Uniform Resource Locator (URL) for a WebSocket server;
establishing a WebSocket connection with the WebSocket server by using the first URL;
receiving an event message from the WebSocket server via the WebSocket connection, the event message signaling an action to be taken by an application; and
providing the broadcast service using the service components and the event message,
wherein the receiving the event message via the WebSocket connection further comprises:
sending a request for an event message to the WebSocket server by using the first URL in the service list table; and
receiving an event notification frame from the WebSocket server, the event notification frame for delivering an event message for providing event signaling for service components of the MMT protocol,
wherein the event notification frame further includes an action code, a type element and an event message, the action code indicating a type of the event notification frame, the type element indicating which transport protocol the event message is associated with, and the event message including an event ID for an event and timing information for indicating a start time of the event.

7. An apparatus for receiving a broadcast signal, the apparatus comprising:
a tuner configured to receive a broadcast signal including a service list table, service signaling information for a broadcast service and service components for the broadcast service,
wherein the service signaling information and the service components are delivered according to a MPEG Media Transport (MMT) protocol or a Real-Time Object Delivery over Unidirectional Transport (ROUTE) protocol;
a parser configured to obtain the service list table, the service signaling information and the service components from the received broadcast signal,
wherein the service list table includes bootstrap information for accessing the service signaling information and protocol type information for indicating a type of a transport protocol used for delivering the service signaling information,
wherein the service signaling information includes information for acquiring the service components,
wherein the service list table includes at least one of a first Uniform Resource Locator (URL) for a WebSocket server or a second URL for a signaling server; and
a network interface configured to establish a WebSocket connection with the WebSocket server based on the first URL included in the service list table,
wherein the network interface is further configured to:
receive an event message from the WebSocket server via the WebSocket connection, the event message signaling an action to be taken by an application,
send a HTTP request for an Application Event Information (AEI) to the signaling server based on the second URL included in the service list table, and
receive the AEI from the signaling server,
wherein the AEI comprises ID attribute information, time attribute information for representing presentation time and an event stream element for at least one event stream, and the event stream element has scheme attribute information for specifying an identifier scheme for the at least one event stream and an event element for defining information about an event in the event stream element.

8. The apparatus of claim 7,
wherein, to establish the WebSocket connection with the WebSocket server, the network interface is further configured to:
send a HTTP request for opening handshake to the WebSocket server by using the first URL in the service list table; and
receive a HTTP response from the WebSocket server,
wherein the HTTP request for opening handshake and the HTTP response include extended type information indicating a type of the HTTP request and the HTTP response.

9. The apparatus of claim 7,
wherein the network interface is further configured to:
send a HTTP request for an application signaling table to the signaling server based on the second URL; and
receive the application signaling table from the signaling server, the application signaling table providing information about applications related to the broadcast service.

10. The apparatus of claim 7,
wherein the service signaling information carried in the broadcast signal further includes an AEI for providing event signaling for service components of the MMT protocol.

11. The apparatus of claim 7,
wherein the service signaling information carried by the broadcast signal further includes a MMT signaling message including inband event information, the inband event information indicating presence of an event message included in a corresponding service component of the MMT protocol, and
wherein the corresponding service component of the MMT protocol includes the event message having an event ID for an event and timing information indicating start time of the event.

12. An apparatus for receiving a broadcast signal, the apparatus comprising:
a tuner configured to receive a broadcast signal including a service list table, service signaling information for a broadcast service and service components for the broadcast service,
wherein the service signaling information and the service components are delivered according to a MPEG Media Transport (MMT) protocol or a Real-Time Object Delivery over Unidirectional Transport (ROUTE) protocol;
a parser configured to parse the broadcast signal and obtain the service list table, the service signaling information and the service components,
wherein the service list table includes bootstrap information for accessing the service signaling information and protocol type information for indicating a type of a transport protocol used for delivering the service signaling information,
wherein the service signaling information includes information for acquiring the service components,
wherein the service list table includes a first Uniform Resource Locator (URL) for a WebSocket server;
a network interface configured to establish a WebSocket connection with the WebSocket server by using the first URL,
wherein the network interface is further configured to receive an event message from the WebSocket server via the WebSocket connection, the event message signaling an action to be taken by an application; and
a processor configured to provide the broadcast service using the service components and the event message,
wherein, to receive the event message via the WebSocket connection, the network interface is further configured to:
send a request for an event message to the WebSocket server by using the first URL in the service list table; and
receive an event notification frame from the WebSocket server, the event notification frame for delivering an event message for providing event signaling for service components of the MMT protocol,
wherein the event notification frame further includes an action code, a type element and an event message, the action code indicating a type of the event notification frame, the type element indicating which transport protocol the event message is associated with, and the event message including an event ID for an event and timing information for indicating a start time of the event.

* * * * *